June 3, 1958　　　K. E. SCHREINER ET AL　　　2,837,278
CHECKING CIRCUIT
Filed Nov. 23, 1954　　　　　　　　　　24 Sheets-Sheet 3

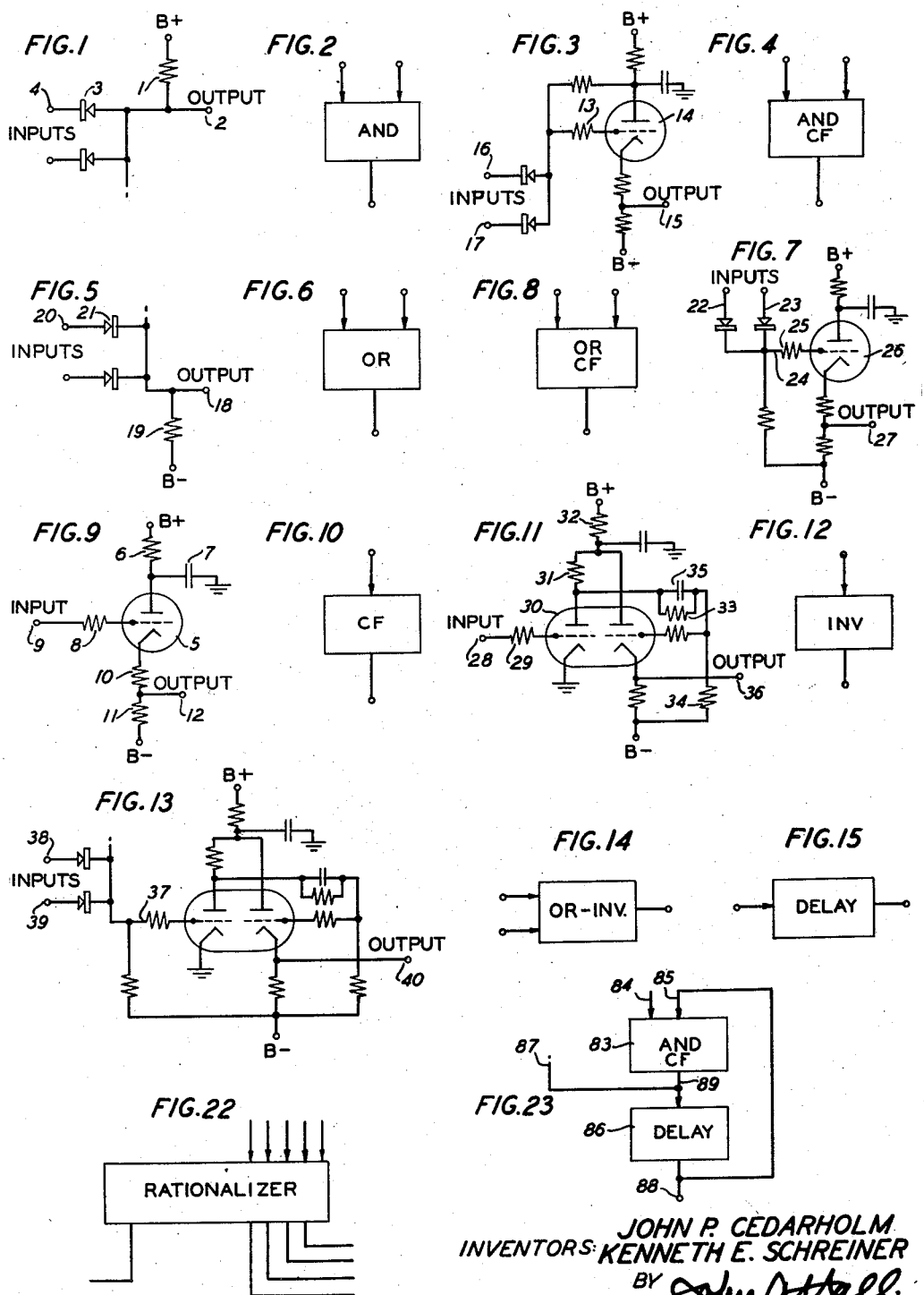

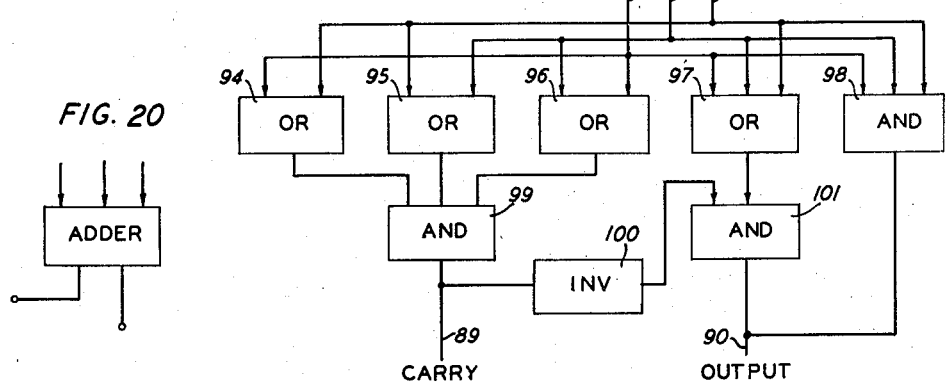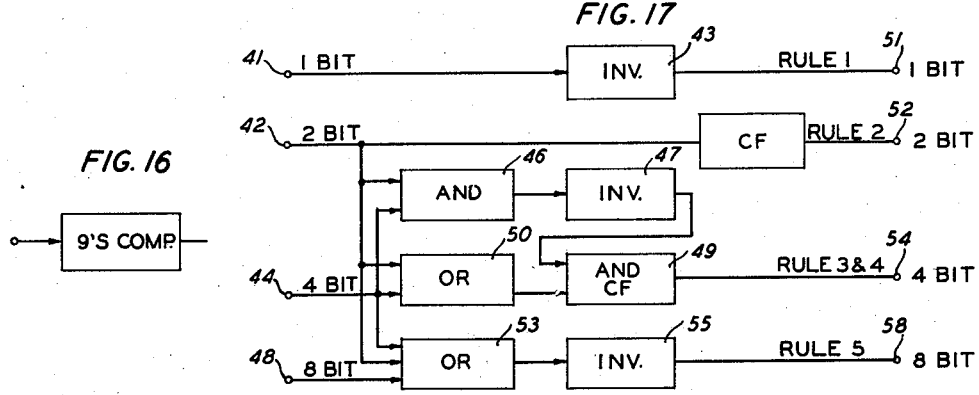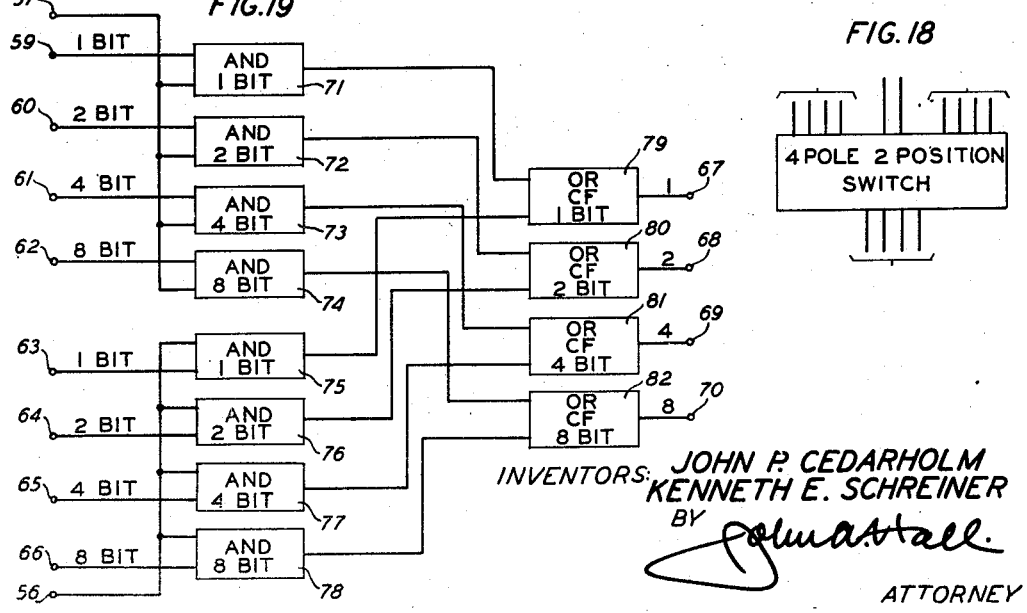

FIG. 24

INVENTORS: JOHN P. CEDARHOLM
KENNETH E. SCHREINER
BY John A. Hall
ATTORNEY

June 3, 1958  K. E. SCHREINER ET AL  2,837,278
CHECKING CIRCUIT
Filed Nov. 23, 1954  24 Sheets-Sheet 4

INVENTORS: JOHN P. CEDARHOLM
KENNETH E. SCHREINER
BY
ATTORNEY

INVENTORS: JOHN P. CEDARHOLM
KENNETH E. SCHREINER
BY
ATTORNEY

June 3, 1958 K. E. SCHREINER ET AL 2,837,278
CHECKING CIRCUIT
Filed Nov. 23, 1954 24 Sheets-Sheet 11

INVENTORS: JOHN P. CEDARHOLM
KENNETH E. SCHREINER
BY
ATTORNEY

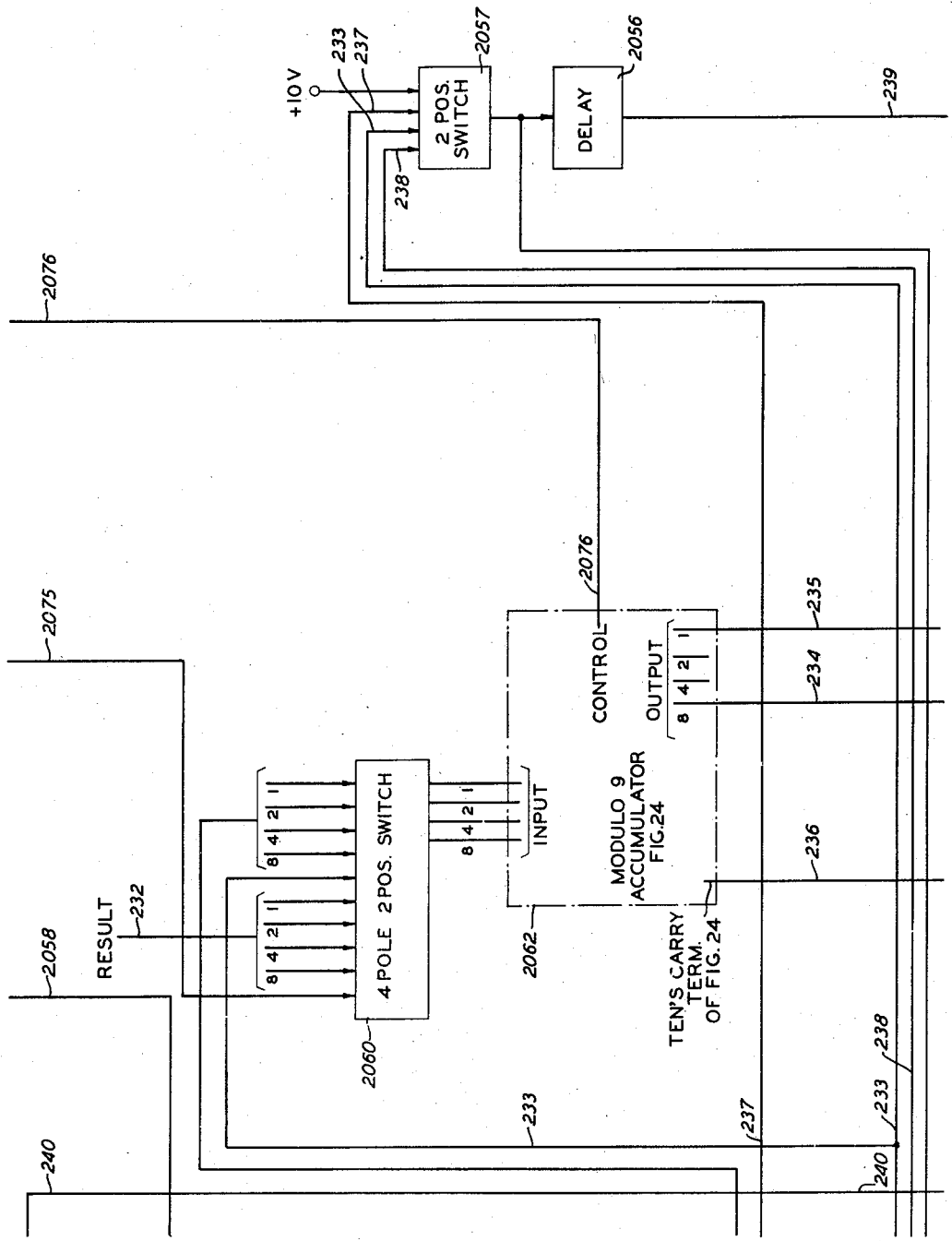
FIG. 33
INVENTORS: JOHN P. CEDARHOLM
KENNETH E. SCHREINER
BY 
ATTORNEY

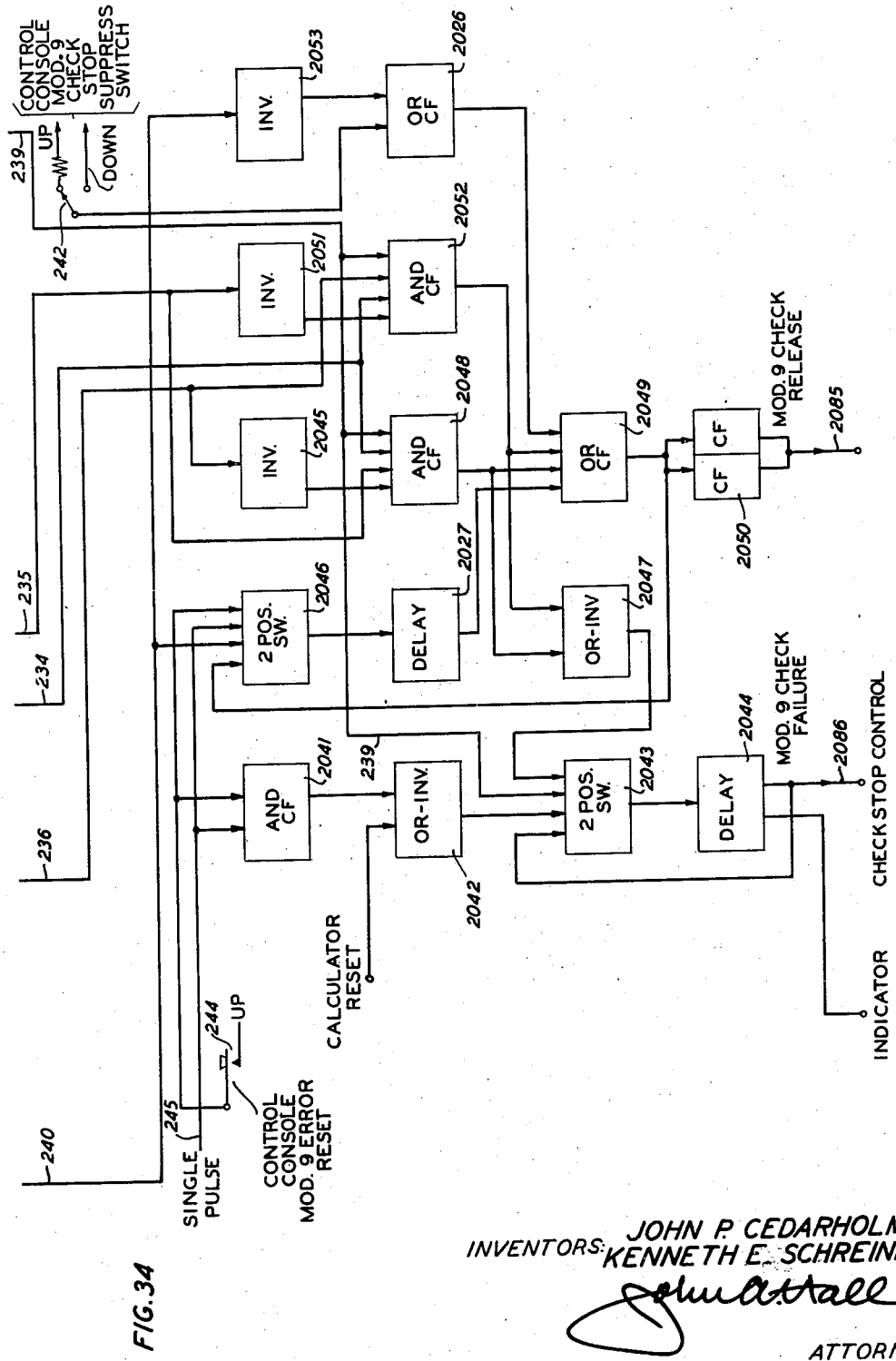

June 3, 1958

K. E. SCHREINER ET AL 2,837,278

CHECKING CIRCUIT

Filed Nov. 23, 1954

INVENTORS JOHN P. CEDARHOLM
KENNETH E. SCHREINER
BY
ATTORNEY

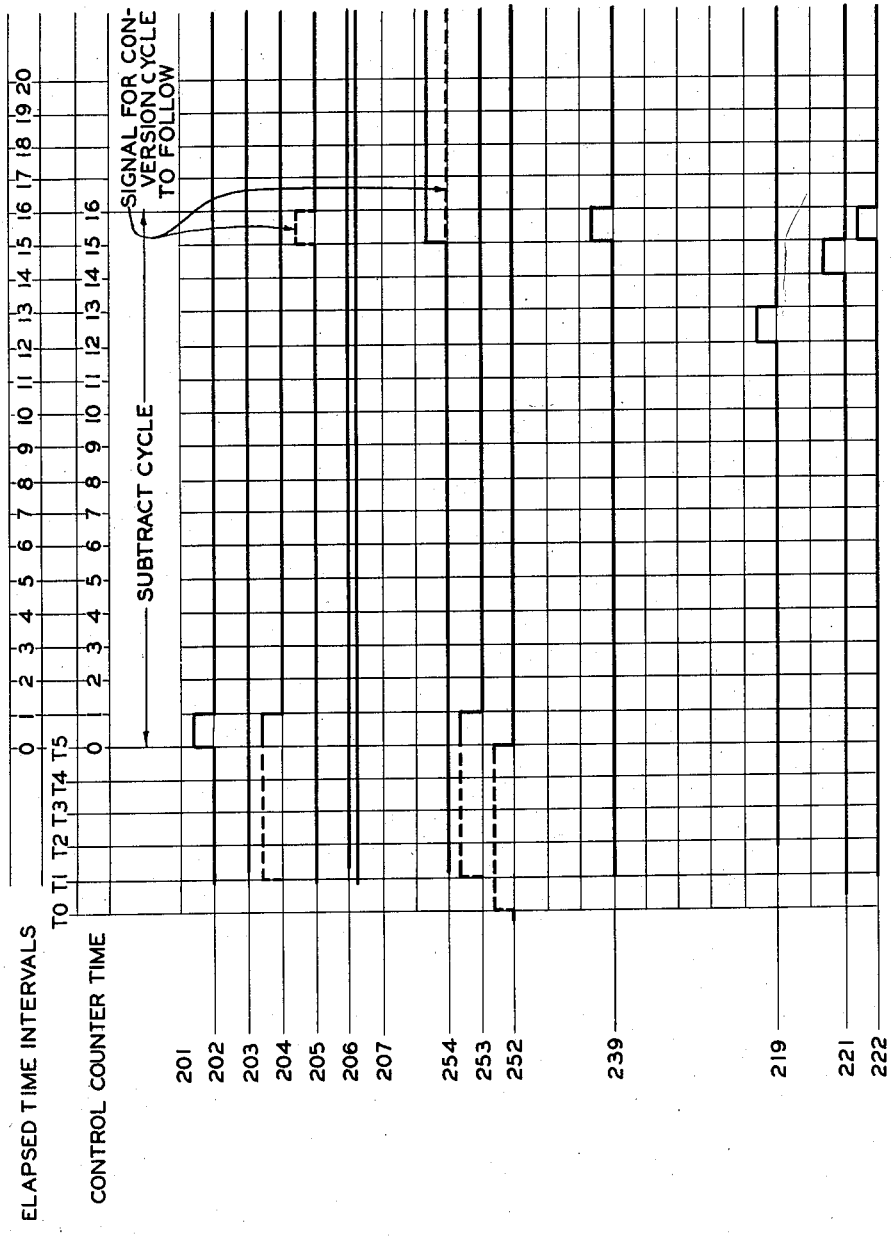

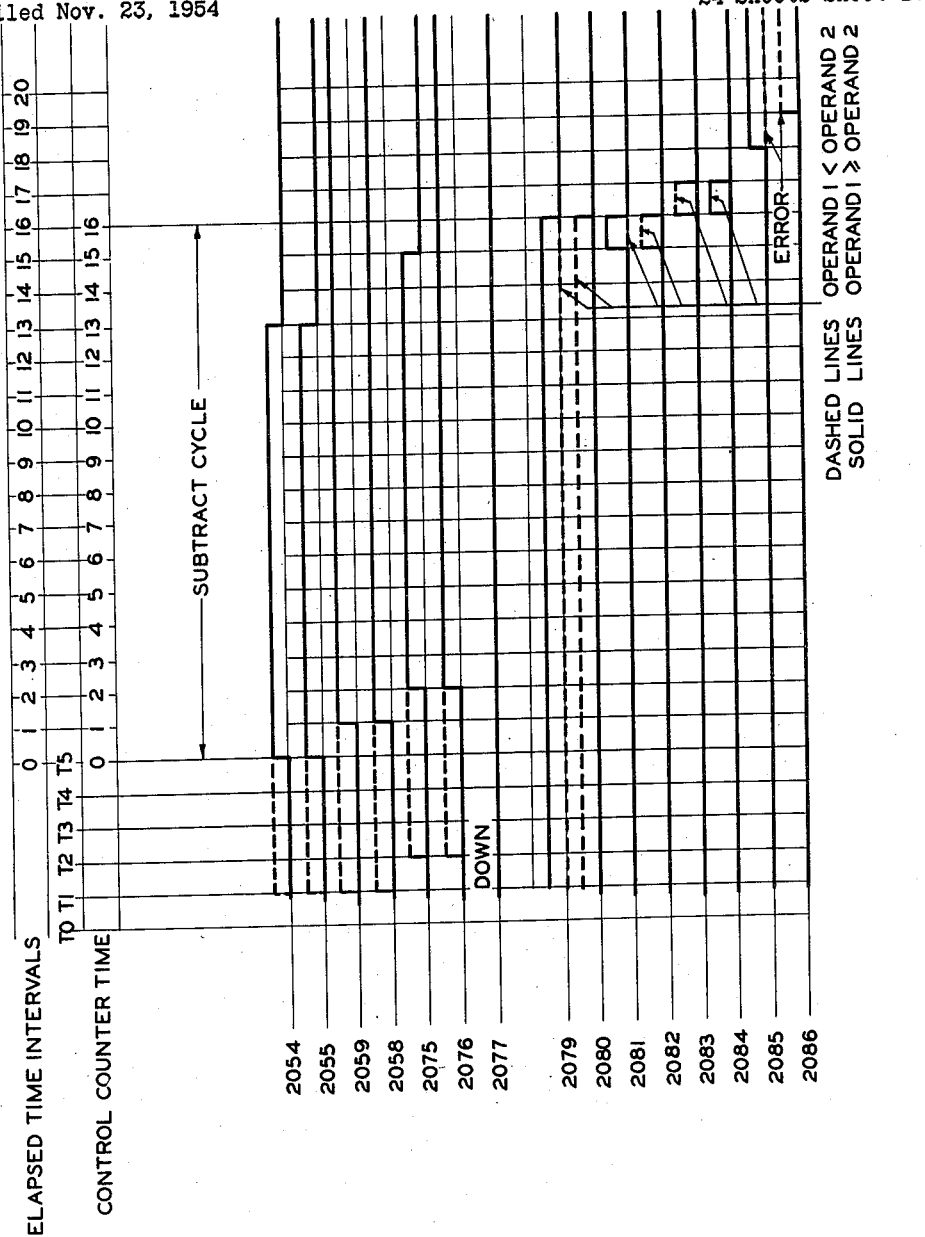

June 3, 1958   K. E. SCHREINER ET AL   2,837,278
CHECKING CIRCUIT
Filed Nov. 23, 1954   24 Sheets-Sheet 18

INVENTORS: JOHN P. CEDARHOLM
KENNETH E. SCHREINER
BY John A. Hall
ATTORNEY

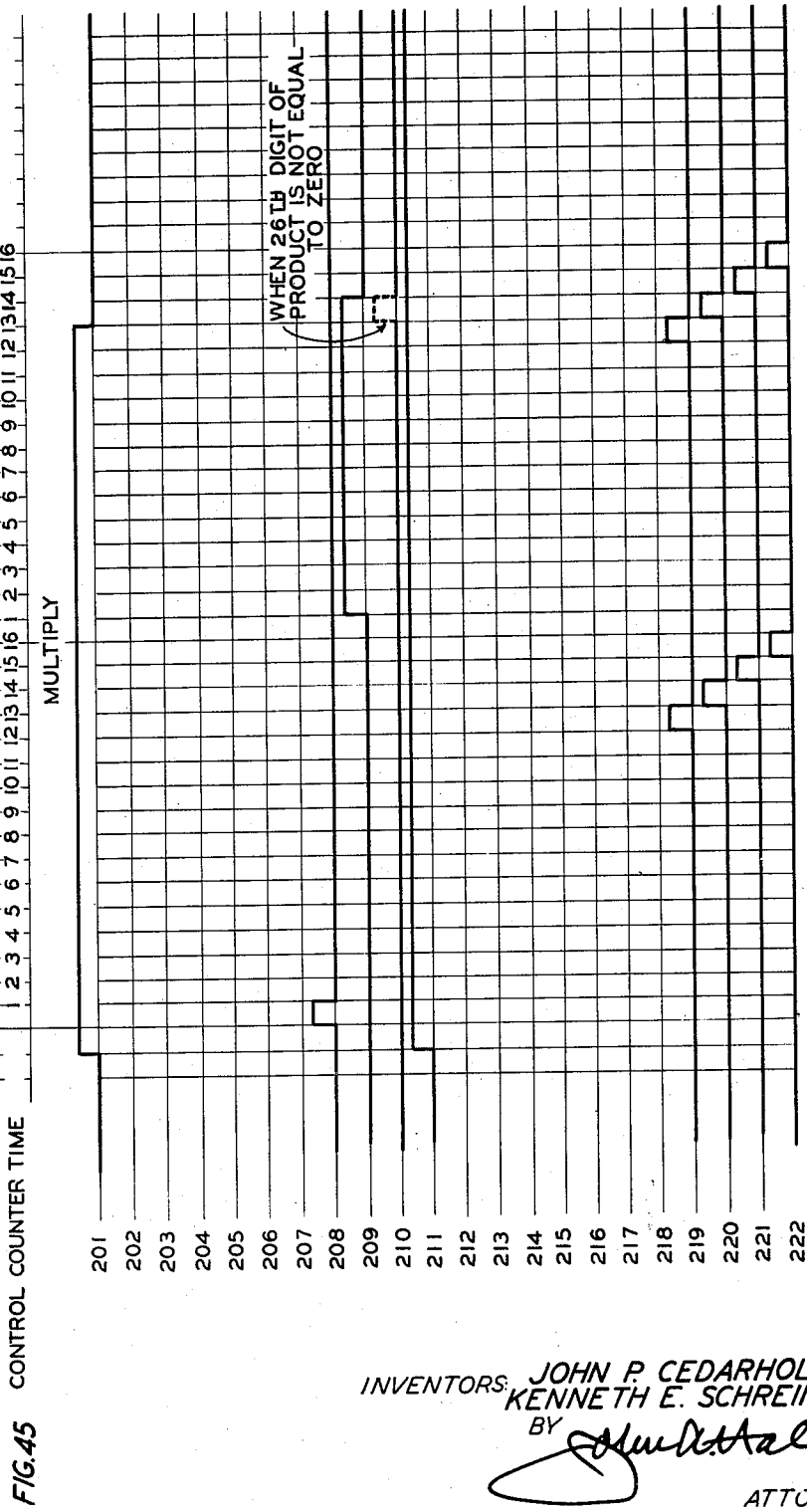

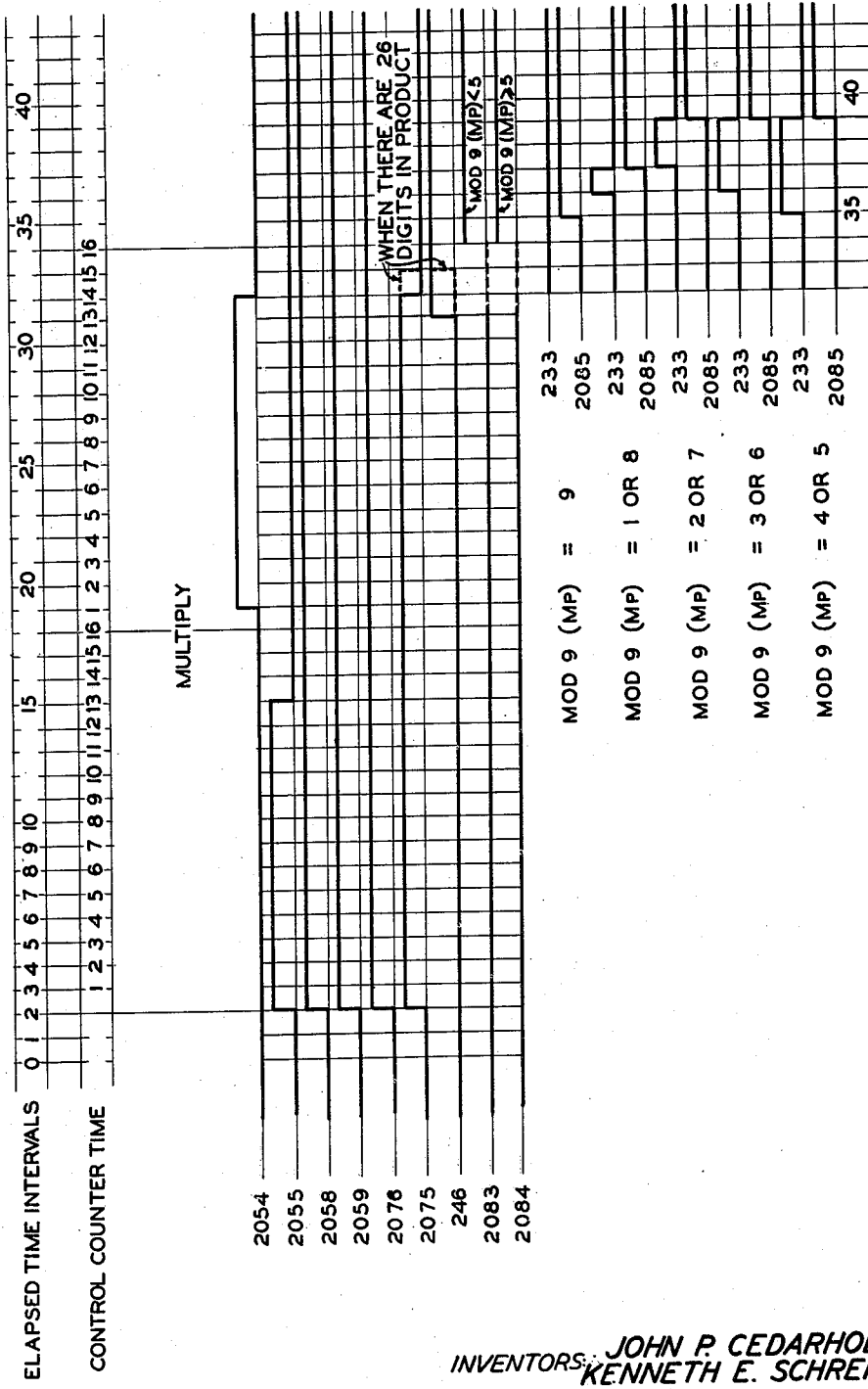

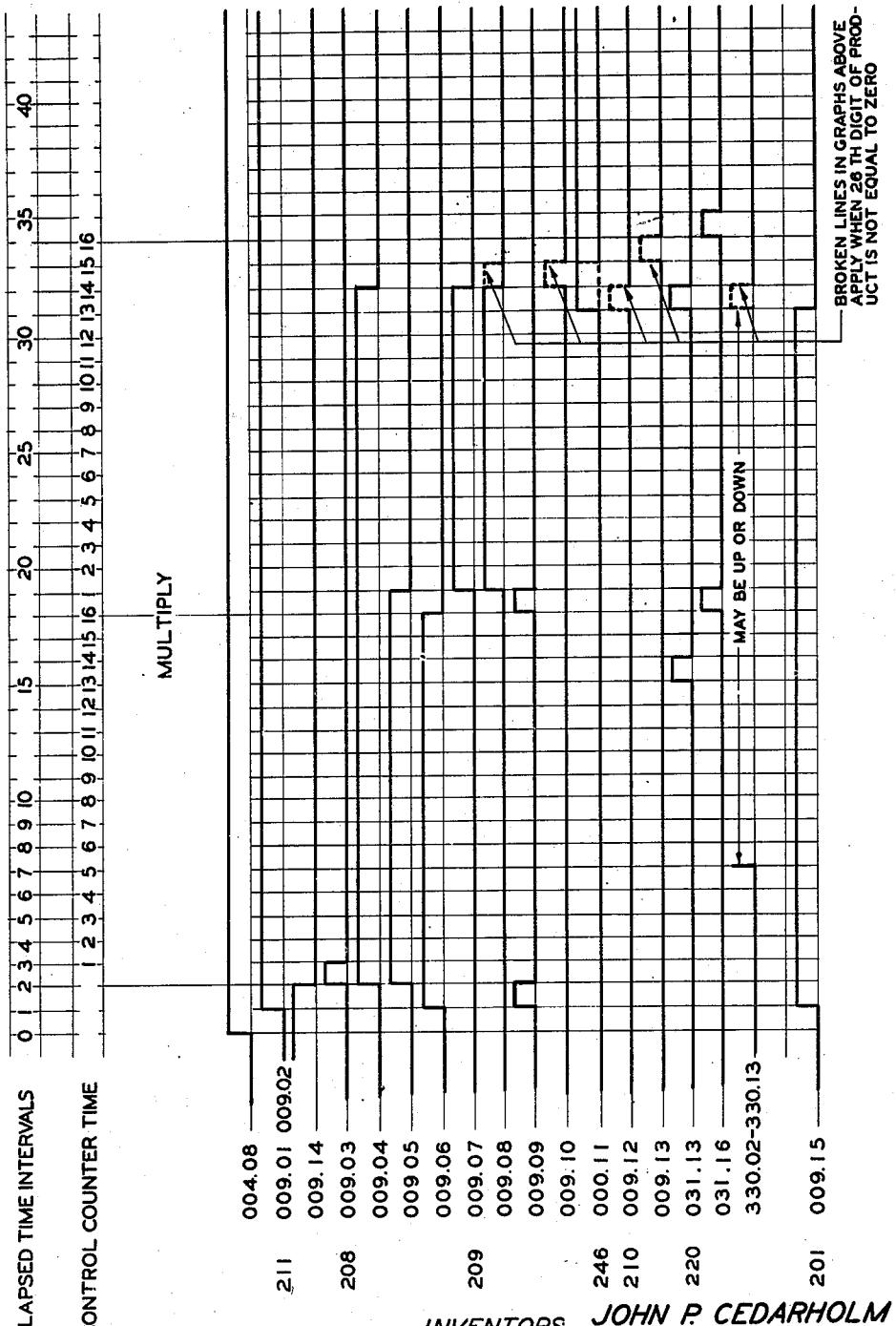

United States Patent Office 2,837,278
Patented June 3, 1958

2,837,278

CHECKING CIRCUIT

Kenneth Eugene Schreiner, Harrington, N. J., and John Perry Cedarholm, New York, N. Y., assignors to International Business Machines Corporation, New York, N. Y., a corporation of New York Application November 23, 1954, Serial No. 472,098

4 Claims. (Cl. 235—61)

This invention relates to high speed digital calculators.

The object of the invention is to provide means for checking the validity of an arithmetical operation in a digital calculator. Since all multi-digit decimal numbers can be expressed or represented by their modulo nine values which are in the form of single digits and since these single digit numbers will submit to the same arithmetical operations and will produce logical results, this fact is employed herein to make a check of the validity of an operation.

It has been conventional in calculators to perform an arithmetical calculation twice and to compare the two results as a check for accuracy. Herein the arithmetical calculation is performed but a single time, the modulo nine values of the operands and the result are then calculated and the said modulo nine values are then subjected to a like arithmetical operation, whereupon a logical result obtained, is assumed to reflect a valid and accurate original operation. Experience has proved that this assumption is reliable particularly where a single error is extremely rare and where it would take two errors simultaneously occurring and which, moreover, would have to fortuitously complement each other to produce a seemingly logical but truly inaccurate result.

The modulo nine computer, then, used as an adjunct to the principal calculator, acts as a check and produces a satisfaction signal which is fed back to the principal calculator as a signal to proceed, or, alternatively and upon the failure to produce such a satisfaction signal, acts to stop further operations.

In accordance with the present invention, the operands and the result are each transmitted digit by digit sequentially to a modulo nine computer where the sum of the digits is produced by accumulation. However, during this accumulation any decimal carries produced are immediately reintroduced into the single digit accumulator to produce the modulo nine number of the said sum of the digits.

A feature of the invention is a method of calculating the number modulo nine value of a multi-digit decimal number which consists of successively summing the digits thereof and simultaneously entering into the array of addends for each summing operation, as an additional addend, a decimal carry produced by an immediately preceding summing operation.

Storing means are provided for temporarily storing the modulo nine numbers of each of the operands and the result until all are calculated whereupon these numbers are then subjected to a calculation routine aimed at comparing the modulo nine numbers of the operands with the modulo nine number of the result, whereupon an expected standard result will be achieved and used as a satisfaction signal or, alternatively, a result deviating therefrom which will be a signal to terminate further operations until the cause thereof may be investigated and rectified.

In accordance with this feature, latching means, comprising essentially an And circuit and a delay circuit placed in a ring are provided whereby so long as a control lead is active any bit delivered to the delay circuit during calculation will, in a way of speaking, circulate in this ring until employed or released by the release of said control. By such latching means, the modulo nine values may be stored until used.

The invention consists of three such modulo nine accumulators, one for each of the operands and one for the result. These operate independently and simultaneously and each produces the modulo nine value of the multi-digit number transmitted thereto by the unique method of accumulation involving the immediate feed back of any decimal carries produced. Thereafter the three modulo nine values, each a single digit decimal number, are subjected to an arithmetical operation corresponding to that performed on the original multi-digit numbers in the main calculator, with the expectation of producing from these three single digit numbers a digit nine.

Another feature of the invention is the production of the decimal digit nine expressed in binary notation as a satisfaction signal. Where the original calculation consisted of the summing of an augend and an addend, the sum of the modulo nine values of these two operands or the modulo nine value of such sum should equal the modulo nine value of the result. Therefore, if the modulo nine values of the operands are both subtracted from the modulo nine value of the result, the end result should be zero. However, for certain mathematical reasons, this comes out to be nine which is strictly equivalent to zero since it is actually the nines complement of the modulo nine number zero. Since in mechanical calculation subtraction is performed by addition of complements, the result here appears as a complement.

Another feature of the invention is the use of a single digit modulo nine accumulator for comparing the modulo nine number of the result with the modulo nine number of the operands, with the expectation of producing a nine as the end result. While 0 is a valid modulo nine number, it will never appear as a final result but instead will invariably appear as a 9. The production of a nine, therefore, by a modulo nine accumulator will constitute a satisfaction signal.

Another feature of the invention is the detection and use of a multiple of the number nine as a satisfaction signal. It has been stated hereinbefore that in the process of accumulation whenever a multi-digit decimal number is produced by accumulation that the decimal carry is immediately reentered as another addend so that the accumulation will be expressed in the form of a single digit number. However, time may be saved if the result can be accurately anticipated. It will be noted that the sum of the digits of any multiple of nine is nine. Where, as in the present accumulator, the greatest two digit multiple of nine that can be produced is 18, then means is provided to detect this number and use it as a satisfaction signal even before the two digits 1 and 8 are summed to produce the value 9 as the said satisfaction signal. Thus at least one time interval may be saved.

When a problem in subtraction is performed a negative result, coming from the subtraction of a larger number from a smaller number, is expressed as a complement of the positive number which would have resulted had the smaller number been properly subtracted from the larger number. It is known that when subtraction is performed (mechanically) that the number being subtracted is expressed as a complement and added to the other. However, the true ten's complement is not used and so a carry is produced which is termed the fugitive one and this has to be reentered in order to produce the proper result. By way of example, suppose the operation

555—521=034 is performed mechanically. This would take the form $$555 + 478 = 1033$$

whereupon the fugitive one would be returned to its proper place by the operation $$033 + 1 = 034$$

In accordance with the present invention, where an attempt is made to subtract a larger number from a smaller, this fugitive one will not appear, and this failure will be used as a signal. Thus if an attempt is made to subtract 555 from 521, the operation would become $$521 + 444 = 965$$

and since no carry (the fugitive one) is produced, this will constitute a signal in the main calculator to process this result by passing it through a nines complement generator to produce 034, the result which should have been obtained had the proper subtraction operation been performed.

Further, in accordance with the present invention, the control is such that when operand 1 is detectably larger than operand 2, then the modulo nine check is made by adding to the modulo nine value of the result, the nine's complement of the modulo nine value of operand 1 and the modulo nine value of operand 2 with the expectation of producing a nine as a satisfaction signal. On the other hand, if operand 2 is detectably larger than operand 1 then the modulo nine check is made by adding to the modulo nine value of the result, the modulo nine value of operand 1 and the nine's complement of the modulo nine value of operand 2, again with the expectation of producing a nine as a satisfaction signal. However, if there is no detectable difference between these two operands then it will be assumed that operand 1 is the greater so that if operand 2 is in fact the greater the result will be a complement as above stated and the modulo 9 check will fail. In this case, the failure to produce the fugitive one carry as above stated will serve as an indication in the main calculator with the result that the result actually attained will be converted. Thus a conversion cycle is signalled. In this cycle the modulo nine value of the result is recalculated and the normal combining of the three modulo nine values is reversed so that now (even though it had been assumed that operand 1 was the larger) the sum of the modulo nine value of the (converted) result, the modulo nine value of operand 1 and the nine's complement of the modulo nine value of operand 2 is calculated with the expectation of producing a nine as a satisfaction signal.

Thus means is provided responsive to the calculation of a negative result to convert such result to its true value to suppress the result of the modulo nine check being made and to reperform such modulo nine check using the previously calculated modulo nine values of the two operands but a newly calculated value of the result.

A feature of the invention may therefore be stated as means responsive to an attempt to subtract a larger number from a smaller number for automatically converting the result attained to its nine's complement and entering said converted number to the modulo nine computer to be compared to the difference between the modulo nine values of the two operands previously transmitted thereto.

Another feature of the invention may be stated as means responsive to an attempt to subtract a larger number from a smaller number for calculating the modulo nine value of the true difference between said numbers and for comparing it with the modulo nine value of the larger number lessened by the modulo nine value of the smaller number.

Further in accordance with the present invention problems in multiplication and division are checked by multiplication and by division operations performed with the modulo nine values of the two operands and of the result. To aid in these operations, a unique array of delay circuits responsive to a single interval display of a multiplier (or a divisor) to generate a controlled series of time intervals for the iterative addition operations corresponding in number to the value of the said multiplier, is provided. Thus, when, by way of example, the modulo nine value of a multiplier is 3 (or its nine's complement 6) upon the display of the value 3 within a single time interval a signal corresponding to this time interval is applied to the inputs of three delay circuits whereby the output of the first will then be applied to the output of the second and that in turn to the third. In this manner three successive time interval signals will be generated and each will operate to apply the modulo nine value of the multiplicand (or its nine's complement) to an accumulator. The problem in division, as will be understood, is essentially the same.

Other features will appear hereinafter.

The drawings consist of twenty-four sheets having fifty figures, as follows:

Fig. 1 is a schematic circuit diagram showing the essential connections of an And circuit;

Fig. 2 shows the symbol for an And circuit used hereinafter in the logical diagram, Figs. 26 to 34 inclusive;

Fig. 3 is a schematic circuit diagram showing an And-CF circuit, one in which the And circuit works into a cathode follower circuit;

Fig. 4 shows the symbol used for the circuit of Fig. 3;

Fig. 5 is a schematic circuit diagram showing the essential connections of an Or circuit;

Fig. 6 shows the symbol used for the circuit of Fig. 5;

Fig. 7 is a schematic circuit diagram showing an Or-CF circuit, one in which the Or circuit works into a cathode follower circuit;

Fig. 8 shows the symbol used for the circuit of Fig. 7;

Fig. 9 is a schematic circuit diagram showing a typical cathode follower circuit;

Fig. 10 shows the symbol used for the circuit of Fig. 9;

Fig. 11 is a schematic circuit diagram showing an inverter circuit;

Fig. 12 shows the symbol used for the circuit of Fig. 11;

Fig. 13 is a schematic circuit diagram of an Or-Inv circuit, that is, an inverter circuit driven by an Or circuit;

Fig. 14 shows the symbol used for the circuit of Fig. 13;

Fig. 15 shows the symbol used for a delay circuit fully disclosed in Patent Re. 23,699 and elsewhere;

Fig. 16 shows the symbol used for a nine's complement generator;

Fig. 17 is a schematic circuit diagram of a nine's complement generator;

Fig. 18 shows the symbol used for a four pole, two position switch;

Fig. 19 is a schematic circuit diagram showing the interconnections of certain logical And and Or circuits to form a switching means equivalent to a four pole two position switch;

Fig. 20 shows the symbol used for a binary bit adder;

Fig. 21 is a schematic circuit diagram showing the interconnections of certain logical circuit components to constitute an adder symbolized in Fig. 20;

Fig. 22 is a symbol of a rationalizer;

Fig. 23 is a schematic circuit diagram composed mostly of logical circuit symbols showing a latch;

Fig. 24 is a schematic circuit diagram again composed mostly of logical circuit symbols of a modulo nine accumulator, also spoken of hereinafter as an evaluator latch;

Figure 25:
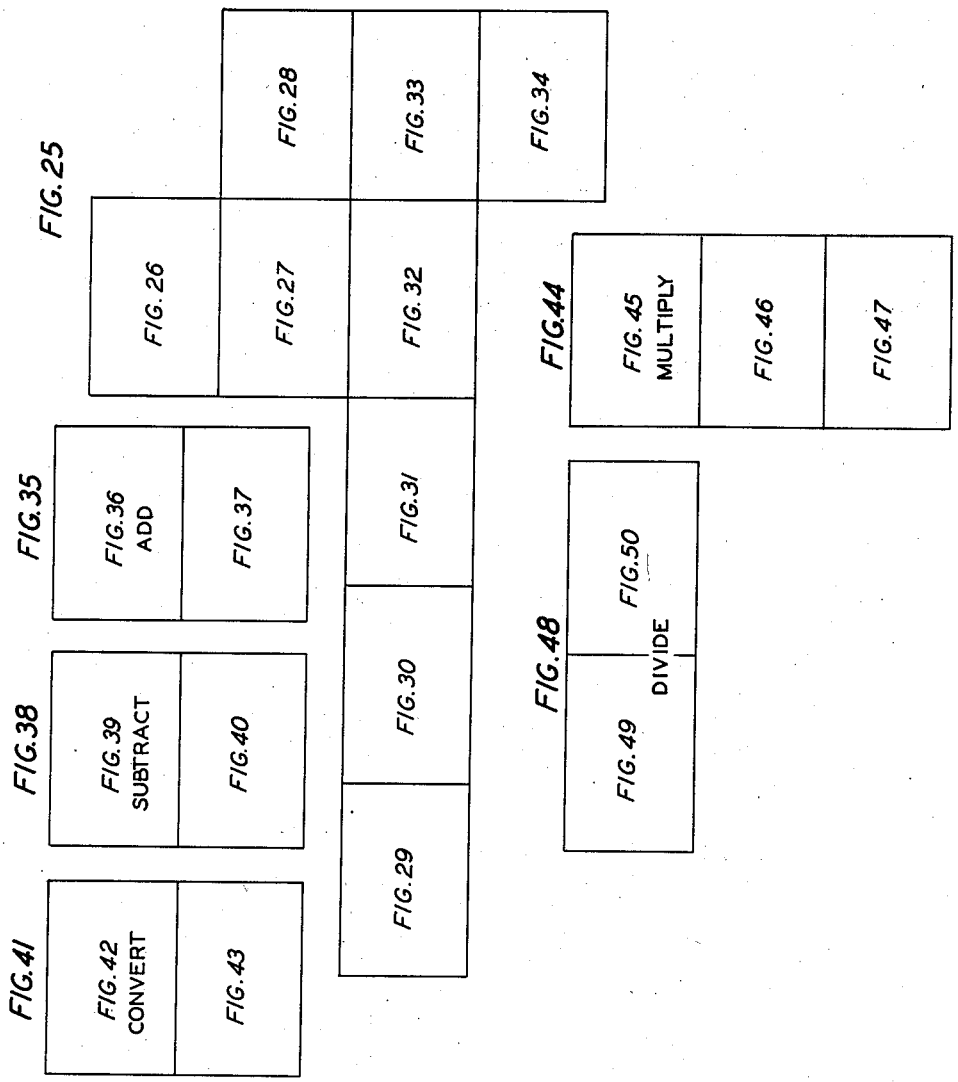
Fig. 25 is a block diagram showing how Figs. 26 to 34 inclusive may be placed to form a complete logical diagram of a modulo nine computer, comprising three modulo nine accumulators and the various control circuits therefor.
Figure 26:
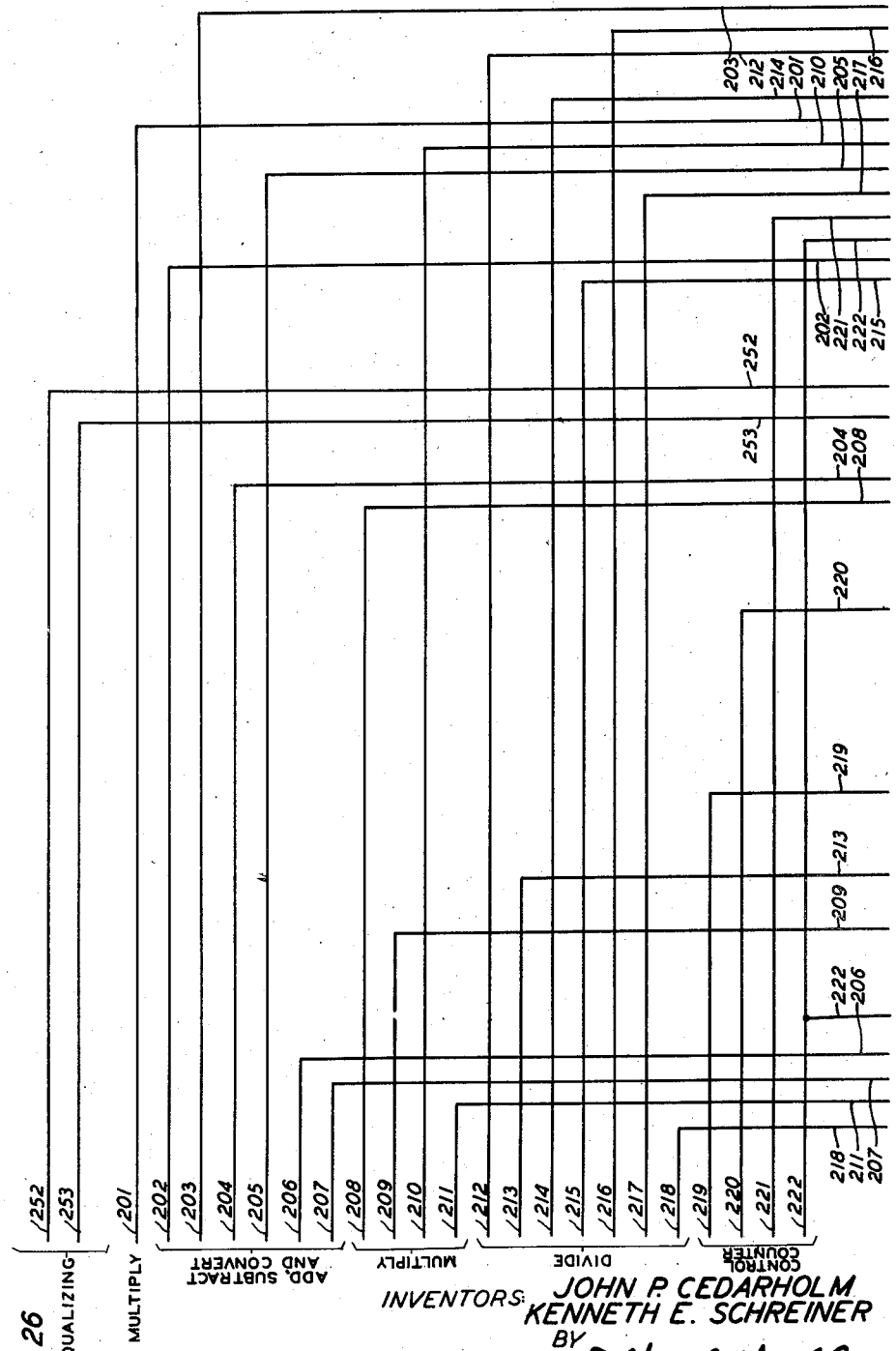
Figure 36:
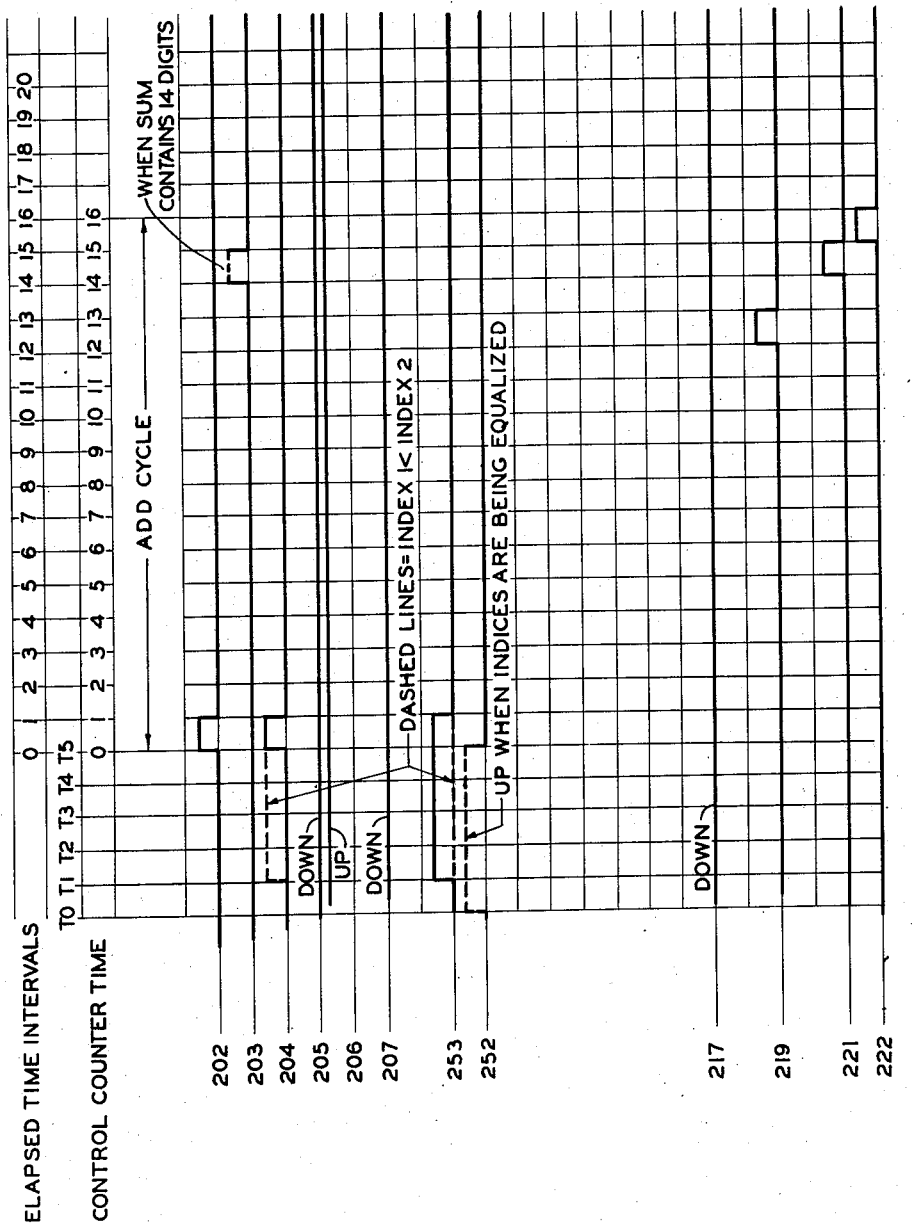
Figure 37:
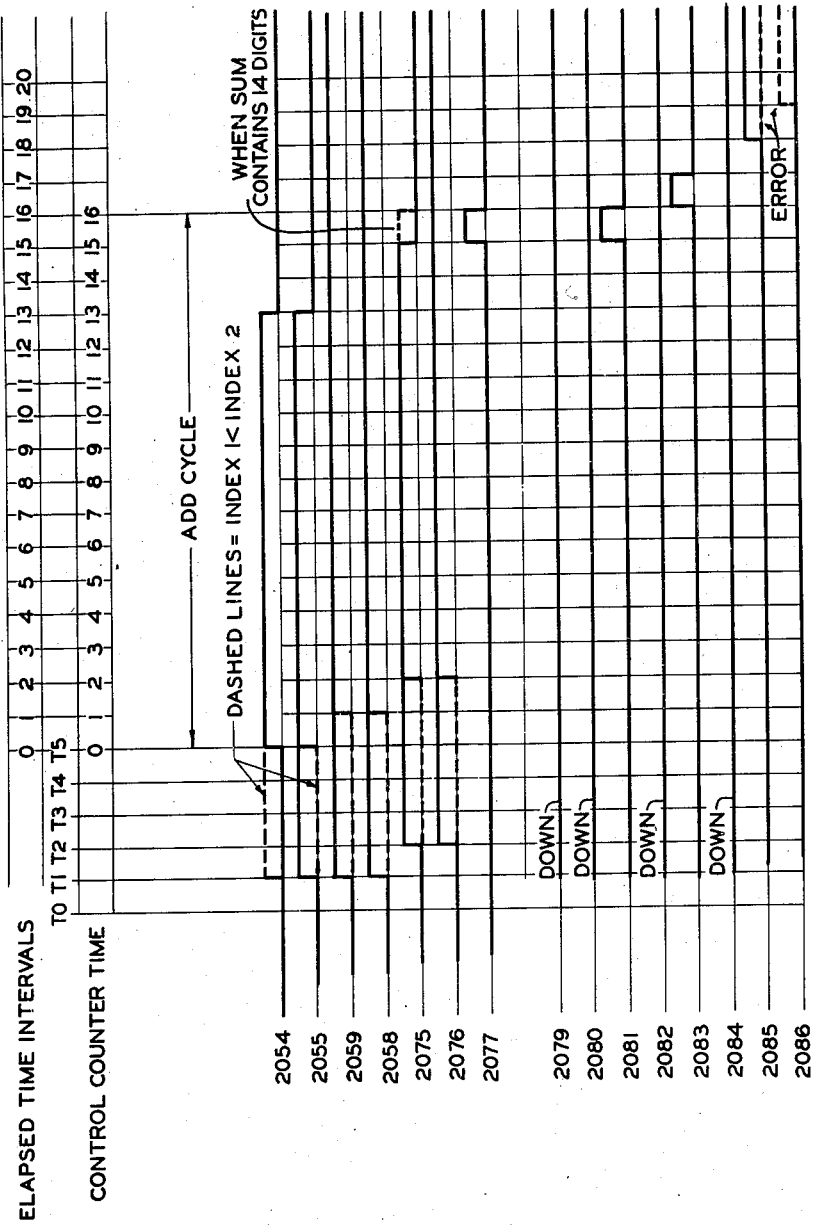
Figure 42:
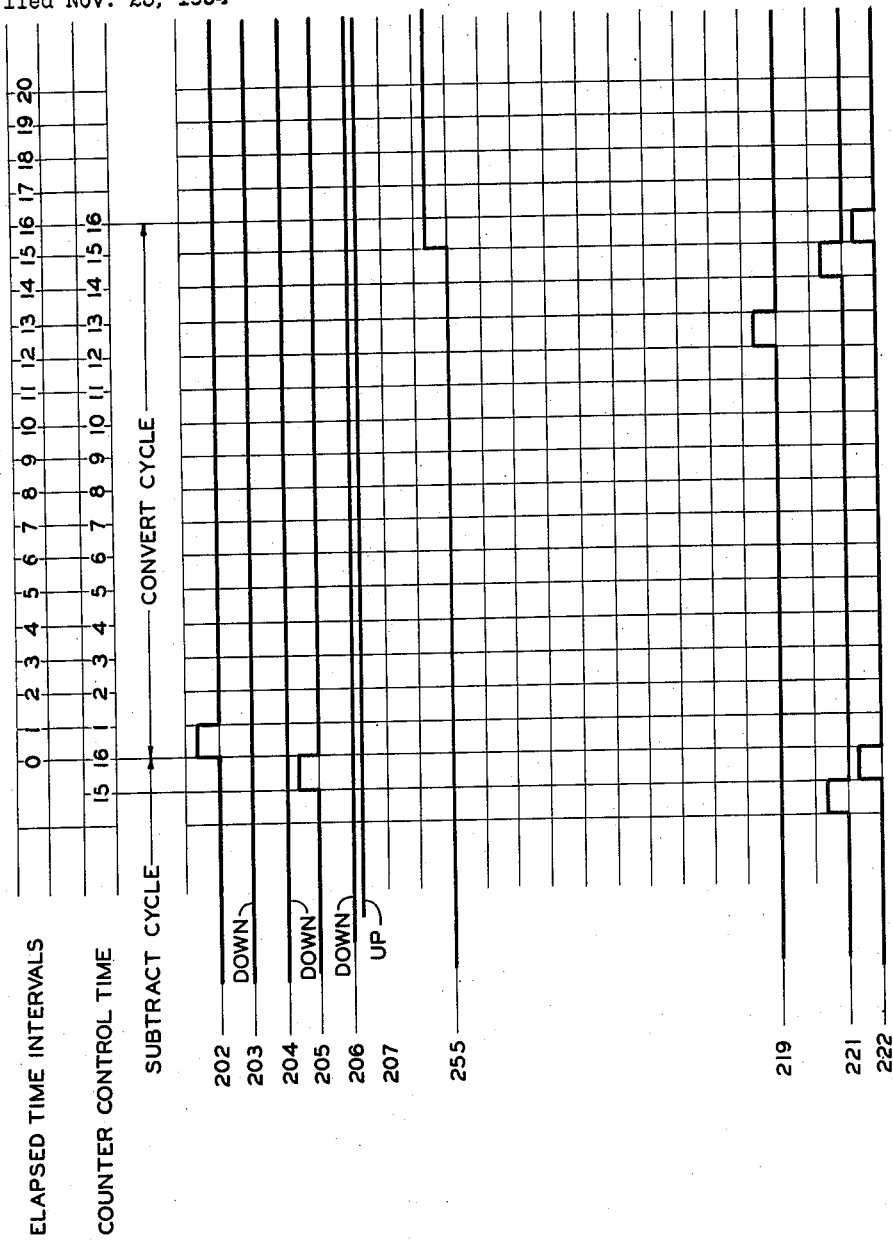
Figure 43:
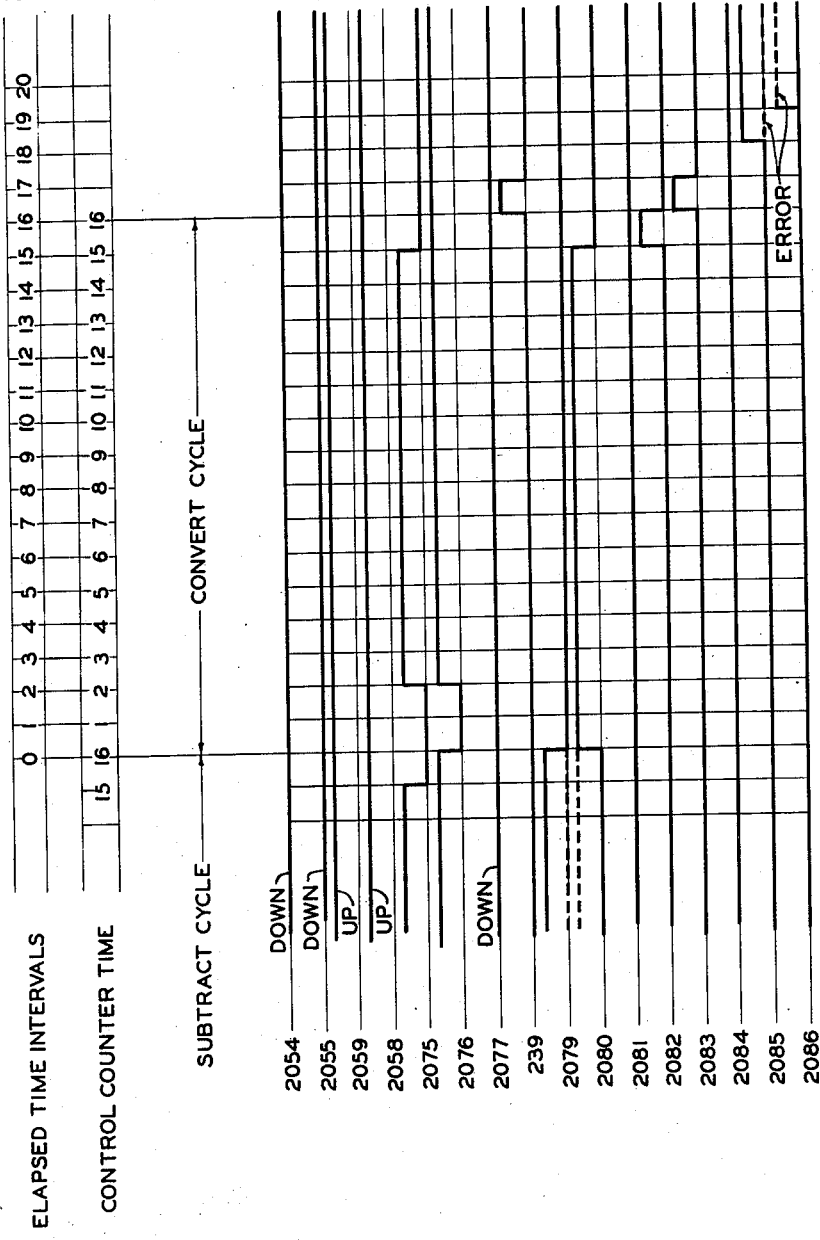
Figure 49:
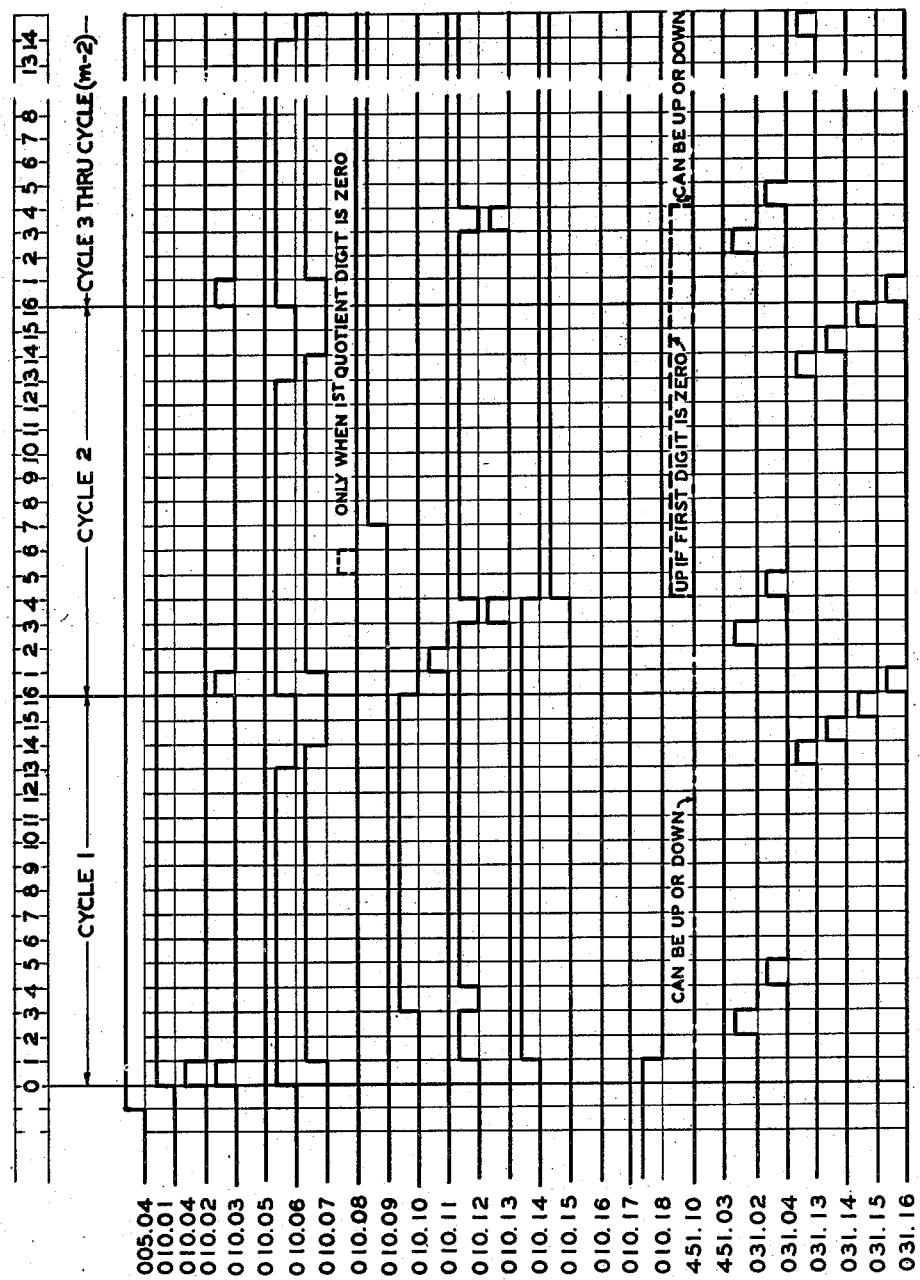
Figure 50:
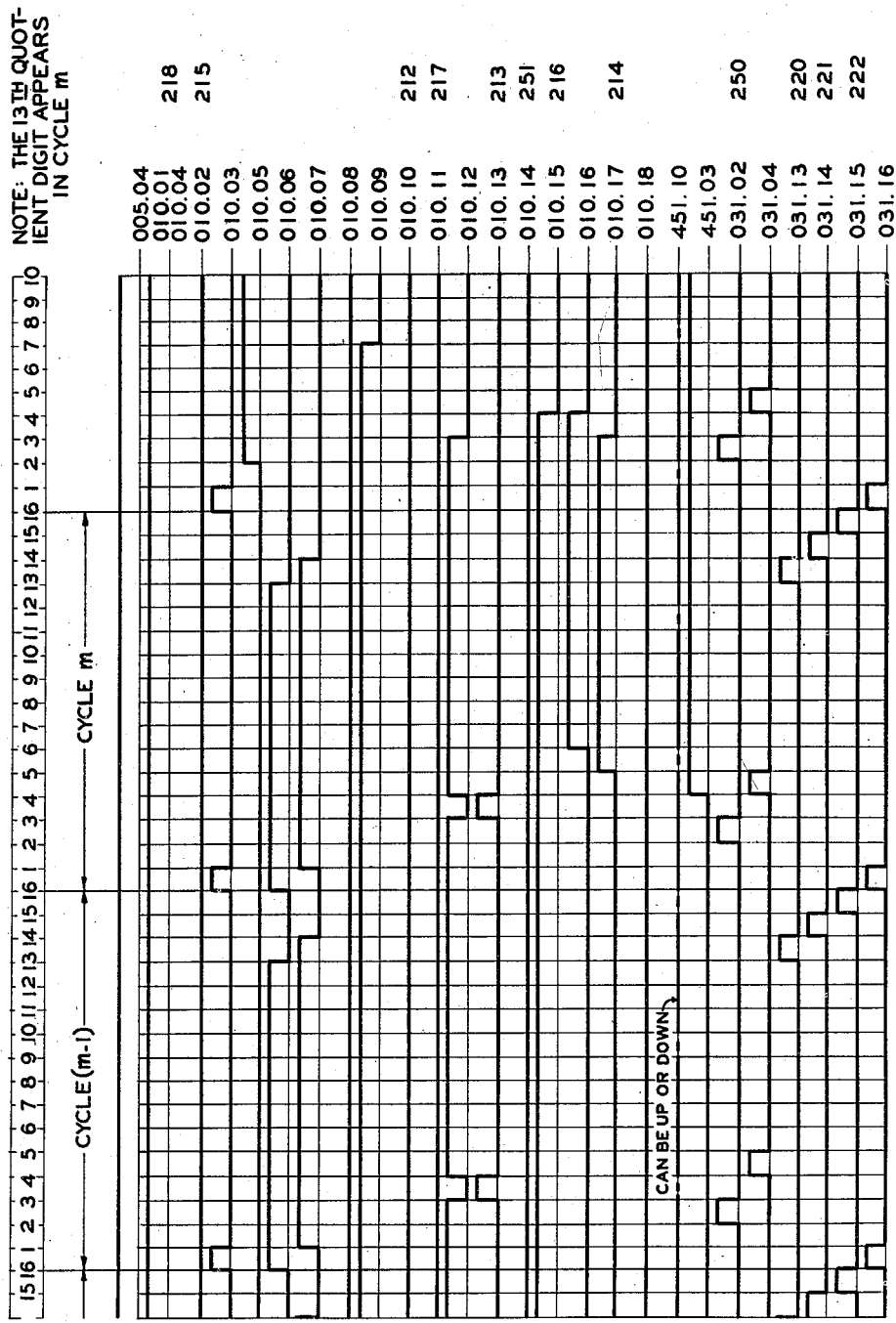

Figs. 26 to 34 inclusive are each various sections of the complete logical circuit diagram of Fig. 25;

Fig. 35 is a block diagram showing how Figs. 36 and 37 may be placed to form a timing chart depicting operations during a problem of addition, the graphs of Fig. 36 being aligned with the terminals of Fig. 26 and the graphs of Fig. 37 showing operations at other points mostly within the circuitry of Figs. 26 to 34 inclusive, these graphs constituting facts which must be taken as stated in substitution for the detailed circuitry of the main calculator and its maze of control circuits;

Fig. 38 is a block diagram showing how Figs. 39 and 40 may be placed to form a timing chart depicting operations during a problem of subtraction, the graphs of Fig. 39 being aligned with the terminals of Fig. 26 and the graphs of Fig. 40 showing operations at other points mostly within the circuitry of Figs. 26 to 34 inclusive, these graphs likewise constituting facts;

Fig. 41 is a block diagram showing how Figs. 42 and 43 may be placed to form a timing chart depicting a conversion operation following a problem in subtraction when a failure to produce a satisfaction signal may only mean that a complementary value has been produced;

Fig. 44 is a block diagram showing how Figs. 45, 46 and 47 may be placed to form a timing chart depicting operations during a problem in multiplication, the graphs of Fig. 45 being aligned with the terminals of Fig. 26 and the graphs of Figs. 46 and 47 showing operations at other points mostly within the circuitry of Figs. 26 and 34 inclusive; and Fig. 48 is a block diagram showing how Figs. 49 and 50 may be placed to show four and represent many more cycles during each of which one quotient digit is calculated and entered into the modulo nine computer, none of these graphs being aligned with the terminals of Fig. 26 but being clearly designated so that their application to such terminals will be at once apparent.

In the following description certain terms are used and many basic circuit components are mentioned. By way of explanation the following prior art disclosures are set forth and reference is made thereto for a complete description of any given circuit and the manner of its operation.

Patent Re. 23,699, August 18, 1953, issued to B. L. Havens for a Pulse Delay Circuit. Application Serial Number 338,122, February 20, 1953, filed by Byron L. Havens and Charles R. Borders for a Serial-Parallel Binary-Decimal Adder. Application Serial Number 470,160, filed November 22, 1954, by Byron L. Havens, for an Electronic Multiplier.

A bit is a binary item, that is, a signal indicating a 1 in the binary code of 0 and 1. The four consecutive binary orders, reading from right to left, represent the decimal digits 1, 2, 4 and 8 and the sum of these values as represented by the bits expressed in any binary code equals the value of the decimal digit represented thereby. A bit is therefore a single binary item in a code which is used to express or convey a given amount of information.

The binary-decimal system is one in which the decimal digits of a number are each separately expressed in a pure binary code. Thus a code 1001, having an 8 bit and a 1 bit, expresses the decimal digit 9. It will appear hereinafter that any other number, higher in value than 9 will be expressed by more than one such binary code, that is, a separate binary code for each digit, as for example, 0100, 0101, 1001, for the decimal number 459.

A time interval is one microsecond. A time interval may, of course, be of any convenient value but the circuits of the present invention have been constructed and arranged to operate on a megacycle basis. It may be particularly noted that the delay circuit disclosed in both the Havens patent and in the Havens et al. application have been constructed and arranged to receive a pulse on an input terminal during one time interval and to deliver a like pulse on an output terminal during a succeeding time interval one microsecond later.

Up and Down refer to potentials. In this electronic maze, each component, such for instance as a tube circuit, is arranged to be active when the potential on its control conductor is Up and inactive when such potential is Down. Generally, as in a cathode follower circuit, when the potential on an input terminal is Up the potential on the output terminal is Up and likewise when the potential on an input terminal is Down the potential on the output terminal is Down. It may be stated, merely by way of example, that a potential of plus 5 volts or more will constitute an Up condition and a potential of minus 30 volts or less will constitute a Down condition. Up means that the voltage present at a particular point is positive with respect to ground and Down means that the voltage present is negative with respect to ground. If the control grid of a vacuum tube is referred to as Down, it means that the voltage at that control grid is below the cutoff value of the vacuum tube.

Numerous coincidence circuits are employed herein. An And circuit refers to a circuit which is operable to produce an Up condition on its output terminal only when all of its input terminals are Up. An Or circuit refers to a circuit operable to produce an Up condition on its output terminal when any one or another or more of its input terminals are Up.

An And circuit is shown in Fig. 1. Here a connection is made between a source of positive potential, B+, through a resistor 1 to an output terminal 2. Also connected to the output terminal there are two (or more) input branch circuits each including a diode such as the diode 3 in the circuit to the input terminal 4. In use, the input terminals are connected to circuits which may be either Up or Down. Since there is little difference in potential between the two terminals of the diode the output terminal must remain Down so long as any one input terminal is Down, due to the drop of potential in the resistor 1. Only when all the input terminals are Up may the output terminal be Up.

In the logical diagram forming the main part of the present disclosure an And circuit is shown as a rectangle about the designation And and having a plurality of input terminals and a single output terminal as in Fig. 2.

A cathode follower circuit is a tube circuit having its anode firmly tied to a positive potential source. In Fig. 9 the tube 5 is shown having a connection from its anode through a decoupling circuit to a source B+, the decoupling circuit consisting of a series resistor 6 and a shunt circuit including a condenser 7 to ground. The control grid is connected through a parasitic suppressing resistor 8 to the input terminal 9 and the cathode is connected through a series of voltage dividing resistors 10 and 11 to a negative potential source B—. The output terminal 12 is connected to this series circuit between the resistors 10 and 11. Normally the input is Down and the tube is non-conducting, whereby the output terminal is Down. If the input terminal 9 is driven Up, the tube is rendered fully conducting and the potential of the output terminal 12 rises to Up. Such a cathode follower circuit is used for isolation purposes or as a current driving unit where a particular signal source cannot supply the necessary current. It is represented in the logical diagram as CF enclosed in a rectangle and having a single input and a single output lead as shown in Fig. 10.

A combination of an And circuit and a cathode follower circuit as represented in Fig. 4 is shown in Fig. 3. It is believed that the operation of this circuit after the description of the circuits of Figs. 1 and 9 will be clear. The output of the And circuit is connected through a parasitic suppressing resistor 13 to the control grid of the tube 14, so it will be clear that the output 15 will only be Up when all the inputs 16 and 17 are Up.

An Or circuit is shown in Fig. 5, consisting essentially of a connection between the output terminal 18 and a negative potential source B— through a pull down resistor 19. Normally a plurality of input terminals connect with the output terminal each through a diode such as the input terminal 20 connected through the diode 21. The potential of the output terminal 18 can be no higher than the potential of the highest of the input terminals and so if all are Down the output terminal will be Down. However, if any one (or more) of the input terminals is driven Up then the output will likewise go Up. Due to the diodes, the fact that one input terminal may go Up does not affect another or is not affected by such other. Such an Or circuit is represented in the logical diagram as shown in Fig. 6.

In the same manner that an And circuit may be combined with a cathode follower circuit, so may an Or circuit be combined, as shown in the schematic circuit diagram of Fig. 8. Here the two inputs 22 and 23 work into an output 24 which is connected through a parasitic suppressing resistor 25 to the control grid of the tube 26. Upon the movement to Up of either one or the other of the inputs the output 27 will follow Up. This circuit is represented in the logical diagram as shown in Fig. 7.

The invention utilizes numerous dual-type tubes having two sections in a single envelope. Each such section is referred to herein as a tube and designated by a number followed by the letter L or R or simply by the letters L and R to indicate the left-hand or right-hand tube section respectively. A tube so referred to is similarly designated thereafter if employed with the same immediate circuitry and for the same purpose even though it is not shown with its corresponding L or R tube.

Such a tube is shown in the schematic circuit diagram of Fig. 11 in which an inverter is depicted. An inverting circuit is one in which an Up condition on the input terminal produces a Down condition on the output terminal and likewise where a Down condition on the input terminal produces an Up condition on the output terminal. In Fig. 11 the input terminal 28 is connected through the parasitic suppressing resistor 29 to the control grid of tube 30L. If this input terminal is Up, the grid of tube 30L is Up, thereby rendering this tube fully conductive. The anode of tube 30L is connected through the anode load resistor 31 and the resistor 32 of a decoupling circuit to the B+ source of positive potential. Connected between the anode of tube 30L and the B— terminal are the voltage dividing resistors 33 and 34. The anode of tube 30L is coupled to the grid of tube 30R through the resistor 33 shunted by a frequency compensating coupling capacitor 35. Since tube 30L is fully conductive, its anode is Down, causing the grid of tube 30R to be Down, whereupon the tube 30R becomes practically nonconductive. Because tube 30R is operating as a cathode follower, the output terminal 36, which is connected to its cathode, will be Down. Whenever the input terminal 28 is Down, the inverting tube 30L will be cut off, thereby causing its anode to be at B+ potential. The action of the voltage dividing resistors 33 and 34 causes the grid of cathode follower tube 30R to be Up so that the output terminal 36 is also Up. Fig. 12 illustrates a block diagram representation of the circuit of Fig. 11 which will be used in the logical diagram hereinafter.

Frequently, a logical element is required which comprises a diode Or circuit driving an inverter. Such a circuit is termed an Or-inverter circuit, is represented as in Fig. 14, and is constructed and arranged as shown in the schematic circuit diagram of Fig. 13. Here the output terminal 37 of the diode Or circuit (as in Fig. 5) is connected to the input terminal of the inverter circuit (as in Fig. 11). When all the input terminals 38 and 39 are Down, the output terminal 40 is Up. However, by causing either input terminal 38 or input terminal 39 or both of them to be Up, the output terminal 40 is made to go Down.

One of the important circuit components used herein is the delay circuit depicted in its block diagram form in Fig. 15. Since the operation of this circuit is fully disclosed both in the Havens Reissue Patent Re. 23,699 and in the Havens et al. application hereinbefore identified, no detailed description thereof is believed to be necessary here.

Another important circuit component is a nine's complement generator depicted in Fig. 16 in the block form used in the logical diagram and shown in the form of a schematic circuit diagram in Fig. 17.

The nine's complement generator receives information, in binary decimal form, a decimal digit at a time and presents the nine's complement thereof in binary decimal form at its output terminals. For example, a decimal 3 is applied to the input terminals as 0011. This causes 0110 or 6 (the nine's complement of 3) to be presented at the output terminals. An analysis of Table I below is essential to an understanding of the nine's complement generator shown in Fig. 17.

TABLE I

*Conversion of a decimal digit to its nine's complement*

| Decimal Digit | Binary-decimal system | Nine's complement in binary-decimal system |
| --- | --- | --- |
| 0 | 0000 | 1001 |
| 1 | 0001 | 1000 |
| 2 | 0010 | 0111 |
| 3 | 0011 | 0110 |
| 4 | 0100 | 0101 |
| 5 | 0101 | 0100 |
| 6 | 0110 | 0011 |
| 7 | 0111 | 0010 |
| 8 | 1000 | 0001 |
| 9 | 1001 | 0000 |

In Table I each decimal digit 0–9 inclusive is written in the binary-decimal system opposite the showing of that decimal digit. The nine's complement of each decimal digit written in the binary-decimal system is similarly shown. Hence, by inspection of the binary decimal representation for each digit and the binary decimal representation of its nine's complement the changes necessary in the binary bits representing the digit to produce the nine's complement thereof may be determined. A study of these two binary decimal representations, produces the five rules following:

(1) In converting a digit to its nine's complement, the 1 bit always changes value. This is to say that a binary 1 is changed to a binary 0 and that a binary 0 is changed to a binary 1. This is obvious by inspection of the extreme right-hand column of the binary decimal representations.

(2) The 2 bit never changes value when a digit is converted to its nine's complement. This is indicated by inspection of the second binary column from the right in each binary decimal representation.

(3) If both the 2 bit and the 4 bit (second and third columns), or if neither of them is present in the digit the complementary value does not contain a 4 bit. For example, decimal digit 6 is represented as 0110 in the binary-decimal system. Its nine's complement or 3 is represented as 0011. The 6 includes a 2 bit and a 4 bit and its complement 3 does not include a 4 bit. As a further example, decimal digit 1 is represented as 0001 in the binary-decimal system and its nine's complement or 8 is represented as 1000. The binary-decimal representation of 1 includes neither a 2 bit nor 4 bit and the binary representation of its complement 8 does not include a 4 bit.

(4) If either the 2 bit or the 4 bit (but not both) are present in the binary-decimal representation of a digit, a 4 bit will be present in its nine's complement. For example, the decimal digit 2 is represented as 0010 in the binary-decimal system and its nine's complement or 7 is represented as 0111. Here a 2 bit is present in the binary-decimal representation of the decimal digit 2 and a 4 bit is present in the binary decimal representation of its complement 7. As a further example, the decimal digit 4 is written as 0100 in the binary-decimal system and its nine's complement or 5 is written as 0101 in the binary-decimal system. Here a 4 bit is present in the binary decimal representation of the decimal digit 4 and a 4 bit is present in the binary-decimal representation of its complement 5.

(5) An 8 bit is not present in the binary-decimal representation of the complement value if a 2 bit or a 4 bit or a 8 bit is present in the binary-decimal representation of the decimal digit from which the complement value is derived. The representation corresponding to the decimal digits 2, 4 and 8 of Table I illustrate this rule with reference to the 2, 4 and 8 bits, respectively. It is now seen that any circuit which receives information in the binary-decimal form, decimal digit by decimal digit, and effects operation in accordance with the above five rules, produces an output in the binary-decimal system representing the nine's complement of the input.

Such a circuit is shown in Fig. 17. Referring more particularly to this figure, the input terminals 41, 42, 44 and 48 receive information expressed in the binary-decimal system and provide the nine's complement thereof, in the binary-decimal system at the output terminals 51, 52, 54 and 58.

The terminal 41 receiving the 1 bit is connected through inverter 43 to the output terminal 51. If the input terminal 41 is Up the output terminal 51 is Down, and if the input terminal 41 is Down the output terminal 51 is Up. Hence, the value of the 1 bit is always changed and Rule 1 is satisfied.

The input terminal 42 is connected through cathode follower 45 to the output terminal 52. Hence, if input terminal 42 is Up output terminal 52 is Up and if input terminal 42 is Down output terminal 52 is Down. The 2 bit therefore never changes value and Rule 2 is satisfied.

By definition an exclusive Or circuit is any circuit having its output terminal Down when all its inputs are UP or when no input is Up and having its output UP if any one of its inputs is Up. It is seen that such a circuit performs the functions required by Rules 3 and 4. The And circuit 46, inverter 47, And circuit 49 and Or circuit 50 therefore comprise an exclusive Or circuit. The 2 bit terminal 42 and the 4 bit terminal 44 for receiving the 2 bit and 4 bit inputs, respectively, each comprise an input to the two-input And circuit 46 and the two-input Or circuit 50. If both a 2 bit and a 4 bit are present the terminals 42 and 44 are Up. Both inputs of And circuit 46 are therefore Up, the output of And circuit 46 connected to the input of inverter 47 is therefore Up, the output of inverter 47 is Down and the input of And circuit 49 connected to the output of inverter 47 is Down. The output of And circuit 49 and the output terminal 54 connected thereto are therefore Down. This means that a 4 bit is not present in the output and that the first requirement of Rule 3 is satisfied. If neither a 2 bit nor a 4 bit is present, the output of And circuit 46 is Down, the output of inverter 47 is Up, the corresponding input of And circuit 49 is Up. However, both inputs to Or circuit 50 are Down, the output of Or circuit 50 is Down and the input of And circuit 49 connected to the output of Or circuit 50 is Down. The output of And circuit 49 and the output terminal 54 are therefore Down, a 4 bit is not present in the output and the second requirement of Rule 3 is satisfied.

If a 2 bit is present in the input, the input terminal 42 is Up and the input of And circuit 46 and Or circuit 50 connected thereto are Up. The output of And circuit 46 is Down, the output of inverter 47 is Up and the input of And circuit 49 connected thereto is Up. Since one input of Or circuit 50 is Up the output thereof is Up and the corresponding input of And circuit 49 is Up. Since both inputs of And circuit 49 are Up the output of And circuit 49 and the output terminal 54 connected thereto are Up and a 4 bit is present in the output. If a 4 bit is present the input terminal 44 is Up (terminal 42 Down) the input of And circuit 49 connected to the output of inverter 47 is Up as was the case when the 2 bit was present and the 4 bit was absent. Similarly, the input of And circuit 49 connected to the output of Or circuit 50 is Up and the output terminal 54 is Up and a 4 bit is present in the output. A 4 bit is, therefore, present in the output when either a 2 bit or a 4 bit (but not both) are present in the input. The requirements of Rule 4 are, therefore, satisfied.

The input terminals 42, 44 and 48 are connected to supply the inputs to the three-input Or circuit 53 having its output connected to the input of inverter 55 which has its output connected to the output terminal 58. If either a 2 bit, a 4 bit, or an 8 bit is present the corresponding one of the terminals 42, 44 and 48 is Up. Hence, the output of Or circuit 53 is Up and the output of inverter 55 is Down. If neither a 2 bit, 4 bit, nor 8 bit is present in the input, the output of Or circuit 53 is down. The output of inverter 55 is Up and the output terminal 58 is Up. Hence, if neither the 2 bit, 4 bit, nor 8 bit is present in the input, an 8 bit, exhibited by output terminal 58 being Up, is not present in the output. This satisfies the requirements of Rule 5.

It is seen from the above that any decimal digit represented in the binary-decimal system applied at the input terminals produces the nine's complement thereof represented in the binary-decimal system at the output terminals.

Switches of various types and capacities are employed and each may be devised by simple combinations of And and Or circuits. By way of example, a four pole, two position switch is depicted in Fig. 18 and its schematic circuit details are shown in Fig. 19. Such a switch is similar in operation to a mechanical 4 pole-2 position switch, in that four inputs are applied to each of two groups of input terminals and the input of either may be applied to a single group of four output terminals. One group of input terminals includes the terminals 59, 60, 61 and 62 to which information in the binary-decimal system may be applied. The other group of input terminals includes the terminals 63, 64, 65 and 66 to which information in the binary-decimal system may be applied. The output terminals 67, 68, 69 and 70 receive the inputs from one group of the input terminals; i. e., either terminals 59–62 or terminals 63–66. The terminals 59 to 62 inclusive are connected to one input of the two-input And circuits 71, 72, 73 and 74 respectively and the input terminals 63 to 66 are connected to the one input of the two-input And circuits 75, 76, 77 and 78 respectively. The other input terminal of each And circuit 71, 72, 73 and 74 is connected to a control terminal 57 and the input terminal of each And circuit 75, 76, 77 and 78 is connected to a control terminal 56. Control terminals 57 and 56 are never Up simultaneously. If control terminal 57 is Up the outputs of the And circuits 71, 72, 73 and 74 will go Up in response to the presence of a bit at any one or more of the corresponding input terminals 59–62. The outputs of And circuits 71, 72, 73 and 74 are connected to one input of the Or circuits 79, 80, 81 and 82. Hence, if an output of any of the And circuits 71–74 goes Up, the output of the corresponding Or circuit goes Up, and the output terminals 67–70 connected to the output of that Or circuit goes Up. For example, if a bit is present at the input terminal 60 the output of And circuit 72 goes Up, the corresponding input to Or circuit 80 goes Up, the output of Or circuit 80 goes Up and the output terminal 68 goes Up. In this manner, the binary-decimal inputs present at the input terminal 60 are transferred to the output terminal 68. If the control terminal 57 is Down, the input of each of the And circuits 71, 72, 73 and 74 corresponding thereto is Down and the inputs applied to the input terminals 59-62 are prevented from reaching the output terminals 67-70.

If the control terminal 56 is Up the corresponding input of the And circuits 75, 76, 77 and 78 is Up. Hence, any bits present at the input terminals 63-66 cause the output of the corresponding And circuit to go Up. These And circuits are connecected to the other input of Or circuits 79, 80, 81 and 82 respectively. Hence, when the output of any of the And circuits 75, 76, 77 and 78 is Up, the input of the corresponding Or circuits is Up, so that the output terminals connected to the Or circuits go Up. For example, if a bit is present at the input terminal 65 the output of And circuit 77 goes Up, the corresponding input to Or circuit 81 goes Up, the output of Or circuit 81 goes Up and the output terminal 69 goes Up. In this manner, information in binary form present at the input terminals 63-66 is transferred to the output terminals 67-70. If the control terminal 56 is Down, the binary-decimal information present at the input terminals 63-66 is prevented from reaching the output terminals.

It is now clear that when control terminal 57 is Up the switch passes the binary-decimal information on the input terminals 59-62 to the output terminals and that when the control terminal 56 is Up the switch passes the binary-decimal inputs present at the input terminals 63-66 to the output terminals.

A most important component is an adder, here shown only in block form in Fig. 20. Such an adder is but one of four used in a complete adder, the four being known as the 1 bit adder, the 2 bit adder, the 4 bit adder, and the 8 bit adder respectively. Each has three inputs, two for bringing in the bits to be added and the third for bringing in a carry 1 bit. There are two outputs, one for an output bit and another for an output carry bit. In accordance with the principles of binary addition a single input bit will produce an output bit, two input bits will produce an output carry bit, and three input bits will produce both an output bit and an output carry bit.

The internal circuitry of the adder is not shown here since it appears in great detail in the said Havens et al. application. However, Fig. 21 is presented as a logical diagram of this fundamental component. Here an output carry terminal 89, an output terminal 90, and three input terminals 91, 92 and 93 are shown. An Or circuit 97 will respond to a bit on any one of the input terminals 91, 92 and 93 and if no more than one such input terminal is Up then the output of the inverter 100 is Up and consequently the And circuit 101 has its output Up to transmit a bit over the output 90. If any two of the input leads 91, 92 and 93 are Up, then all three of the Or circuits 94, 95 and 96 will be effective to operate the And circuit 99, whereupon the input of the inverter circuit 100 is driven Up and its output is Down. Therefore, the output of the And circuit is Down and the result is a bit on the carry output terminal 89 and nothing on the output terminal 90. In case all three input terminals 91, 92 and 93 are Up, the carry output terminal 89 will be Up for the same reason. In addition the And circuit 98 will be effective and the output terminal 90 will be Up.

A rationalizer is a translating network which will translate the sum of any two decimal numbers each expressed in pure binary notation and which sum is more than the digit nine into the decimal-binary notation, that is, a 1 bit for the decimal carry of 1 and a pure binary representation of the units digit of the sum. Ordinarily the sum of the bits of two decimal digits expressed in pure binary form will express the sum in pure binary form. However, when the sum exceeds the digit 9, the expression obtained is the pure binary form of a two digit decimal number, which is not acceptable in the present system. The rationalizer is a means for translating this into two groups each expressing the separate digits in pure binary form.

By way of example, the sum of 2 and 3 is performed by the adder as follows

Where        2 is expressed as 0010
and          3 is expressed as 0011
             ─                ────
the sum      5 is expressed as 0101

Again, the sum of 6 and 7 is performed by the adder as follows

Where        6 is expressed as 0110
and          7 is expressed as 0111
             ─                ────
the sum     13 is expressed as 1101 but in this case the rationalizer translates this to 1, 0011, that is a first group 0001 in which the first three zeros are assumed since an adder can never produce a carry greater than one and which is the pure binary form for the decimal digit 1, and a second group 0011 which is the pure binary form for the units digit 3 of the above derived sum. The internal circuitry of the rationalizer is not shown here since this circuit is disclosed in great detail in the said Havens et al. application. In the drawings Fig. 22 is a block representation of a rationalizer. It is shown as a rectangle having five input terminals for a 1 bit, 2 bit, 4 bit, 8 bit and carry from an 8 bit adder and five output terminals for a 1 bit, 2 bit, 4 bit, 8 bit and a carry to a next decimal order or as employed herein to a delay where such carry may be transmitted in a following time interval back to the adder.

The following table gives the complete operation of the rationalizer. Considering five input terminals (1 bit, 2 bit, 4 bit, 8 bit and 16 bit) and a similar five output terminal, its operation may be stated as follows.

TABLE II

| Input Decimal Value | Input Terminal Bits | | | | | Output Terminal Bits | | | | |
|---|---|---|---|---|---|---|---|---|---|---|
| | 16 | 8 | 4 | 2 | 1 | 16 | 8 | 4 | 2 | 1 |
| 0 | 0 | 0 | 0 | 0 | 0 | 0 | 0 | 0 | 0 | 0 |
| 1 | 0 | 0 | 0 | 0 | 1 | 0 | 0 | 0 | 0 | 1 |
| 2 | 0 | 0 | 0 | 1 | 0 | 0 | 0 | 0 | 1 | 0 |
| 3 | 0 | 0 | 0 | 1 | 1 | 0 | 0 | 0 | 1 | 1 |
| 4 | 0 | 0 | 1 | 0 | 0 | 0 | 0 | 1 | 0 | 0 |
| 5 | 0 | 0 | 1 | 0 | 1 | 0 | 0 | 1 | 0 | 1 |
| 6 | 0 | 0 | 1 | 1 | 0 | 0 | 0 | 1 | 1 | 0 |
| 7 | 0 | 0 | 1 | 1 | 1 | 0 | 0 | 1 | 1 | 1 |
| 8 | 0 | 1 | 0 | 0 | 0 | 0 | 1 | 0 | 0 | 0 |
| 9 | 0 | 1 | 0 | 0 | 1 | 0 | 1 | 0 | 0 | 1 |
| 10 | 0 | 1 | 0 | 1 | 0 | 1 | 0 | 0 | 0 | 0 |
| 11 | 0 | 1 | 0 | 1 | 1 | 1 | 0 | 0 | 0 | 1 |
| 12 | 0 | 1 | 1 | 0 | 0 | 1 | 0 | 0 | 1 | 0 |
| 13 | 0 | 1 | 1 | 0 | 1 | 1 | 0 | 0 | 1 | 1 |
| 14 | 0 | 1 | 1 | 1 | 0 | 1 | 0 | 1 | 0 | 0 |
| 15 | 0 | 1 | 1 | 1 | 1 | 1 | 0 | 1 | 0 | 1 |
| 16 | 1 | 0 | 0 | 0 | 0 | 1 | 0 | 1 | 1 | 0 |
| 17 | 1 | 0 | 0 | 0 | 1 | 1 | 0 | 1 | 1 | 1 |
| 18 | 1 | 0 | 0 | 1 | 0 | 1 | 1 | 0 | 0 | 0 |
| 19 | 1 | 0 | 0 | 1 | 1 | 1 | 1 | 0 | 0 | 1 |

Fig. 23 shows in block form the elements of a latch, that is, a means for storing a bit over an indefinite number of time intervals. The circuit is simple and contains essentially only an And circuit and a Delay circuit. The And circuit has a control input 84 and an input 85 leading from the delay circuit 86. When, in the course of some operation the control conductor 84 is driven Up and during this period a bit is transmitted over the input 87 to the delay circuit 86, the delay circuit will at the next interval drive the input 85 Up and since the control 84 is now Up the output 89 of the And circuit 83 which also constitutes the input to the delay circuit 86 is Up. Consequently this bit will be constantly regenerated by the delay circuit and will in effect circulate through the And circuit and the delay circuit, appearing constantly on the output terminal 88 from which it may be taken off as desired. When the control input 84 is finally moved Down, then the transmission of the bit over input 85 in the time interval following will be ineffective and the circuit will become unlatched.

Before going to Fig. 24, which shows a modulo nine computer, let us consider briefly some of the aspects of this mathematical conception.

Take, for example, the decimal number 2,123,456,789. It has long been known that the modulo 9 representation for such a number could be obtained by "casting out the nines" as the digits were summed. Starting from the right, the method would be to take the first digit 9, cast it out leaving 0, add 8, making 8, add 7 making 15, cast out 9, making 6, add 6, making 12, cast out 9, making 3, add 5, making 8, add 4, making 12, cast out 9, making 3, add 3, making 6, add 2, making 8, add 1, making 9, cast out 9, leaving 0, add 2, making 2, which is the modulo 9 of the number 2,123,456,789. Another method of obtaining this number is to sum the digits thereof, whereupon the sum 47 is obtained. This is divided by 9, whereupon 9 times 5 and a remainder of 2 is obtained. The 9×5 is cast out and the remainder 2 is the modulo 9 of the number. Another method is to add the digits of the sums obtained successively until a single digit sum is obtained. Thus the first sum of the digits is 47. Adding the digits of this sum together gives 11, which because it is not a single digit number must be again subjected to a summing operation. Finally the sum of the digits of the number 11 is obtained as 2, which is the modulo 9 representation of the original multi-digit number.

These methods, simple as they may seem, would each involve a fairly extensive routine for computer operation. Applicants have therefor devised another method which is essentially the same as the old method of casting out the nines in that it is a step by step process wherein the modulo 9 of the sums progressively produced is obtained. The method consists of summing two digits of the number being processed and if a decimal sum having more than one digit is obtained immediately summing the digits of this sum to obtain the modulo 9 of this sum. Applicants also combine with this second step operation the entry of the next digit of the original multi-digit decimal number, whereupon the modulo 9 of the first two digits is added to the third digit, producing another sum which is then subjected to another operation for summing the digits of the obtained sum. Thus each step (excepting the first in which the first digit is entered) consists of the entry of the decimal carry in the sum produced, the entry of the next digit of the original number and the summing of these values and the units digit of the sum previously produced to immediately produce a new sum. The last step, in which no new digit is entered produces the modulo 9 of the original multi-digit number. Thus, by way of example, the modulo 9 of 2,123,456,789 is obtained as follows:

| | | |
|---|---|---|
| 1st step | enter 1st digit | 9 |
| | enter 2nd digit | 8 |
| 2nd step | and produce sum | 1 7 |
| | enter carry | 1 |
| | enter 3rd digit | 7 |
| 3rd step | and produce sum | 1 5 |
| | enter carry | 1 |
| | enter 4th digit | 6 |
| 4th step | and produce sum | 1 2 |
| | enter carry | 1 |
| | enter 5th digit | 5 |
| 5th step | and produce sum | 0 8 |
| | enter carry | 0 |
| | enter 6th digit | 4 |
| 6th step | and produce sum | 1 2 |
| | enter carry | 1 |
| | enter 7th digit | 3 |
| 7th step | and produce sum | 0 6 |
| | enter carry | 0 |
| | enter 8th digit | 2 |
| 8th step | and produce sum | 0 8 |
| | enter carry | 0 |
| | enter 9th digit | 1 |
| 9th step | and produce sum | 0 9 |
| | enter carry | 0 |
| | enter 10th digit | 2 |
| 10th step | and produce sum | 1 1 |
| | enter carry | 1 |
| 11th step | enter zero (no more digits) | 0 |
| | and produce sum | 2 |

Thus it will be seen that by a simple routine involving one more step or operation than the number of digits contained in the multi-digit number, the modulo 9 of this number is obtained.

It will further appear that this routine is completely automatic and consists simply of the successive entry, into a single order binary-decimal adder during successive time intervals, of the various digits of the multi-digit decimal number, each digit of which is expressed in pure binary notation, the decimal carry of the sum produced in each such time interval being passed through a delay circuit for entry into such adder with the next digit entered in the next time interval.

Fig. 24 shows a modulo nine accumulator. This essentially is a combination of four adders such as shown in Fig. 21, a rationalizer, indicated in Fig. 22 but shown in more detail herein, and latching means as indicated in Fig. 23.

There is a control input 102 common to four And circuits 103 for the 1 bit, 104 for the 2 bit, 105 for the 4 bit, and 106 for the 8 bit. Corresponding output bit terminals from the rationalizer are connected to these And circuits so that when, by way of example, the control 102 is Up and a 1 bit is transmitted from the rationalizer, the And circuit 103 is active and a 1 bit is transmitted to the 1 bit adder 108. Likewise the And circuit 104 transmits a 2 bit to the 2 bit adder 109, the And circuit 105 transmits a 4 bit to the 4 bit adder 110, and the And circuit 106 transmits an 8 bit to the 8 bit adder 111. It is to be particularly noted here that whereas in a multi-digit adder the 16 bit terminal from the rationalizer would deliver a 1 bit to the 1 bit adder of the next higher decimal order as a carry, the terminal 120 herein transmits a 1 bit to the 1 bit adder 108.

This accumulator has four incoming terminals 112 for a 1 bit, 113 for a 2 bit, 114 for a 4 bit and 115 for an 8 bit. Likewise it has four outgoing terminals, 116 for a 1 bit, 117 for a 2 bit, 118 for a 4 bit and 119 for an 8 bit.

In use, the control 102 is driven Up and a succession of digits, each expressed in the pure binary code, are transmitted over the input terminals 112–115 in successive time intervals. In the interval following the last of such succession of incoming digits, the modulo nine number of the multi-digit number represented by this succession of digits will appear on the four output terminals 116–119 and due to the latching action will remain there indefinitely until the control 102 is released by being driven Down. There is thus provided a usable output.

It will appear hereinafter that there are three such accumulators provided, one for operand 1, one for operand 2, and one for the result. It will further appear that after the evaluation of the modulo nine numbers for all three have been made and latched, then the output of the accumulators for operand 1 and then for operand 2 are passed through a nine's complement generator and added to the accumulation in the result accumulator. At the end of this operation a nine (1001) will appear on the output terminals of the result accumulator as a satisfaction signal. If any other indication (1 to 8 inclusive) appears on such output terminals, it will constitute a signal that there has been a failure to check. This will appear in more detail hereinafter.

For purposes of explanation, Table III is given herein to show how the ten digit decimal number 2,123,456,789 is fed into the accumulator, how the modulo nine number 2 is actually calculated in the eleventh period and how it appears on the output terminals in the twelfth period and in successive periods thereafter until the control 102 is let Down.

TABLE III

*Value entered + Accumulate value = Sum*

| Int. | Pure Binary Form | | | | Rationalized Previous Sum | | | | | Pure Binary Form | | | | |
|---|---|---|---|---|---|---|---|---|---|---|---|---|---|---|
| | 115 | 114 | 113 | 112 | 120 | 119 | 118 | 117 | 116 | 125 | 124 | 123 | 122 | 121 |
| 1 | 1 | 0 | 0 | 1 | 0 | 0 | 0 | 0 | 0 | 0 | 1 | 0 | 0 | 1 |
| 2 | 1 | 0 | 0 | 0 | 0 | 1 | 0 | 0 | 1 | 1 | 0 | 0 | 0 | 1 |
| 3 | 0 | 1 | 1 | 1 | 1 | 0 | 1 | 0 | 1 | 0 | 1 | 1 | 1 | 1 |
| 4 | 0 | 1 | 1 | 0 | 1 | 0 | 1 | 0 | 1 | 0 | 1 | 1 | 0 | 0 |
| 5 | 0 | 1 | 0 | 1 | 1 | 0 | 0 | 1 | 0 | 1 | 0 | 1 | 0 | 0 |
| 6 | 0 | 1 | 0 | 0 | 0 | 1 | 0 | 0 | 0 | 1 | 0 | 0 | 1 | 0 |
| 7 | 0 | 0 | 1 | 1 | 0 | 0 | 1 | 1 | 0 | 0 | 0 | 1 | 1 | 0 |
| 8 | 0 | 0 | 1 | 0 | 0 | 0 | 1 | 1 | 0 | 0 | 1 | 0 | 0 | 0 |
| 9 | 0 | 0 | 0 | 1 | 0 | 1 | 0 | 0 | 0 | 0 | 1 | 0 | 0 | 1 |
| 10 | 0 | 0 | 0 | 0 | 0 | 1 | 0 | 0 | 1 | 0 | 1 | 0 | 1 | 1 |
| 11 | 0 | 0 | 0 | 0 | 1 | 0 | 0 | 0 | 1 | 0 | 0 | 0 | 1 | 0 |
| 12 | 0 | 0 | 0 | 0 | 0 | 0 | 0 | 1 | 0 | 0 | 0 | 0 | 1 | 0 |
| 13 | 0 | 0 | 0 | 0 | 0 | 0 | 1 | 0 | 0 | 0 | 0 | 0 | 1 | 0 |
| 14 | 0 | 0 | 0 | 0 | 0 | 0 | 0 | 1 | 0 | 0 | 0 | 0 | 1 | 0 |
| 15 | 0 | 0 | 0 | 0 | 0 | 0 | 0 | 0 | 1 | 0 | 0 | 0 | 1 | 0 |

By way of example, let us examine in detail the operations in interval 3. It is almost self evident that in the first interval a nine is entered into the accumulator and that in the second interval an eight is entered and summed with the nine, making 17, which appears as 10001 on the output terminals 125, 124, 123, 122, and 121 of the adders leading to the rationalizer. The rationalized sum 17 appears on the outputs of the delay circuits as 10111. Then in interval 3 the rationalized 17 will be added to 7 so that the sum of 7+1+7=15 will be taken.

This sum will be as follows

```
    0 1 1 1
          1
    0 1 1 1
    ───────
    0 1 1 1 1
``` that is, there will be three bits entered into the 1 bit binary adder 108 which will deliver a bit to output terminal 121 and a carry to the 2 bit binary adder 109. There will thus be three bits entered into this 2 bit binary adder 109 which will thereupon deliver a bit to output terminal 122 and a carry to the 4 bit binary adder 110. There will thus be three bits entered into this 4 bit binary adder 110 which will thereupon deliver a bit to output terminal 123 and a carry to the 8 bit binary adder 111. Since this carry is the only bit entered into the 8 bit binary adder 111 it will thereupon deliver a bit to output terminal 124 and none to output terminal 125. The pattern is thus

```
    0 1 1 1 1
``` which will be found to be the pure binary expression for the decimal number 15. Thus 0 1 1 1 1 is entered into the rationalizer and this will now be delivered to the five delay circuits 127, 128, 132, 137, and 141 as

```
    1 0 1 0 1
```

Delay circuit 127 depends on the CF circuit 126 but since the terminal 125 is Down its output is Down. However, output terminals 122 and 123 are both Up, the Or circuit 142 is Up, and since output terminal 124 is Up the And circuit 143 is Up. Therefore the input to the delay circuit 127 is Up.

Delay circuit 128 depends on And circuit 129 and And circuit 130. And circuit 129 is not effective since terminal 125 is Down even though terminal 122 is Up. Again, terminal 124 is Up but since the output of And circuit 143 is Up the output of inverter circuit 131 is Down. Therefore, the input to delay circuit 128 is Down.

Delay circuit 132 depends on And circuits 133, 134 and 135. It will be found that And circuit 134 depends on terminals 122 and 123 both of which are Up. Therefore the output of And circuit 134 and consequently the input of delay circuit 132 are Up.

Delay circuit 137 depends on And circuits 138, 139 and 140. And circuit 138 depends on terminal 125, which is Down, and inverter circuit 136 which is Down because terminal 122 is Up. And circuit 139 depends on terminal 122 and the output of inverter circuit 131 which is Down because And circuit 143 is Up. And circuit 140 depends on terminal 123, which is Up, terminal 124 which is Up, and inverter circuit 136 which is Down because terminal 122 is Up. Therefore the outputs of And circuits 138, 139, and 140 are all Down and the input to delay circuit 137 is Down.

Delay circuit 141 depends only on input terminal 121 and since this is Up, this delay circuit will be operated.

It thus appears that 0 1 1 1 incoming to the rationalizer is translated to 1 0 1 0 1 delivered to the delay circuits and which will be delivered in the following (4th) interval over terminals 120–116 so that the sum $$6+1+5=12$$

(01100) may be calculated.

Looking at Table III it may be noted that in interval 3 the sum of (0111) and (10111) is derived as (01111). This, as above stated, represents 7+1+7=15. The 15 (01111) is immediately translated or rationalized to 1+5 (10101) and delivered to the delay circuits, but does not reach the adders until the next interval, when it appears on the terminals 120–116.

The final result 2(00010) or (0010) as taken off the output terminals, reaches the terminals 125–121 in the eleventh interval and as shown in the 12th to 15th intervals (by way of example) remains latched in and constantly showing on the output terminals 124–121 thereafter until the control 102 is released or driven Down.

A purpose of the modulo 9 computer and the control circuits shown herein is to provide a means for checking the basic arithmetic operations, that is, addition, subtraction, multiplication, and division, as performed by an electronic calculator, of which the present invention is a part.

The modulo nine computer performs its checking operations independently of the arithmetic sections of the main calculator, but is dependent upon the arithmetic control circuits of the calculator for its timing sequence. For example, during the execution of an addition problem when operands 1 and 2 are respectively shifted out of certain registers into the arithmetic section of the main calculator in a serial fashion, these operands are also entered into the modulo nine computer. The modulo nine computer accepts the summation of operands 1 and 2 at the same time that the sum is entered into and stored in a given register. Thus, it is apparent that the modulo nine computer must be operated in time synchronism with the arithmetic circuits of the main calculator.

The modulo nine computer is designed to utilize the multi-digit operands in a serial form units order first, the bits of each digit being transmitted simultaneously in parallel. Accordingly, the example given indicates a method by which the modulo nine of a multi-digit binary-decimal number can be determined where the number is available in a serial form.

It is conventional to use the modulo nine values of the factors and the result of an arithmetical operation to check the validity of such operation. Thus it is known in addition that the sum of the modulo nine values of the augend and the addend or addends produces a modulo nine value exactly equal to the modulo nine value of the result (the sum). Likewise the difference between the modulo nine values of the minuend and the subtrahend produces a modulo nine value exactly equal to the modulo nine value of the result (the difference). Again, in multiplication, the product of the modulo nine value of the multiplicand and the modulo nine value of the multiplier produces a modulo nine value or a number whose modulo nine value is exactly the same as the modulo nine value of the result (the product). In division, the modulo nine values of the factors and the result may be used in the same manner, and thus the present invention provides means whereby the validity of an arithmetical operation may be checked by putting the modulo nine values of the factors through a like operation with the expectation of achieving a standard and logical result.

The arithmetic process of addition is characterized by adding the addend to the augend so as to produce a sum. It is known that the modulo nine of the augend plus the modulo nine of the addend is equal to the modulo nine of the sum. Thus, the following formulas can be set forth:

$$A+B=S$$

or $$(A+B)-S=0$$

The following operation is known to hold and the proof thereof can be found in various published texts on advanced arithmetic.

$$+\text{Mod } 9(A)+\text{Mod } 9(B)-\text{Mod } 9(S)=n\times 9$$
$$(n=0, 1, 2, \text{etc.})$$

In other words, the sum of the modulo nine numbers of the augend and the addend should equal the modulo nine number of the result or, if this sum is greater than the modulo nine number of the result, then it is greater by some multiple of nine. According to custom the modulo nine number of the sum of the modulo nine numbers of the augend and addend is calculated and this should exactly equal the modulo nine number of the result. However, it is not necessary to go through this additional step for computer operation before the comparison is made since by the very process of accumulation explained hereinbefore the modulo nine number of such a sum is produced. In accordance with the present invention the modulo nine number of the result is obtained by the use of one modulo nine accumulator and the modulo nine numbers of the operands are obtained by the use of other modulo nine accumulators, whereupon the nine's complement of such other calculated numbers are transmitted to the result accumulator so that the final result appears as a calculated nine which is accepted as a satisfaction signal.

In computer operation negative numbers are entered as complements. Actually the nine's complement is used and then the so-called fugitive one is added to produce the true ten's complement. However, when we deal with modulo nine numbers, the nine's complement is used without the fugitive one with the consequence that a zero never appears as a result of an addition. The nine numbers used in modulo nine notation include the digits 0 to 8 and consequently the nine's complements thereof include the digits 9 to 1 inclusive respectively. Where a 9 appears as a sum it is the nine's complement of the modulo 9 number 0. In mental arithmetic, such a nine would be cast out and the modulo nine number which it represented would be said to be zero.

In accordance with the present invention a zero cannot be obtained as the result of the addition of two modulo nine numbers. Witness, for example, the addition of the modulo numbers 4 and 5. Mechanically this will produce 9, which will be recognized at once as strictly equivalent to zero since only the remainder beyond any multiple of nine is recognized as a modulo nine number. Again, if an attempt is made to mechanically (computer operation) add two numbers to produce a zero, it will be found that a carry is also produced which perforce must be added to the units digit and will therefore erase the zero. Thus

|  |  |
|---|---|
| Modulo | 6 |
| Added to modulo | 4 |
| Produces | 10 | but the carry must immediately be converted since there is no such thing as a two digit modulo 9 number, therefore the modulo 9 computer immediately performs

|  |  |
|---|---|
| The addition | 0 |
| Plus | 1 |
| Making | 1 | as the modulo nine number of the sum of 4 and 6.

For all the above there is a rigorous mathematical proof, but it is believed that this simpler explanation will suffice. The fact is that in the operation of the computer of the present invention, where the sum of the modulo nine numbers of the augend and the addend is equal to the modulo nine number of the result, the subtraction of one from the other as a mechanical means of establishing such equality results in a nine rather than a zero. This nine is then used as a satisfaction signal.

The electronic units which perform the determination of the modulo nine of a given multi-digit number available in serial form are referred to hereinafter as evaluator latches, though each is actually an accumulator as in Fig. 24. The unit enclosed within the dashed rectangle 2069 is an accumulator having an input from the delay circuits 2068, an output channel 2070, and a control wire 2058. The inputs to switch 2067 comprise the inputs to the evaluator latch and over these four input wires the 1, 2, 4 and 8 bits representing the digits of operand 2 are transmitted. It is not believed to be necessary to show the complicated circuit and the immense details of the register from which these digits are transmitted. These inputs accommodate a single binary-decimal digit. The four outputs of switch 2067 are connected to the inputs of four delay circuits 2068 and the outputs of these delay circuits are connected to the group of inputs of unit 2069. Hereinafter unit 2069 and other similar units will be referred to as evaluator latches. Switch 2067 is used merely to determine the time at which input information is to be applied to the evaluator latch. The delay circuits 2068 are used to reshape the signals representing the bits of each binary-decimal digit and are also used to provide a time delay of one microsecond.

In the example given above where the modulo nine of a given decimal number is to be determined, the units order 9 of this number will be applied to the input terminals of switch 2067 during a first time interval, the tens order digit 8 will be applied to this switch during a second time interval, the hundreds order digit 7 will be applied to the input terminals of this switch during a third time interval and so on. The sum which is being determined in a progressive fashion will always appear at the output terminals representing the binary bits 1, 2, 4 and 8 of evaluator latch 2069. Providing the control 2058 remains Up, the modulo nine of the multi-digit binary-decimal number applied to the evaluator latch through switch 2067 will circulate through the loop within this device indefinitely. The point here is that long after the multi-digit binary-decimal number is applied to switch 2067, the modulo nine of this number will continually appear at the output terminals of the evaluator latch 2069.

As hereinbefore mentioned, there are three of these evaluator latches, the utilization of which will be pointed out with respect to the various arithmetic operations.

*Addition*

It has been pointed out hereinabove that the addition of the modulo nine numbers of the operands produces a modulo nine number equal to the modulo nine number of the sum.

The evaluator latch 2069 (Fig. 32) determines the modulo nine of operand 2 and the evaluator latch 2066 is provided to determine the modulo nine of operand 1. The input terminals to switch 2063 are the output terminals of the device from which operand 1 is transmitted. Thus, each binary-decimal digit of the operand will appear at the inputs to switch 2063 during successive microseconds. It is apparent that in order to permit the information appearing on these input terminals to pass through switch 2063, the control terminal 2054 must be Up. It is also apparent that in order to close the loop which enables the evaluator latch the control terminal 2059 must be Up.

In order for the modulo nine computer to operate properly, allowance must be made for an equalization period within the main calculator which normally precedes an addition or substraction problem being performed. An equalization period is a variable interval of several microseconds which is necessary in order to cause a number in either Register 1 or Register 2 of the main Calculator to be shifted to the right a sufficient number of digital positions so as to cause the indices of the operands stored in the Registers to be equal. The main Calculator always causes the Register containing the smaller index to be shifted to the right until Indices 1 and 2 are equal in number of digits. The time duration required for an equalization period is always equal to one microsecond plus the number of microseconds corresponding to the number of digital shifts of one of the Registers necessary to cause the Indices to be equalized.

This may be noted in Figs. 36, 37, 39 and 40 where five microsecond periods preceding the add and subtract operational cycles are provided. As shown in Fig. 36, terminal 252 goes Up at time T0 and remains Up while the Indices are being equalized, i. e., until 0 time of the Control Counter. For ease of explanation, an equalization period of five microseconds (T0–T5) is shown, though it should be understood that the length of this period may vary.

If Index 1 is initially greater than Index 2 such that the number in Register 2 is to be shifted to the right, terminal 253 goes Up at T1 time and remains Up until 1 time of the Control Counter. On the other hand, if Index 1 is initially smaller than Index 2 so that the number in Register 1 is shifted to the right until the Indices are equal, then terminal 204 goes Up at T1 time of the equalization period and remains Up until 1 time of the Control Counter.

If the condition of the Indices is such that terminal 204 goes Up at T1 time, terminal 2054 of Fig. 37 also goes Up at this time. However, if the alternate condition is present such that terminal 253 goes Up at T1 time, terminal 2055 of Fig. 37 goes Up at this time. During the equalization period, either terminal 2054 or 2055 will be Up, but both of them will not be Up. By reference to Figs. 26, 27 and 28 it will be apparent that terminals 2058, 2059, 2075 and 2076 are Up during the times illustrated in Fig. 37.

After the equalization of the Indices has been effected the control counter of the main Calculator is enabled and the time periods depicted in the timing charts such as Figs. 36, 37, 39 and 40 are counted off and the various operational cycles are executed.

The signal on the control terminal 2054 (see Timing Chart—Fig. 37) is used to control switch 2063. Terminal 204 is Up in interval 1 and is applied through Or circuit 1954 (Fig. 27) causing terminal 2054 to go Up at least by zero time. The signal on terminal 204 is also applied through Or circuit 1959 energizing delay circuit 1960, causing the latch composed of delay circuit 1960, Or circuit 1959, and And circuit 1958 to be energized. This latch can be energized only if the center and right-hand input of And circuit 1958 are Up at the time that the output of delay circuit 1960 goes Up.

Terminal 206 is normally Up. Thus, this signal will be Up at the time that the add cycle is started. The signal on terminal 206 energizes Or circuit 1952 causing a positive signal to be applied to conductor 230 and thus to the center input of And circuit 1958.

And circuit 1955 is not operated at the beginning of the addition cycle since the left-hand input thereof, which is connected to terminal 219 is Down. The switch 1956 is operated only during division and multiplication cycles. Since both of the inputs to the Or-inverter circuit 1957 are Down, the output thereof is Up causing the right-hand input of And circuit 1958 to be Up.

The signal on terminal 1054 will remain Up until the latch, of which delay circuit 1960 is a part, is deenergized by one of the inputs of And circuit 1958 being placed in the Down position. During the 13th interval of the Control Counter, terminal 219 is Up causing the left-hand input of And circuit 1955 to be Up. The right-hand input of this And circuit is Up due to the signal appearing on terminal 206, as explained above. Accordingly, the output of And circuit 1955 is Up during the 13th interval causing the output of Or-Inv circuit 1957 to be Down during this time so that coincidence within And circuit 1958 is destroyed. This action causes the output of delay circuit 1960 to go Down at the beginning of the 14th interval of the Control Counter. The signal on terminal 2054 is illustrated as being Up during the 1st through the 13th interval.

During the time that the signal on terminal 2054 is Up, operand 1 is being entered into the arithmetic circuits of the main calculator and simultaneously into evaluator latch 2066 through switch 2063. The movement of the operand begins at the beginning of interval 1 so that the first binary-decimal digit is permitted to pass through switch 2063 only during the first interval of the Control Counter. Accordingly, during the second time interval, the second (tens order) binary-decimal digit is applied to the inputs of switch 2063, and the first digit (delayed for one interval by the delay circuits 2064) is delivered to the evaluator latch 2066. This process is continuous until the entire contents of 13 digits of a register from which operand 1 has been taken are entered into evaluator latch 2066.

As stated above the signal on terminal 2059 enables the evaluator latch 2066. During the 1st time interval terminal 206 is Up causing Or circuit 1967 to be energized, over line 230, which in turn energizes delay circuit 1969. The output of unit 1969 goes Up at the beginning of the second time interval just as the first digit is being entered into the evaluator latch 2066. The output of delay circuit 1969 causes the latch composed of units 1966, 1967 and 1969 to be energized providing the center and right-hand inputs of And circuit 1966 are Up.

The signal on terminal 206 discussed above is also applied through Or circuit 1951 and through cathode follower 1953 over conductor 231 to the center input of And circuit 1966. Since terminal 217 is Down throughout an addition cycle, the input of inverter 1965 is Down and the output thereof is Up, thus causing the right-hand input of And circuit 1966 to be Up. The latch which includes And circuit 1966 will remain energized until the signal on terminal 206 goes Down, which does not occur until the input latches of certain other circuits are reset, that is, not within the addition cycle pictured in the time chart—Fig. 35. The signal on terminal 2059 thus goes Up at the beginning of the Add cycle and remains Up throughout this cycle.

Figure 32:
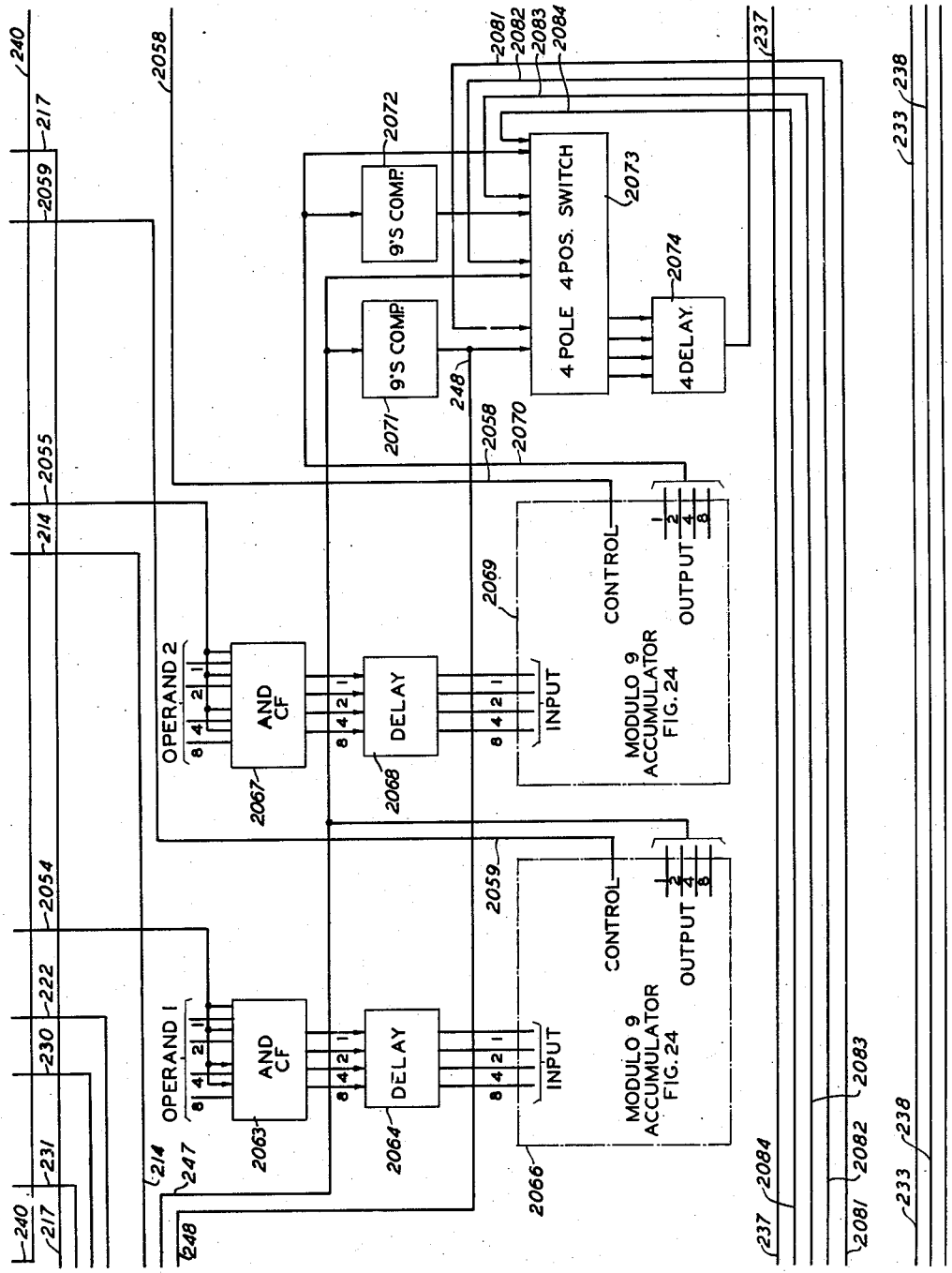

Referring to Fig. 32, evaluator latch 2069 is provided to determine the modulo nine value of operand 2 which is transmitted at the same time as operand 1. Thus, operand 2 will be applied to the input terminals of switch 2067, digit by digit, in the same manner as operand 1 is applied to the terminals of switch 2063. It becomes apparent then that the control potentials on terminals 2055 and 2058, which respectively enable the switch 2067 and the evaluator latch 2069, must occur at the same time as the signals appearing on terminals 2054 and 2059 respectively. The signal on terminal 253 during the 1st interval of the Control Counter energizes Or circuit 1964 and also Or circuit 1962. Thus, terminal 2055 goes Up at least by the beginning of the 1st interval. The signal applied to Or circuit 1962 causes the latch composed of delay circuit 1963, And circuit 1961 and Or circuit 1962 to be energized. The center input of And circuit 1961 is Up since the output of the Or-inverter circuit 1957 is Up as explained above. The right-hand input of And circuit 1961 is Up due to the signal on terminal 206, relayed through Or circuit 1951 and CF circuit 1953 to line 231. And circuit 1961 is deenergized at the beginning of the 13th interval when the output of Or-inverter 1957 goes Down in response to the signal on terminal 219. The signal on terminal 2055 is Up during the time intervals 1 through 13.

The signal on terminal 206 energizes Or circuit 1974 causing delay circuit 1975 to be operated. Accordingly, the potential on terminal 2058 goes Up at the beginning of the 2nd interval. The output of delay circuit 1975 causes the latch which includes this unit and And circuit 1972 to be energized providing the signal on line 231 is Up, as explained above. The signal appearing on terminal 2058 goes Up at least by the beginning of the 2nd interval and remains Up for the duration of the addition cycle.

The highest order digits of operands 1 and 2 are respectively applied to the inputs of switches 2063 and 2067 during the 13th interval. These digits appear at the outputs of delay circuits 2064 and 2068 during the 14th interval and will be incorporated within the sum appearing at the output terminal of evaluator latches 2066 and 2069, during the 15th interval. However, during the 15th interval a resulting tens carry may be being added within the evaluator latches so that the information appearing at the output terminals may not truly be correct until the 16th interval. It should be appreciated that since the control potentials appearing on terminals 2059 and 2058 remain Up, the modulo nine values of operands 1 and 2 will respectively continue to appear during each succeeding microsecond interval at the output terminals of evaluator latches 2066 and 2069.

Evaluator latch 2062 (Fig. 33) is provided to determine the modulo nine value of the arithmetic sum being determined by the main calculator and also to combine this value with the contents of evaluator latches 2066 and 2069. Briefly, the sum being determined by the arithmetic section of the main calculator appears on terminals 232 by which they are transmitted from the main calculator. By causing control terminal 2075 to be Up, the information appearing on terminals 232 can be entered into evaluator latch 2062. It is also necessary during this time to have evaluator latch 2062 in an operative state by causing the control signal on terminal 2076 to be Up. It was stated hereinbefore that the modulo nine check is made during an addition operation by first adding the nine's complement of the modulo nine of operand 1 to the contents of the final evaluator latch (unit 2062) which initially contains the modulo nine value of the sum as determined by the main calculator. The nine's complement of the modulo nine value of operand 2 is then added to the current contents of the final evaluator latch. At the end of this operation the output of the final evaluator latch must be a nine if the modulo nine check was satisfactory.

The signal appearing on terminal 2075 (Fig. 28) must be Up during the time intervals of the addition cycle during which binary-decimal digits of the sum of the arithmetic operation is appearing at the output terminals of the principal adder (not shown). If the sum contains only 13 digits it is necessary for terminal 2075 to be Up for only 13 microseconds. However, if the sum contains 14 binary-decimal digits this terminal must be Up for 14 microseconds. Means not shown here, but indicated in the Time Chart (see terminals 203 and 2075), provides an indication as to whether the sum contains 13 or 14 digits.

The signal on terminal 202 during the 1st interval is applied to Or circuit 257 and thence to delay circuit 1985 where the output signal of this unit is applied through Or circuits 1984 and 1982 to the input of delay circuit 1983. Accordingly, the output of unit 1983 goes Up at the beginning of the 3rd interval. The output of delay circuit 1983 causes the latch composed of units 1981—1983 to be energized providing the right-hand input of And circuit 1981 is Up. During the early portion of the addition cycle terminals 221 and 222 are Down so that the output of Or-inverter circuit 1979 is Up thereby causing the right-hand input of And circuit 1980 to be Up. The left-hand input to unit 1980 is Up due to the signal appearing on line 206 relayed over terminal 230. Since both of the inputs of And circuit 1980 are Up, the output thereof, and thus, the right-hand input of And circuit 1981 is Up. Thus, the latch which includes delay circuit 1983 will remain energized until the right-hand input of And circuit 1981 is caused to go Down.

During the 15th and 16th time intervals the terminals 221 and 222 respectively from the Control Counter are Up, causing the output of Or-inverter 1979 to be Down during these intervals. Accordingly, coincidence is destroyed in And circuit 1980 causing the right-hand input of And circuit 1981 to go Down. Providing the sum of the arithmetic operation being determined by the main calculator contains only 13 binary-decimal digits, the output of delay circuit 1983 goes Down at the beginning of the 16th interval due to the action of And circuit 1981. The signal appearing on terminal 2075 is illustrated as being Up through the 15th interval. This is true only if the sum referred to contains only 13 binary-decimal digits.

If the sum contains 14 binary-decimal digits, terminal 203 is Up for one microsecond during the 15th interval. This signal is delivered through Or circuits 1984 and 1982 thereby enabling delay circuit 1983 for an additional microsecond time interval. This causes terminal 2075 to be Up during the 16th interval. Thus, if the sum contains 14 binary-decimal digits, terminal 2075 will be Up during the time intervals 3 through 16.

The signal on terminal 2076 is used to enable the evaluator latch 2062. The signal on terminal 202 (applied at the beginning of the 1st interval), which through Or circuit 257, energizes delay circuit 1985, is applied through Or circuit 1989 and delay circuit 1990 causing terminal 2076 to go Up at the beginning of the 3rd interval. The signal at the output of delay circuit 1990 energizes the latch which includes units 1988—1990 providing the center and right-hand inputs of And circuit 1988 are Up simultaneously. The center input of And circuit 1988 is Up due to the signal appearing on terminal 206. Terminal 205 will be Down during an addition cycle so that inverter 1991 remains nonconductive, whereupon the right-hand input of And circuit 1988 is Up. The latch which includes And circuit 1988 will remain continuously energized until the signal on terminal 206 goes Down which, as stated above, does not occur during an addition cycle. The signal on terminal 2076 goes Up at the beginning of the 3rd interval and remains Up throughout the addition cycle.

As stated previously, the modulo nine of operand 1 appears at the output terminals of evaluator latch 2066. The information appearing on these terminals is applied directly to switch 2073 and is applied through the nine's complement generator 2071 to switch 2073. It was stated previously that the nine's complement of the modulo nine of operand 1 is to be added to the contents of evaluator latch 2062. The nine's complement of the modulo nine of operand 1 appears at the output terminals of the nine's complement generator 2071. Providing control terminal 2081 is Up, the information appearing at the output of unit 2071 is applied through the 4-pole 4-position switch 2073 and delay circuits 2074 to the right-hand group of inputs to switch 2060.

During the 16th interval of the addition cycle a positive pulse appears on terminal 2077 which is applied through Or circuit 2035 so as to appear on terminal 2081. Since terminal 2081 is Up for one microsecond during the 16th interval, the output of unit 2071 is permitted to pass through switch 2073 during this time and thereafter appears at the right-hand group of inputs of switch 2060 during the 17th time interval (the delay 2074 causing a one microsecond delay).

The one microsecond signal appearing on terminal 2077 is also applied through Or circuits 2022 and 2023 to the input of delay circuit 2024 so that the output thereof is Up during the 17th interval. The output of delay circuit 2024 appears on terminal 233 and causes switch 2060 to permit the information appearing at the right-hand group of inputs to pass through the switch. It should be noted that at this time control terminal 2075 is Down so that any information appearing on terminals 232 is not permitted to pass through switch 2060.

The signal appearing on terminal 2077 during the 16th interval is applied through Or circuit 2031 to delay circuit 2032 causing the output thereof to be Up during the 17th interval. This signal is applied through Or circuit 2037 to terminal 2083. The fact that terminal 2083 is Up during the 17th interval permits the information appearing at the outputs of the nine's complement generator 2072 to be applied through switch 2073 and delay circuits 2074 so as to appear at the inputs of switch 2060 during the 18th interval. The information appearing at the output of nine's complement generator 2072 is the nine's complement of the modulo nine of operand 2.

The signal at the output of delay circuit 2032 (Fig. 31) during the 17th time interval is applied through Or circuits 2034 (terminal 249), 2022 and 2023 causing the input of delay circuit 2024 to be Up during the 17th interval. Thus, the output of delay circuit 2024 is Up during the 18th interval causing line 233 to be Up during this interval. It should be noted that line 233 is Up for two microseconds during the 17th and 18th intervals. During the first of these intervals the previous output of unit 2071 is applied through switch 2060, while during the second of these intervals the output of unit 2072 is applied through switch 2060.

Since the last binary-decimal digit is applied to evaluator latch 2062 during the 18th interval, the information appearing at the output terminals 234 and 235 of this latch cannot be correct until the 19th interval. However, an additional microsecond is required in order to be sure that a possible tens carry has been taken care of within the evaluator latch 2062. This leaves two possibilities of determining whether the information appearing at the output of evaluator latch 2062 is a binary-decimal 9. The first possibility is to wait until the 20th time interval and examine the 8 bit and the 1 bit lines of the output terminals 234 and 235 to determine if they are both Up. However, if the tens carry occurring within evaluator latch 2062 is taken into consideration the determination as to whether the latch contains a binary-decimal 9 can be made one microsecond early during the 19th interval. Thus, if the tens carry terminal 236 (the terminal incoming to delay circuit 127 of Fig. 24) and the 8 bit terminal 234 are Up simultaneously and the 1 bit terminal 235 is Down, or if the 8 bit and 1 bit terminals 234 and 235 are Up and the tens carry terminal 236 is Down, the contents of the evaluator latch is a binary-decimal 9.

The one microsecond pulse appearing on terminal 2077 (Fig. 31) during the 16th time interval is delivered through Or circuit 2031, delay circuit 2032, Or circuit 2034 and delay circuit 2039 so as to be applied over line 237 to the second from the right-hand input of switch 2057 during the 18th interval. The output of this delay circuit is Up for one microsecond during the 19th interval.

The signal on line 230 (from Or circuit 1952, which indicates that among other things a certain addition suboperation has been placed in operation) is applied through Or circuit 2014 to the input of inverter 2015. Consequently, the output 238 of inverter 2015 is Down, thereby preventing positive pulses on the output 233 of delay circuit 2024 from actuating switch 2057 during an addition cycle.

Let us consider the case where the information appearing at the output terminals of evaluator latch 2062 is a binary-decimal 9 such that the 8 bit terminal 234 and the one bit terminal 235 are Up. These terminals are connected to the two center inputs of And circuit 2048 (Fig. 34). If no carry has occurred during the 19th time interval within evaluator latch 2062 so that terminal 236 is Down, inverter 2045 is non-conductive so that the output thereof and thus the left-hand input of And circuit 2048 is Up. The one microsecond signal appearing at the output 239 of delay circuit 2056 during the 19th time interval causes the right-hand input of And circuit 2048 to be Up and coincidence within unit 2048 causes a positive one microsecond pulse to be delivered through Or circuit 2049 and cathode followers 2050 to the terminal 2085.

The one microsecond signal at the output of Or circuit 2049 is applied to the left-hand input of switch 2046. The second from the left input of this switch is Up since terminal 206 and consequently terminal 240 is Up. Since both of the left-hand inputs to switch 2046 are Up simultaneously, an input is supplied to delay circuit 2027. The signal at the output of this delay circuit is applied through Or circuit 2049 and cathode follower 2050 to the output terminal 2085. The latch composed of Or circuit 2049, switch 2046 and delay circuit 2027 (called the modulo 9 check release latch) is now energized and remains in this state until the signal on terminal 206 is caused to go Down during a subsequent calculator suboperation cycle. However, throughout the addition cycle this terminal will remain Up so that the latch which includes Or circuit 2049 will remain energized.

The fact that a signal appears on terminal 2085 at the beginning of the 19th time interval of the addition cycle indicates that the modulo nine checking was performed satisfactorily. This is termed a satisfaction signal. If an error had been made by the main calculator such that the output of evaluator latch 2062 was not a binary-decimal 9, terminal 2085 would remain Down. Terminal 2085 is connected to the input latch of a suboperation circuit in the principal calculator and this terminal must be Up in order for the input latch to be energized, otherwise the operation of the calculator stops.

Suppose that the binary-decimal digit 9 contained within evaluator latch 2062 is indicated by the 8 bit terminal 234 and the carry terminal 236 being Up simultaneously. The signals appearing on these terminals are applied to the two center inputs of And circuit 2052. The fact that the one bit terminal 235 is Down renders inverter 2051 nonconductive so that the left-hand input of And circuit 2052 is Up. The right-hand input of this And circuit goes Up during the 19th interval due to the one microsecond pulse appearing at the output 239 of delay circuit 2056 as stated previously. Coincidence then occurs within And circuit 2052 causing a one microsecond pulse to be delivered through Or circuit 2049 to the left-hand input of switch 2046 and through cathode followers 2050 to the output terminal 2085. The signal at the output of Or circuit 2049 causes the latch which includes units 2046, 2027, and 2049 to be continuously energized thereafter.

Thus, it is apparent that if either And circuit 2048 or 2052 is energized during the 19th interval, the latch which includes Or circuit 2049 is continuously energized so that output terminal 2085 is Up.

The one microsecond pulse occurring at the output of either And circuit 2048 or 2052 is applied to the Or-inverter circuit 2047 causing the output thereof to be Down during the 19th interval. The output of unit 2047 is applied to the right-hand input of switch 2043 so as to prohibit the one microsecond pulse appearing at the output of delay circuit 2056 from energizing switch 2043.

If an error had occurred such that the modulo nine check was not performed satisfactorily, the outputs of And circuits 2048 and 2052 would remain Down thereby causing the output of Or-inverter circuit 2047 to be Up. Accordingly, the one microsecond pulse appearing at the output of delay circuit 2056 over terminal 239 will cause coincidence to occur at the two right-hand inputs to switch 2043 causing the output thereof to be Up so that delay circuit 2044 is energized. The output of delay circuit 2044 causes the latch which includes units 2043 and 2044 (modulo nine check failure latch) to be energized continuously. The output signal from this latch appears on terminal 2086. Whenever terminal 2086 is Up it indicates that a modulo nine check failure has occurred. The effect of the signal on terminal 2086, when it is Up, is to cause the main calculator to stop except in one instance which is indicated in the following paragraph.

The switch 242, which is called the modulo nine check stop suppress switch, is normally in the lower position such that the left-hand input of Or circuit 2026 is connected to be Down. However, if the operator desires that the main calculator ignore a modulo nine check failure, he places this switch in the upper position so that the left-hand input of Or circuit 2026 is continuously connected to be Up. The operation of Or circuit 2026 causes the latch which includes Or circuit 2049 to be continuously energized and causes the output terminal 2085 to be Up continuously. In this case the modulo nine check failure latch, which includes switch 2043 and delay circuit 2044, is energized if a check failure occurs, but the calculator is allowed to complete the current calculator suboperation cycle.

It was stated above that the signal on terminal 2085 must be Up in order for the calculator suboperation cycle to proceed to completion, that is for the main calculator to continue its operation. Thus, in cases where an arithmetic operation such as addition, subtraction, multiplication, or division has been performed, it is necessary to cause terminal 2085 to go Up. The signal appearing on line 240 is Up whenever addition, subtraction, multiplication, or division operation is performed by the main calculator. Thus, if one of these operations is not performed, this terminal is Down causing inverter 2053 (Fig. 34) to be rendered nonconductive. Accordingly, the output of this inverter is Up thereby energizing Or circuit 2026, which delivers a positive signal through Or circuit 2049 and cathode follower 2050 to the output terminal 2085. Thus, it can be stated that terminal 2085 is Up whenever a satisfactory modulo nine check was performed during an addition, subtraction, multiplication, or division operation or whenever one of these operations was not performed.

Consider that a modulo nine error has occurred so that the latch which includes switch 2043 is continuously energized. One method by which this latch can be reset is to depress the pushbutton 244 located on the console which is labelled "modulo nine error reset." (It will be appreciated that a positive pulse appearing on the terminal labelled "Calculator Reset" will also reset the modulo nine check failure latch.) The depression of this pushbutton 244 causes a positive signal to be applied to the right-hand input of And circuit 2041. This pushbutton will also, by means not shown, cause a pulse to be transmitted over terminal 245 to be applied to the left-hand input of And circuit 2041. Coincidence within 2041 causes a positive signal to be applied to Or-inverter circuit 2042 so that the output thereof goes Down. Since coincidence no longer occurs between the left-hand pair of input terminals to switch 2043, the latch which includes this switch is de-energized. It should be noted that the actuation of the modulo nine error reset pushbutton 244 causes coincidence to occur between the right-hand pair of input terminals to switch 2046. This coincidence causes the latch which includes delay circuit 2027 to be continuously energized so that output terminal 2085 is Up. Since the modulo nine check failure latch is now de-energized (terminal 2086 is Down) and the modulo nine check release latch is energized (terminal 2085 is Up), the operation of the main calculator now can proceed.

*Subtract*

The modulo nine computer performs a modulo nine check for a subtraction operation in much the same manner as it was performed for an addition operation described above. The basic equation upon which the modulo nine computer operates during a subtraction operation is as follows:

$$D=A-B$$
$$D-A+B=0$$
$$\text{Mod } 9(D)-\text{Mod } 9(A)+\text{Mod } 9(B)=0$$
$$\text{Mod } 9(D)+(9-\text{Mod } 9(A))+\text{Mod } 9(B)=9$$

In the above equations it was assumed that the quantity A is greater than B. However, it is apparent that if the modulo nine computer is given an indication as to which quantity is the larger, the same basic function can be followed in order to perform the modulo nine check.

The modulo nine of operand 1 is determined by evaluator latch 2066 in the same manner as described for an addition operation. Similarly, the modulo nine of operand 2 is determined by evaluator latch 2069. The modulo nine of the arithmetic difference between operand 1 and operand 2 is determined by evaluator latch 2062. Then the nine's complement of the modulo nine value of the largest operand is added to the contents of evaluator latch 2062. Finally, the modulo nine value of the smaller operand is added to the contents of evaluator latch 2062. If the modulo nine check was performed satisfactorily, the binary-decimal digit appearing at the output terminals of evaluator latch 2062 must be a 9.

During the addition operation it was stated that the signal on terminal 206 was applied to Or circuit 1951 and to Or circuit 1952 throughout the addition cycle. During a subtraction operation the signal on terminal 206 is Down but terminal 207 is Up throughout the subtraction cycle and applies a positive signal to Or circuits 1951 and 1952. Thus, during a subtraction cycle the signals appearing on the output terminals 2054, 2055, 2059, 2058 and 2076 are Up for the same time durations as they were during an addition cycle. This fact is readily apparent by referring to the timing chart Fig. 38. During a subtraction cycle a one microsecond pulse will not appear on terminal 203. Thus, the signal appearing on terminal 2075 will be Up for the same time duration as it is during an addition cycle with the exception that it will never be Up during the 16th interval. Thus, during a subtraction operation the signal on terminal 2075 is Up during the 3rd through the 15th intervals. The reason that terminal 2075 is Up for only 13 microseconds during the subtraction operation is that the difference between the operands as determined by the main calculator will never contain more than 13 binary-decimal digits.

Due to the fact that the signals stated above are Up during the same time intervals for a subtraction or addition operation, we can assume that evaluator latch 2066 now contains the modulo nine of operand 1, evaluator latch 2069 now contains the modulo nine of operand 2, and that evaluator latch 2062 contains the modulo nine of the difference between the operands.

For the present, the discussion is restricted to the case where the index of operand 1 is greater than that of operand 2, or where the index of operand 2 is greater than that of operand 1. The situation where the indices of the operands are equal such that the calculator is not aware of which is the larger one and is discussed under the subheading Convert hereinafter.

Consider the case where the index of operand 1 is initially greater than operand 2. Under this condition terminal 2079 is Up throughout the subtraction cycle while terminal 2080 is Down during this time. The one microsecond pulse appearing on terminal 222 during the 16th time interval is applied to the left-hand input of And circuit 2030. The right-hand input of this unit is Up since terminal 2079 is Up. The middle terminal is Up since terminal 254 goes Up at the beginning of the 16th interval. Coincidence occurs within And circuit 2030 for one microsecond during the 16th interval causing a pulse to be delivered through Or circuit 2035 to terminal 2081. The fact that terminal 2081 is Up permits the binary-decimal information appearing at the output terminals of the nine's complement generator 2071 to pass through switch 2073. This information appears at the output terminals of delay circuit 2074 during the 16th time interval and is applied to the right-hand group of inputs of switch 2060.

The one microsecond signal at the output of And circuit 2030 (Fig. 31) during the 16th time interval is delivered through Or circuit 2023 to delay circuit 2024, which in turn delivers a positive one microsecond pulse to line 233 during the 17th time interval. Since terminal 233 is now Up the information at the output of delay circuits 2074 during the 17th time interval is permitted to pass through switch 2060 so as to be entered into evaluator latch 2062. We now have added the nine's complement of the modulo nine of operand 1 to the modulo nine of the difference of the operands where the modulo nine sum of these values is stored in evaluator latch 2062.

The one microsecond pulse at the output of And circuit 2030 during the 16th time interval is applied to delay circuit 2033 which delivers a one microsecond pulse through Or circuit 2038 to terminal 2084. Terminal 2084 is then Up during the 17th time interval so as to permit the output of evaluator latch 2069 to be delivered through switch 2073 and delay circuits 2074 to the left-hand inputs of switch 2060.

The one microsecond pulse at the output of delay circuit 2033 during the 17th time interval is delivered through Or circuits 2034, 2022, and 2023 to the input of delay circuit 2024. This delay circuit is operated causing line 233 to be Up during the 18th time interval. The fact that line 233 is Up during the 18th time interval permits the modulo nine of operand 2 to be entered through switch 2060 into evaluator latch 2062.

If the modulo nine check was performed satisfactorily, the outputs of evaluator latch 2062 must represent the binary-decimal 9.

The one microsecond pulse appearing at the output of Or circuit 2034 during the 17th time interval is applied through delay circuit 2039 so as to be applied to the second from the right input of switch 2057, during the 18th time interval. Thus, a one microsecond pulse appears at the output of switch 2057 which is applied to delay circuit 2056 so that the output thereof is Up during the 19th time interval of a subtraction cycle. The manner in which the output terminals 234, 236 and 235 of evaluator latch 2062 are examined so as to determine whether the evaluator latch contains a binary-decimal 9 is the same as described previously for addition with the exception that the one microsecond pulse appearing at the output of delay circuit 2056 occurs during the 19th interval.

Consider now the case where the index of operand 1 is initially less than that of operand 2. In this case, terminal 2080 is Up and 2079 is Down throughout the subtraction cycle. During the 16th time interval the pulse on terminal 222 causes coincidence to occur within And circuit 2029 so that a positive one microsecond pulse is applied through Or circuit 2036 to terminal 2082. The signal on terminal 2082 permits the modulo nine value of operand 1 to be delivered through switch 2073 and delay circuits 2074 to the input of switch 2060. The pulse at the output of And circuit 2029 is applied through Or circuit 2023 and delay circuit 2024 so as to cause terminal 233 to be Up during the 17th time interval. Thus, the information applied to the right-hand inputs of switch 2060 is permitted to pass therethrough into evaluator latch 2062.

A one microsecond signal at the output of And circuit 2029 (Fig. 3) is applied through Or circuit 2031, delay circuit 2032 and Or circuit 2037 to the output terminal 2083. This terminal is Up during the 17th time interval and permits the nine's complement of the modulo nine value of operand 2 to pass through switch 2073 and delay circuits 2074 and arriving at the right-hand inputs during the 18th interval. The one microsecond pulse appearing at the output of delay circuit 2032 during the 17th interval is applied through Or circuits 2034, 2022, 2023, and delay circuit 2024 thereby causing terminal 233 to be Up during the 18th interval. Thus, the information applied to the right-hand inputs of switch 2060 during the 18th interval is permitted to pass through the switch into evaluator latch 2062.

If the modulo nine check has been performed satisfactorily, the contents of evaluator latch 2062 should be a binary-decimal 9. The remainder of the check involving the circuitry to produce a signal at terminal 2086 or terminal 2085 has been described above.

Convert

It was stated above that during a subtraction operation the operand having the smaller index is subtracted from the operand having the larger index, whenever the indices are unequal. If the indices of operands 1 and 2 are equal, the calculator does not know which operand is the larger of the two. In order to proceed with the subtraction operation it is assumed that operand 1 is larger than operand 2 so that the latter is subtracted from the former. It is evident that this guess may produce an incorrect result. If the guess is incorrect the difference between the operands, that is, the arithmetic answer determined by the main calculator, is actually the nine's complement of the proper answer. Thus, if the guess is incorrect a conversion cycle follows a subtraction during which the result stored is passed through a nine's complement generator so as to convert it to the true answer, and then is re-entered into the proper storing register. Since it is not known until the 16th interval of a subtraction cycle whether or not the calculator made the proper choice, the modulo nine check is performed in the manner described above for a subtraction operation. If the choice made by the calculator in subtracting operand 2 from operand 1 was correct, the modulo nine check should be correct. However, if the choice made by the calculator was incorrect so that a conversion cycle must follow the subtract cycle, the modulo nine check made during the subtract cycle will not be correct. In this case the modulo nine check is suppressed and is performed a second time during the conversion cycle so as to obtain the proper result.

The modulo nine value of operand 1 is stored in evaluator latch 2066 and the modulo nine of operand 2 is stored in evaluator latch 2069. These values were determined during a subtraction cycle and should be correct irrespective of which operand was subtracted from the other one. Since the potential on terminals 2059 and 2058 remain Up the value stored in latches 2066 and 2069 during the subtraction cycle will continue to be stored therein. Thus, during the conversion cycle it is not necessary to redetermine the modulo nine values of operands 1 and 2.

It was pointed out above under the discussion of the subtraction cycle that the modulo nine value of a difference between the operands is determined by and stored in evaluator latch 2062. If a conversion cycle is necessary, the value stored in evaluator latch 2062 is incorrect and, thus, must be eliminated. During the conversion cycle the arithmetic answer which has been converted to its proper form is entered into evaluator latch 2062 so as to determine the modulo nine value thereof. During the end of the conversion cycle the modulo nine value of operand 1 is entered into evaluator latch 2062 after which the nine's complement of the modulo nine of operand 2 is entered into evaluator latch 2062. Thus, at the end of the conversion cycle the binary-decimal digit contained within latch 2062 should be a 9, if the modulo nine check was performed satisfactorily.

If the calculator made the wrong choice in subtracting operand 2 from operand 1 where the indices of the operands were initially equal, a positive one microsecond pulse will appear on terminal 205 during the 16th interval of the subtraction cycle. The appearance of this pulse indicates that a conversion cycle will follow the subtraction cycle. The pulse on terminal 205 renders inverter 1991 fully conductive causing the right-hand input of And circuit 1988 to be Down for one microsecond. This causes the latch, of which And circuit 1988 is a part, to be de-energized so that the output of delay circuit 1990, and, thus, terminal 2076 goes Down at the beginning of the 1st interval of the convert cycle. Fig. 41 indicates the wave forms occurring during a conversion cycle. At the top of the chart it should be noted that the 16th interval of the subtraction cycle is immediately followed by the 1st interval of the convert cycle, that is, a conversion cycle immediately follows a subtraction cycle whenever a conversion cycle is to occur. It is apparent from the chart that terminal 2076 is Down during the 1st and 2nd intervals of the conversion cycle.

A one microsecond signal appears on terminal 202 during the 1st interval of the conversion cycle. This signal is delivered through delay circuit 1985 and Or circuit 1989 causing the output of delay circuit 1990 to go Up at the beginning of the 3rd interval. The fact that the output of delay circuit 1990 goes Up causes the latch which includes units 1988—1990 to be thereafter energized. The reason And circuit 1988 can be operated during this time is that the center input thereof is Up since terminal 207 is Up throughout the subtraction and conversion cycles.

The fact that terminal 2076 is Down for two microseconds disconnects the loop from the output terminals to the input terminals of evaluator latch 2062. The fact that this loop is broken causes the contents of latch 2062 to be eliminated.

The fact that terminal 2076 is Down during what would be the 17th and 18th intervals of the subtraction cycle (that is the 1st and 2nd intervals of the conversion cycle) in effect, suppresses the determination of whether or not the binary-decimal output of evaluator latch 2062 is the digit 9. Since terminal 2079 goes Down at the end of the 16th interval, there is no input to switch 2057 and consequently delay circuit 2056 does not deliver a one microsecond sample pulse to the And circuits 2048 and 2052. Thus, the potentials appearing on terminals 2085 and 2086 cannot be affected during the end of the subtraction cycle.

The potential on terminal 2054 remains Down during a conversion cycle since evaluator latch 2066 already contains the modulo nine of operand 1. The potential on terminal 2055 also remains Down throughout the conversion cycle. This is satisfactory since evaluator latch 2069 already contains the modulo nine of operand 2. Accordingly, the potentials on terminals 2059 and 2058 remain Up throughout the conversion cycle.

It was stated above that the potential on terminal 2076 goes Up at the beginning of the 3rd interval of the conversion cycle and remains Up thereafter. The fact that this terminal is Up permits the evaluator latch 2062 to continuously store information to be entered therein during the conversion cycle.

The potential appearing on terminal 2075 is generated in the same manner as during a subtraction cycle. Terminal 2075 is Up during the 3rd through the 15th time intervals inclusive. During this time the output of the adder which appears on terminals 232 is entered through switch 2060 into evaluator latch 2062. Thus, at the beginning of the 16th time interval of the conversion cycle the modulo nine of the difference between operands 2 and 1 has been entered into latch 2060.

Terminal 2080 is Up during the 1st through the 15th intervals of a conversion cycle. It was pointed out under the discussion of the subtraction cycle that if terminal 2080 is Up at the time that the one microsecond pulse appears on terminal 222 (16th interval), And circuit 2029 is energized so as to emit a positive one microsecond pulse. It was stated above that under these conditions terminal 2082 is Up during the 16th interval and terminal 2083 is Up during the 17th interval. It was further noted that the output of delay circuit 2024 and, thus, terminal 233 is Up during the 17th and 18th intervals.

By virtue of terminal 2082 being Up during the 16th interval of the conversion cycle, the modulo nine of operand 1 appearing at the output terminals of evaluator latch 2066 is entered through switch 2073 and delay circuits 2074 and through the right-hand portion of switch 2060 to the input terminals of evaluator latch 2062. The fact that terminal 2083 is Up during the 17th interval causes the nine's complement of the modulo nine of operand 2 (which appears at the output terminals of the nine's complement generator 2072) to be delivered through switch 2073, delay circuits 2074 and switch 2060 so as to be applied to the input terminals of evaluator latch 2062 during the 18th interval. Thus, beginning at the 19th interval it is possible to sample the output information of evaluator latch 2062 in order to determine whether the modulo nine check has been correctly made.

The pulse appearing on terminal 222 during the 16th interval causes a pulse to appear at the output of delay circuit 2039 during the 18th interval which is applied to switch 2057. It was explained under the discussion of the subtract cycle that the pulse appearing at the output of delay circuit 2039 is used to sample the binary-decimal information appearing at the outputs of evaluator latch 2062. This sampling occurs during the conversion cycle in the same manner as described for the subtraction cycle.

Thus, if the modulo nine check is valid, terminal 2085 goes Up at the beginning of the 18th interval of the conversion cycle. On the other hand, if a modulo nine error has occurred, the output terminal 2086 of the modulo nine check failure latch goes Up at the beginning of the 20th interval, as indicated in Fig. 43.

In summary, during a conversion cycle the main calculator merely obtains the nine's complement value of the difference between the operands as determined during the subtraction cycle. However, since the modulo nine computer utilized the modulo nine of the complementary difference during the subtraction cycle, it is necessary to perform the modulo nine checking a second time (that is, during the conversion cycle) utilizing the modulo nine value of the true difference. Since a conversion cycle immediately follows a subtraction cycle the contents of the final evaluator latch (2062) is sensed for the presence of a binary-decimal nine only at the end of the conversion cycle.

Multiply

The first step in performing a modulo nine check for a multiply operation is to obtain the modulo nine values for the multiplicand, the multiplier and the product. Each of these values is retained in a separate evaluator latch. The modulo nine computer follows one of two processes depending upon whether the modulo nine of the multiplier (a) is less than 5, or (b) is equal to 5, or greater.

If the modulo nine value of the multiplier is less than 5, the nine's complement of the modulo nine value of the multiplicand is added to the modulo nine value of the product a number of times equivalent to the value of the modulo nine value of the multiplier. Thus, if the modulo nine value of the multiplier is equal to 3, the nine's complement of the modulo nine value of the multiplicand is added to the contents of the evaluator latch containing the modulo nine value of the product three times.

On the other hand, if the modulo nine value of the multiplier is equal to or greater than 5, the modulo nine value of the multiplicand is added to the modulo nine of the product a total number of times equal to the nine's complement of the modulo nine value of the multiplier. For example, if modulo nine value of the multiplier is 7, the modulo nine value of the multiplicand is added to the latch containing the modulo nine value of the product (9–7) or 2 times.

The above two rules are, in effect, operating in accordance with the following formula:

$$\text{Mod } 9 \ (P) - (\text{Mod } 9 \ (Mc) \times \text{Mod } 9 \ (Mp)) = 9$$

where Mc is the multiplicand and Mp is the multiplier. P is the product.

The multiplier is entered into evaluator latch 2066 (Fig. 32) so as to obtain the modulo nine value of the multiplier. The multiplicand is entered into evaluator latch 2069. During the multiplication cycle evaluator latch 2062 (Fig. 33) determines the modulo nine value of the product. If the modulo nine value of the multiplier is less than 5, the output of nines complement generator 2072 (which is the nines complement of the modulo nine value of the multiplicand) is passed through switch 2073 and is applied to the right-hand inputs of switch 2060. Control terminal 233 is Up a number of microseconds equivalent to the number of times that the information delivered to switch 2060 is to be added to the contents of evaluator latch 2062. If, on the other hand, the modulo nine value of the multiplier is equal to or greater than 5, terminal 2084 is Up so that the information appearing at the output terminals of evaluator latch 2069 is delivered through switch 2073 to the right-hand input terminals of switch 2060. Terminal 233 in this case is Up a total number of microsecnds equal to the nines complement of the modulo nine of the multiplier. The control signals to accomplish these results are illustrated in the timing chart (lower right of Fig. 46). The elapsed time shown at the top of the chart corresponds with the elapsed time of the multiplication cycle, as illustrated in Fig. 47. It may be noted that we are not concerned with the multiplication cycle herein except for certain of the terminals which are also shown in Fig. 45. The designations of the graphs are those used in drawings of the main calculator and are given here merely to differentiate the different terminals to which they apply, but which are not shown.

The signal on terminal 208 is applied through Or circuit 1964, causing terminal 2055 to go Up at the beginning of the 3rd interval of the elapsed time (1st interval of the control counter). The signal on terminal 208 is also applied through Or circuit 1962 to delay circuit 1963 causing the output thereof to go Up at the beginning of the 4th interval. Due to the fact that the signal on terminal 211 is Up, the outputs of Or circuit 1951 and cathode followers 1953 are Up causing the right-hand input of And circuit 1961 to be Up. The signal on terminal 211 is also applied to the second from the left input of switch 1956. However, the left-hand input of this switch is Down since terminal 219 of the control counter is Down. Accordingly, the output of switch 1956 is Down causing the output of Or-inverter 1957, and thus, the center input of And circuit 1961, to be Up. Accordingly, the signal at the output of delay circuit 1963 causes the latch composed of units 1961—1963 to be energized.

During the 15th interval terminal 219 is Up causing switch 1956 to be energized. This delivers a positive signal to Or-inverter 1957 rendering the unit fully conductive so that the output thereof goes Down. It follows that the outputs of And circuit 1961 and Or circuit 1962 go Down during the 15th interval while the output of delay circuit 1963, and thus, the signal on terminal 2055, go Down during the 16th interval. The signal on terminal 2055 is illustrated in Fig. 46.

The signal on terminal 2055 permits the multiplicand to be entered through switch 2067 into evaluator latch 2069 during the time that the multiplicand is being shifted out of Register 2 of the main calculator.

The signal on terminal 211 energizes Or circuit 1974 (Fig. 28), and thus, delay circuit 1975 causing terminal 2058 to go Up at the beginning of the 3rd interval (elapsed time). The right-hand input of And circuit 1972 is Up due to the signal on terminal 211. Consequently, the energization of delay circuit 1957 causes the latch composed of units 1972 and 1975 to be continuously thereafter energized so that terminal 2058 is Up. The fact that terminal 2058 is Up enables the operand 2 evaluator latch 2069.

Terminal 209 which is Up during the 20th through the 32nd intervals (the 2nd through the 14th intervals of the second cycle of the control counter) is applied through Or circuit 1954 (Fig. 27) to the output terminal 2054. The multiplier is available digit by digit at the output terminals of Register 1 of the main calculator as the Register is shifted to the right during these 2nd through the 14th intervals of the second cycle of the control counter. The fact that terminal 2054 is Up permits the multiplier which appears in a serial fashion on the input of switch 2063 to be entered through this switch into evaluator latch 2066.

The signal on terminal 211 energizes Or circuit 1968, and thus, the latch composed of units 1966, 1967 and 1969 is energized. The output of delay circuit 1969, which appears on terminal 2059 goes Up at the beginning of the 3rd interval and remains Up thereafter. The fact that terminal 2059 is Up enables the evaluator latch 2066.

The signal on terminal 201 is applied through Or circuit 1982 (Fig. 28) to delay circuit 1983, thereby causing output terminal 2075 to go Up at the beginning of the 3rd interval and remains Up until at least the beginning of the 33rd interval. The latch which includes delay circuit 1983 is not energized since And circuit 1980 is never operated during a multiplication cycle. The output of Or circuit 1892 goes Down at the beginning of the 32nd interval causing the output of delay circuit 1983 to go Down at the beginning of the 33rd interval. However, if the product obtained during the multiplication operation contains 26 binary-decimal digits, terminal 210 is Up during the 32nd interval, causing Or circuit 1982 to be operated so that the output of delay circuit 1983 (terminal 2075) is Up during the 33rd interval. Terminal 2075 is Up during intervals 3 through 32 if the product contains 25 digits, but is Up through interval 33 if the product contains 26 digits.

It is apparent that during the time between the beginning of the 3rd interval (the beginning of the 1st interval of the first cycle of the control counter) and the beginning of the 33rd interval (the 15th interval of the second cycle) the product is available at the input terminals 232. The fact that terminal 2075 is Up permits the information appearing on terminals 232 to be entered through switch 2060 into evaluator latch 2062.

The signal on terminal 211 is delievered through Or circuit 1989 and delay circuit 1990 to output terminal 2076. This terminal goes Up at the beginning of the 3rd interval as shown in Fig. 46. The fact that terminal 2076 is Up throughout the multiplication cycle enables the evaluator latch 2062.

The potentials appearing on terminals 233 and 2085 (output of 2050, Fig. 34) are shown for the various values of the modulo nine of the multiplier which is stored in evaluator latch 2066. Briefly, if the modulo nine of the multiplier is 9, terminal 233 (output of 2024, Fig. 30) remains Down. If the modulo nine of the multiplier is 1 or 8, terminal 233 is Up for one microsecond during the 37th interval. If the modulo nine of the multiplier is 2 or 7, terminal 233 is Up for two microseconds during the 38th and 39th intervals. This terminal is Up for three microseconds during the 37th, 38th and 39th intervals if the modulo nine of the multiplier is 3 or 6. Finally, if the modulo nine of the multiplier is 4 or 5, terminal 233 is Up for four microseconds during the 36th, 37th, 38th and 39th intervals.

Terminal 246 (Multiplication Control, Fig. 29) goes Up at either the beginning of the 32nd or the 34th interval causing Or circuit 1997 to be energized thereby operating delay circuit 1998. Since terminal 231 is Up the output of delay circuit 1998 energizes And circuit 1996 causing the latch composed of these units to be continuously energized. The signal at the output of delay circuit 1998 is applied to And circuits 2000, 2003, 2004 and 2007. The remaining inputs to these And circuits are energized by signals appearing on terminals 247 (output of evaluator latch 2066) which is the modulo nine of the multiplier.

If the binary-decimal digit appearing on terminals 247 is 0, 1, 2 or 3, the inputs to Or-inverter 2002 are both Down causing the right-hand input of And circuit 2003 to be Up. Coincidence in this And circuit causes the output thereof to be Up thereby energizing Or circuit 2037 so that terminal 2083 is Up. If the binary-decimal digit on terminals 247 is a 4, the left-hand input of And circuit 2000 is Up. Since the one bit and two bit terminals are Down, the Or-inverter circuit 1999 is not operated so that the center input of And circuit 2000 is Up. Coincidence within And circuit 2000 causes the output thereof to go Up, which in turn energizes Or circuit 2037 and causes terminal 2083 to go Up. It should be noted that the outputs of And circuits 2000 and 2003 are connected together.

Thus, it can be stated that whenever the modulo nine of the multiplier appearing on terminals 247 is less than 5, the common output of And circuits 2000 and 2003 is Up causing terminal 2083 to be Up. Whenever terminal 2083 is Up the nine's complement of the modulo nine of the multiplicand is delivered through switch 2073 and delay circuit 2074 to the right-hand inputs of switch 2060. In this case terminal 2083 will remain Up as long as evaluator latch 2066 continues to contain the modulo nine of the multiplier.

The center input of And circuit 2007 is Up whenever the binary-decimal digit on terminals 247 contains a 4 bit, that is, has a binary-decimal value of 4 through 7. If a 1 bit or 2 bit is present on terminals 247, Or circuit 2006 is operated causing the right-hand input of And circuit 2007 to be Up. Accordingly, if the binary-decimal digit on terminals 247 is a 5, 6 or 7, coincidence occurs within And circuit 2007 causing the output thereof to be Up. This signal is delivered through Or circuit 2038 causing terminal 2084 to be Up. If the binary-decimal digit on terminals 247 is an 8 or 9, the 8 bit terminal is Up causing the right-hand input of And circuit 2004 to be Up. The outputs of And circuits 2004 and 2007 are connected in a common cathode Or circuit arrangement. Thus, if coincidence occurs in either of these units Or circuit 2038 is operated, and terminal 2084 is Up. Whenever the latter terminal is Up the modulo nine of the multiplicand, stored in evaluator latch 2069, is delivered through switch 2073 and delay circuit 2074 to the right-hand inputs of switch 2060.

Figure 29:
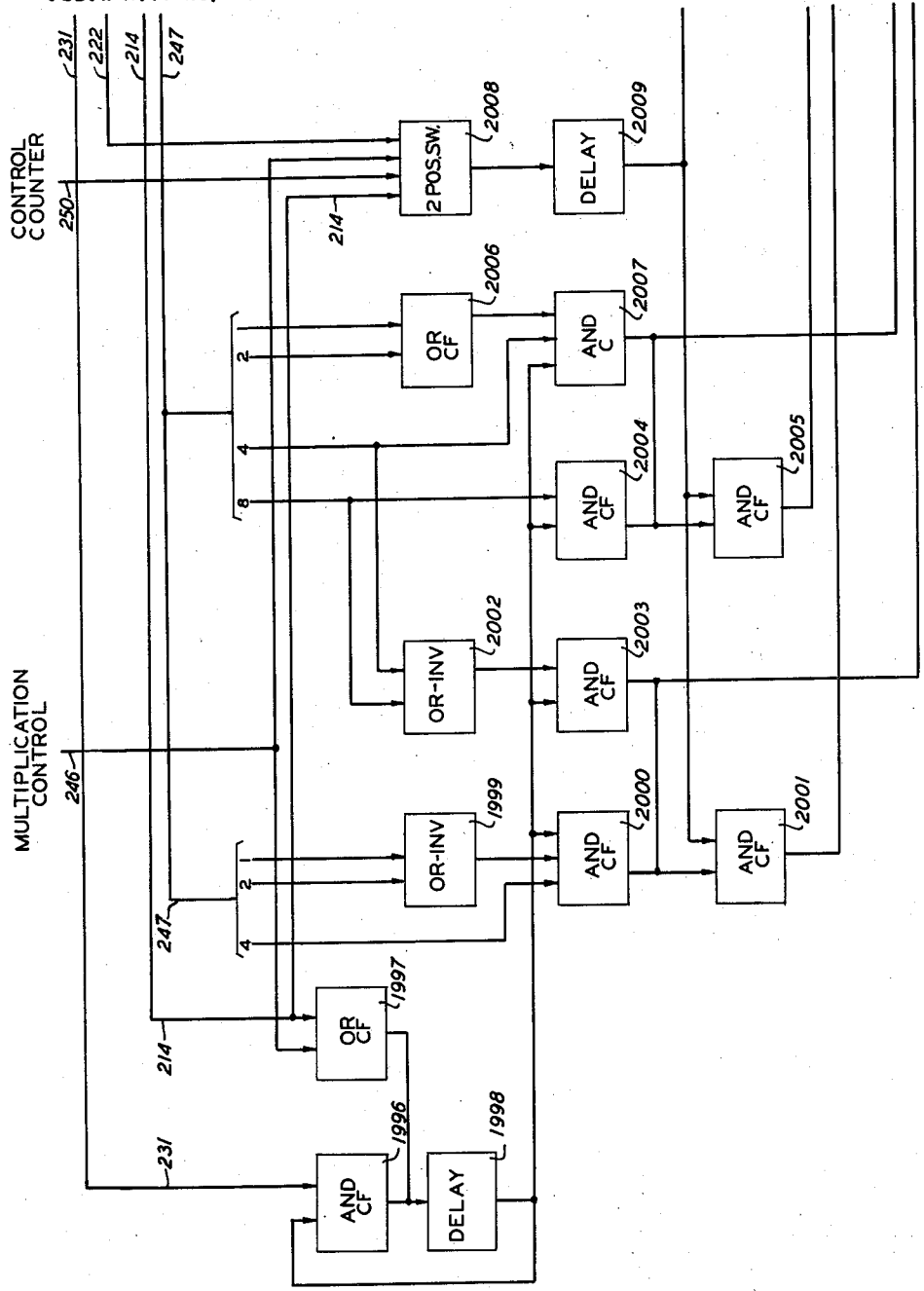
Figure 30:
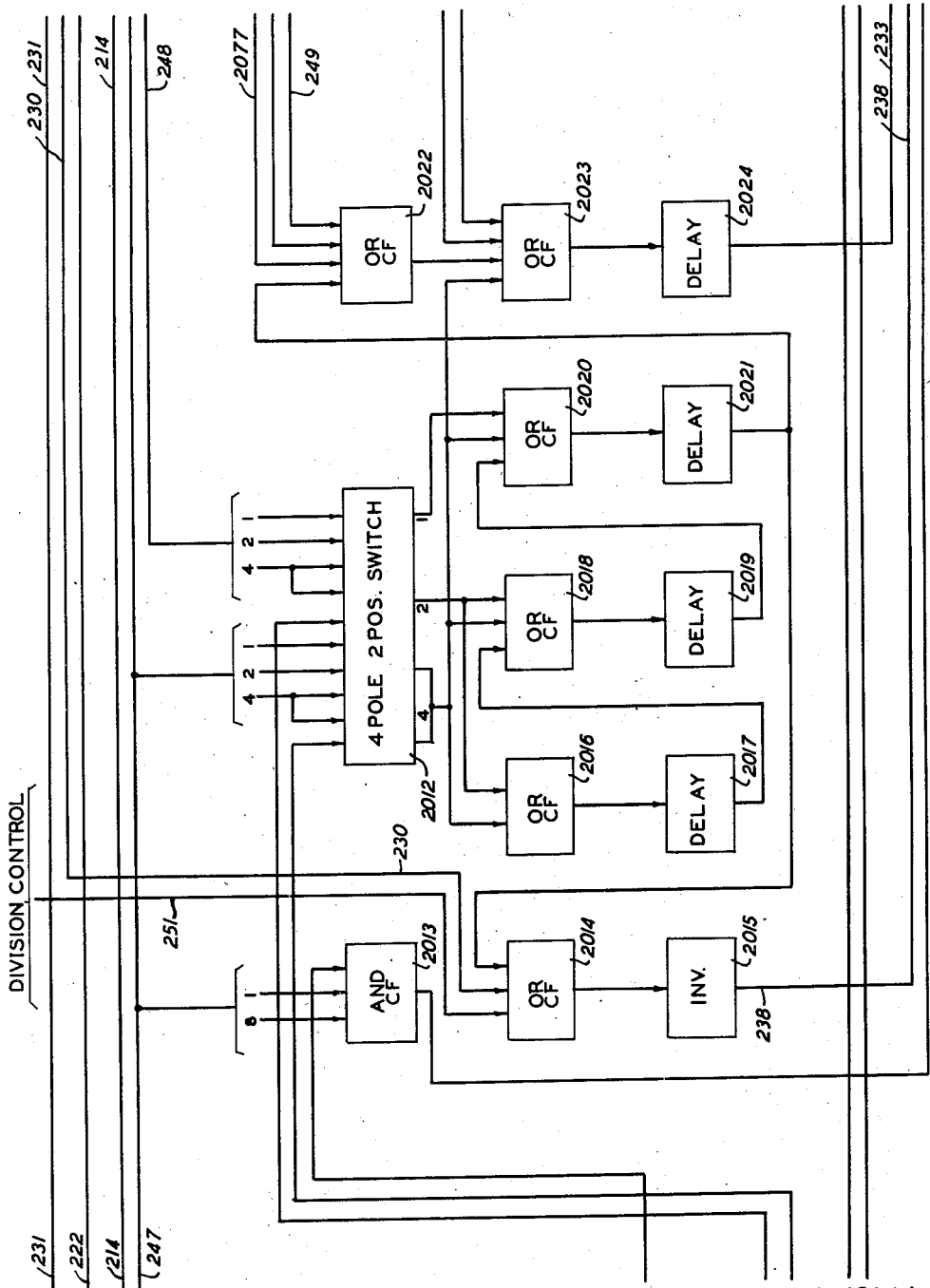
Figure 31:
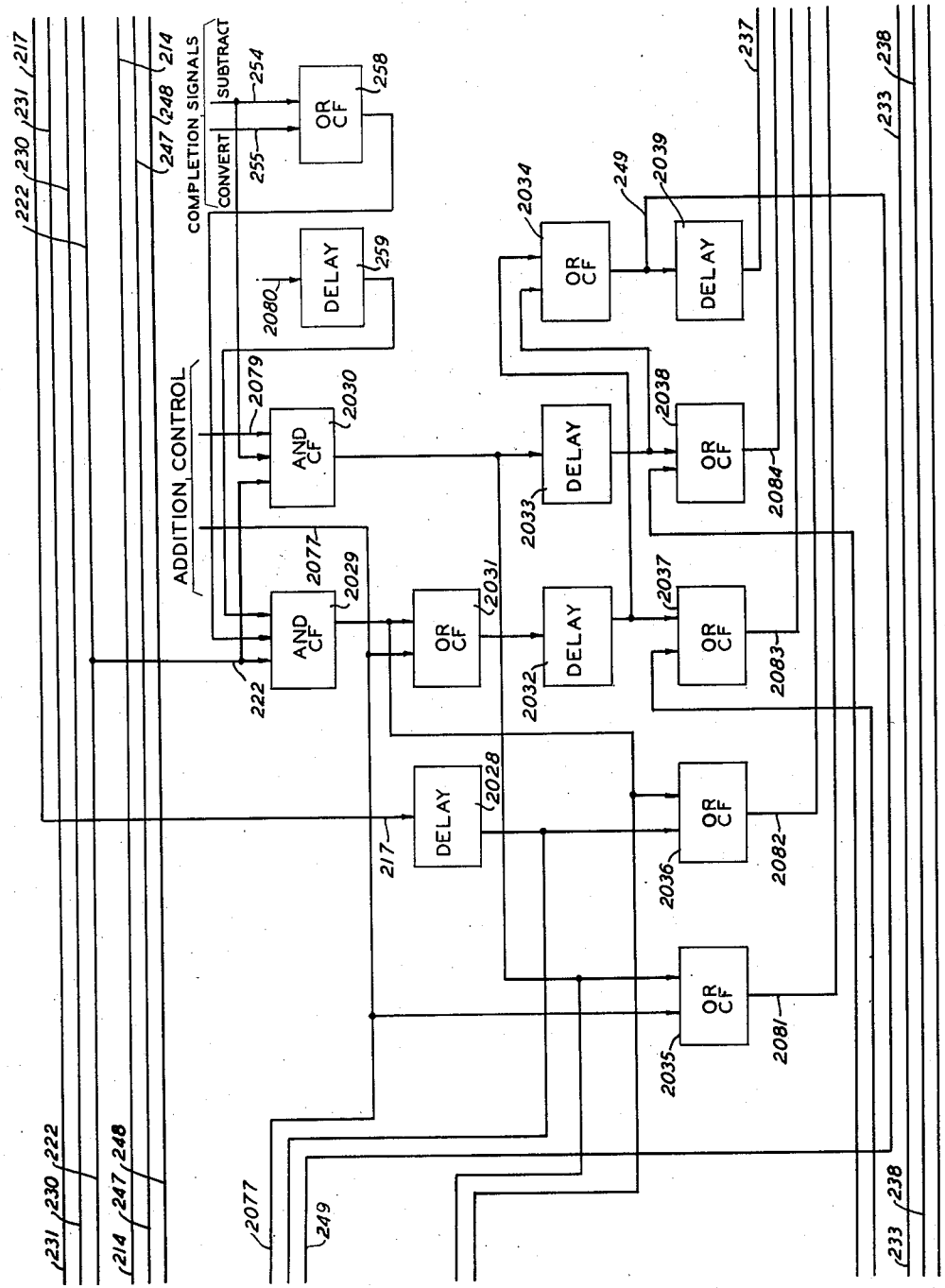

The signal on terminal 246, described above, is applied to the second from the right input of switch 2008 (Fig. 29). The signal appearing on terminal 222 during the 34th interval is applied to the right-hand input of switch 2008 causing coincidence to occur therein for one microsecond. This pulse is delivered through delay circuit 2009 so as to be applied to And circuits 2001, 2005 and 2013 during the 35th interval. Briefly, if the modulo nine value of the multiplier is less than 5, equal to or greater than 5, or equal to 9, the appropriate And circuit of the group 2001, 2005 or 2013, respectively, is operated.

If the modulo nine of the multiplier appearing on terminals 247 is equal to 9, And circuit 2013 is operated thereby delivering a positive one microsecond pulse through switch 2057 to the delay circuit 2056. The output of this delay circuit is Up during the 36th interval causing the modulo nine check release latch to be energized providing the modulo nine check was properly made, so that terminal 2085 is Up continuously from the beginning of the 36th interval.

It was stated earlier that if the modulo nine of the multiplier is less than 5, the nine's complement of the modulo nine of the multiplicand is added to the modulo nine of the product a number of times equal to the modulo nine of the multiplier. This, in effect, means that terminal 233 must be Up a total number of microseconds equal to the value of the modulo nine of the multiplier.

If the modulo nine value of the multiplier is less than 5, the left-hand input of And circuit 2001 is Up. The one microsecond pulse appearing at the output of delay circuit 2009 during the 35th interval causes coincidence therein so that the control terminal for the left-hand portion of switch 2012 is Up during this time. The fact that the output of And circuit 2001 is Up for one microsecond permits the information appearing on the 1, 2 and 4 bit terminals of the group 247 to be delivered through switch 2012. The information appearing on the one bit input terminal appears on the right-hand output terminal switch 2012, the 2 bit information appears on the center output, and the 4 bit information appears on the left-hand output.

In the case where the modulo nine of the multiplier is equal to or greater than 5, And circuit 2005 is operated so as to apply a one microsecond pulse to switch 2012 during the 35th interval. Whenever the output of And circuit 2005 is Up the information appearing on terminals 248, which is applied to the right-hand group of inputs to switch 2012, is permitted to pass through the switch and appear on appropriate output terminals.

If the binary-decimal information delivered through switch 2012 (Fig. 30) contains a 1 bit, a positive one microsecond pulse is applied to Or circuit 2020 during the 35th interval causing the output of delay circuit 2021 to be Up during the 36th interval. The signal at the output of this delay circuit is delivered through Or circuits 2022 and 2023 to delay circuit 2024 causing terminal 233 to be Up during the 37th interval.

The signal at the output of delay circuit 2021 is applied through Or circuit 2014 to inverter 2015 causing this unit to be fully conductive. Accordingly, the output 238 of inverter 2015 is Down causing the left-hand input of switch 2057 to be Down. However, since the output of delay circuit 2021 goes Down one microsecond before the output of 2084 goes Down, the output of inverter 2015 will be Up during the last microsecond during which the output of delay circuit 2024 is Up. This permits switch 2057 to be operated so as to energize the modulo nine check release latch which provides the signal appearing on terminal 2085 as described previously.

If the binary-decimal information delivered through switch 2012 contains a binary-2 bit, a one microsecond pulse during the 35th interval is applied through Or circuits 2016 and 2018 to delay circuits 2017 and 2019 respectively. The pulse appearing at the output of delay circuit 2017 during the 36th interval is delivered through Or circuit 2018 and applied to delay circuit 2019 so as to appear at the output thereof during the 37th interval. However, the output of delay circuit 2019 goes Up during the 36th interval due to the pulse applied to the right-hand input of Or circuit 2018 during the 35th interval. The signal at the output of delay circuit 2019 is applied through Or circuit 2020 to delay circuit 2021 causing the output thereof to be Up during the 37th and 38th intervals. The signal at the output of delay circuit 2021 is then delivered through Or circuits 2022 and 2023 to delay circuit 2024 causing the output thereof to be Up during the 38th and 39th intervals.

It is apparent that if the information delivered through switch 2012 contains a binary 1 bit and a 2 bit, the output of delay circuit 2024 will be Up during the 37th, 38th and 39th intervals.

Whenever the information delivered through switch 2012 contains a binary 4 bit, a one microsecond pulse is applied during the 35th interval to Or circuits 2016, 2018, 2020 and 2023. The pulse applied to Or circuit 2023 causes the output of delay circuit 2024 to be Up during the 36th interval. The pulse applied through Or circuit 2020 causes the output of delay circuit 2021 to be Up during the 36th interval and causes the output of delay circuit 2024 to be Up during the 37th interval. Accordingly, the pulses applied to Or circuits 2016 and 2018 cause the output of delay circuit 2021 to be Up during the 37th and 38th intervals and causes the output of delay circuit 2024 to be Up during the 38th and 39th intervals. The output of unit 2024 (terminal 233) is Up during the 36th through the 39th intervals when a 4 bit is present.

Thus, it is apparent that if the modulo nine of the multiplier is less than 5, the information appearing on terminals 247 is delivered through switch 2012 so as to eventually cause terminal 233 to be Up for a total number of microseconds equal to the value of the modulo nine of the multiplier (Fig. 46). Since terminal 2083 is also Up during this time, the nine's complement of the modulo nine of the multiplicand is delivered through units 2073 and 2074 and 2060 so as to be added to the contents of evaluator latch 2062. On the other hand, if the modulo nine of the multiplier is equal to or greater than 5, the nine's complement of the modulo nine of the multiplier appearing on terminal 248 is delivered through switch 2012 so as to cause terminal 233 to be Up for a total number of microseconds equal to the value of the nine's complement of the modulo nine of the multiplier. At this time terminal 2084 would be Up thereby permitting the modulo nine of the multiplicand and pass through units 2073, 2074 and 2060 so as to be entered into the evaluator latch 2062.

It should be noted that terminal 2085 goes Up at the end of the last microsecond interval during which terminal 233 is Up. Of course, terminal 2085 is Up only if the check is properly made.

*Division*

A modulo nine check is performed on a division problem by utilizing some of the steps explained above which are used during addition and multiplication operations. A division problem is characterized by the following formula where Di represents the dividend, Do represents the divisor, Q the quotient, and R the remainder.

$$\frac{Di}{Do} = Q + \frac{R}{Do}$$

This formula is rearranged in the following form.

$$Di - QDo - R = 0$$

The modulo nine computer operates on the following formula:

$$\text{Mod } 9 \text{ (Di)} - \text{Mod } 9 \text{ (Q)} \times \text{Mod } 9 \text{ (Do)} - \text{Mod } 9 \text{ (R)} = 9$$

It is apparent that the dividend Di and the result R are handled in a manner similar to that used in the addition process. It is apparent that the quotient Q and the divisor Do are accommodated in a manner similar to a multiplication operation. The divisor Do is treated in the same manner as the multiplicand and the quotient Q is treated in the same manner as the multiplier.

Preparatory to a division operation the dividend and the divisor are located in the main calculator in what are known as Register 1 and Register 2 (not shown) respectively. (Register 1 and Register 2 of the main calculator may be generally of the type disclosed and claimed in the U. S. application Serial Number 257,747 of Byron L. Havens et al., filed November 23, 1951, now Patent No. 2,782,305.) The divisor is entered into evaluator latch 2069 so as to determine and store the modulo nine value thereof. The dividend is entered into evaluator latch 2066. The modulo nine of the dividend which is being stored in latch 2066 is then transferred through switch 2073 to evaluator latch 2062. At this point latch 2062 contains the modulo nine of the dividend, latch 2066 is blank, and latch 2069 contains the modulo nine of the divisor. As the quotient digits are determined during the division operation at a rate of one every 16 microseconds and are stored in Register 1, these digits are entered into evaluator latch 2066. Thus, near the end of the division cycle this latch should contain the modulo nine value of the quotient.

At the end of the division operation of the main calculator the nine's complement of the remainder is entered into evaluator latch 2062. Referring to the last equation above, evaluator latch 2062 now contains the modulo nine of the dividend minus the modulo nine of the remainder. In order to complete the modulo nine check it is necessary to combine the product of the modulo nine of the quotient and the modulo nine of the divisor (respectively stored in latches 2066 and 2069) with the quantity now stored in evaluator latch 2062. This process is accomplished by respectively treating the divisor and the quotient in the same way as the multiplicand and multiplier were treated in the multiplication operation described hereinabove. Thus, if the modulo nine of the quotient is less than 5, the nine's complement of the modulo nine of the divisor is added to the contents of latch 2062 a number of times equal to the value of the modulo nine of the quotient. On the other hand, if the modulo nine of the quotient is equal to or greater than 5, the modulo nine of the divisor is added to the contents of evaluator latch 2062 a total number of times equal to the nine's complement of the modulo nine of the quotient. At the completion of the modulo nine check the binary-decimal output of latch 2062 is a 9, providing the check is performed satisfactorily. The manner in which the modulo nine check release latch or the modulo nine check failure latch is energized has been described hereinabove.

The complete division cycle as performed by the main calculator comprises a plurality of cycles of sixteen microseconds each. In the description which follows, the term "second cycle" refers to the second sixteen microsecond cycle. If the first quotient digit is a zero, the control counter will execute sixteen cycles of sixteen microseconds each. However, if the first quotient digit is not a zero, the control counter will execute fifteen cycles. The following descriptive matter will refer to the division timing chart Figs. 49 and 50. In this drawing cycle "m" is the cycle during which the 13th quotient digit appears. Again, in these drawings, a number of graphs appear that do not apply to any of the terminals shown, since this timing chart is taken directly from the chart prepared for the complete calculator including the main calculator. The reference characters other than those identifying terminals actually shown in the present drawings relate to a system of identification of certain engineering drawings of the complete calculating device and only need be regarded here as a means of identification but of no significance in respect to the present disclosure. The divisor is available during the 2nd through the 14th intervals of the first cycle and is delivered as operand 2 through switch 2067 and delay circuits 2068 to the inputs of evaluator latch 2069. In order to cause switch 2067 to be operative during the time that the divisor is delivered to this switch, control terminal 2055 must be Up.

Terminal 215 is Up during the first time interval of the first cycle, as shown in Fig. 49. The signal on this terminal is delivered through Or circuit 1962 and delay circuit 1963 causing Or circuit 1964 to be operative and terminal 2055 to go Up at the beginning of the 2nd interval. The signal at the output of delay circuit 1963 is delivered to the left-hand input of And circuit 1961. Providing the center and right-hand inputs of this And circuit are Up the latch which includes delay circuit 1963 will be continuously energized. Terminal 218 goes Up at the beginning of the first interval of the first cycle and remains Up thereafter. The signal on terminal 218 is delivered through Or circuit 1951 and cathode follower 1953 to the right-hand input of And circuit 1961. Providing both of the inputs of Or-inverter 1957 are Down the output thereof is Up causing the center input of And circuit 1961 to be Up. Thus, it can be stated that the latch including units 1961—1963 is energized causing terminal 2055 to go Up at the beginning of the 2nd interval of the first cycle.

Figure 27:
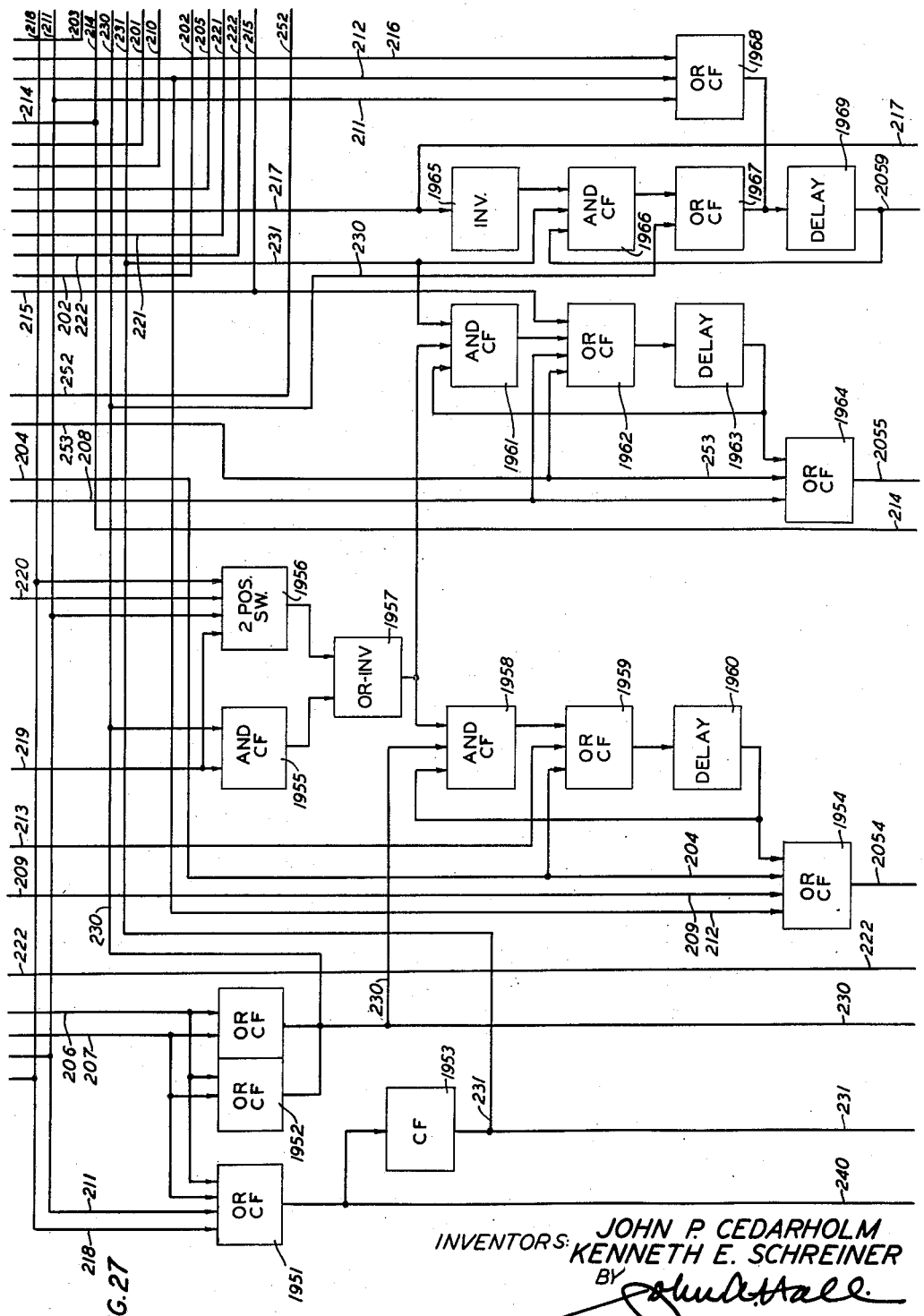
Figure 28:
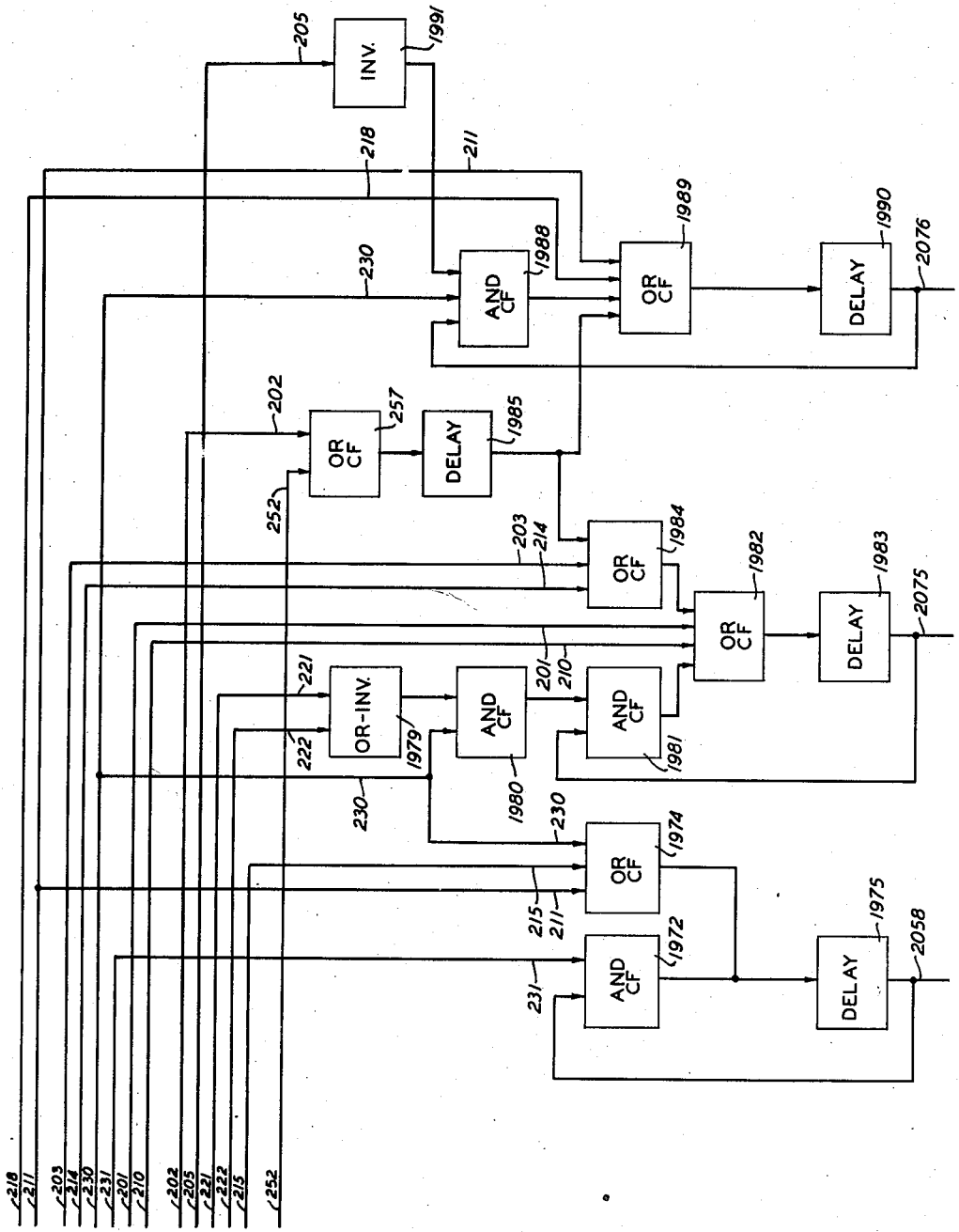

The signal on terminal 218 is delivered to the right-hand input of switch 1956 (Fig. 27). During the 14th interval of every 16 microsecond cycle terminal 220 is Up. Consequently, coincidence occurs between the right-hand pair of inputs to switch 1956 causing the output thereof to go Up for one microsecond (the 14th interval) of every 16 microsecond cycle including the first. The operation of switch 1956 renders Or-inverter 1957 fully conductive causing the output thereof and thus the center input of And circuit 1961 to be Down. The lack of coincidence within this And circuit disables the latch causing the output of delay circuit 1963 to go Down at the end of the 14th interval of the first cycle. Since Or circuit 1962 is not energized at a subsequent time during the complete division cycle, output terminal 2055 is Up only through the 14th interval of the first 16 microsecond cycle. As indicated above, this is the time during which the last divisor digit is being entered through switch 2067 into evaluator latch 2069.

In order for evaluator latch 2069 to retain the contents stored therein, terminal 2058 must be Up thereby enabling the evaluator latch 2069. The signal on terminal 215 is delivered through Or circuit 1974 to delay circuit 1975 causing the output thereof and terminal 2058 to go Up during the 2nd interval of the first cycle. The output of cathode follower 1953, which is Up whenever terminal 218 is Up, is delivered to the right-hand input of And circuit 1972. Thus, when the output of delay circuit 1975 goes Up, And circuit 1972 is operated causing the latch which includes these units to be continuously energized thereafter. Thus, terminal 2058 goes Up during the 2nd interval and remains Up throughout the completed division cycle.

Thus the signal on terminal 2055 is Up during the 2nd through the 14th intervals of the 1st cycle and the signal on terminal 2058 comes Up at the beginning of the 2nd interval of the first cycle and remains Up thereafter.

The dividend is available in serial fashion at the input terminals of evaluator latch 2066 during the 4th through the 16th time intervals of the first cycle. Thus, during this time, terminal 2054 must be Up.

The signal on terminal 212 is delivered through Or circuit 1954 so as to appear on terminal 2054. As shown in Fig. 49, terminal 212 is Up only during the 4th through the 16th intervals of the first cycle.

The signal on terminal 213, which is Up during the 4th interval of every cycle except the first, is delivered through Or circuit 1959 and delay circuit 1960 causing Or circuit 1954 to be operative and terminal 2054 to be Up during the 5th interval of every sixteen microsecond cycle except the first. The one microsecond signal appearing on terminal 2054 is used to cause each quotient digit to be entered into evaluator latch 2066 as the digits are calculated in the main calculator and then made available.

In order to cause evaluator latch 2066 to continuously store the information contained therein, terminal 2059 must be Up so as to enable this evaluator latch.

The signal appearing on terminal 212 is delivered through Or circuit 1968 (Fig. 27) and delay circuit 1969 so as to appear on terminal 2059. When the output of delay circuit 1969 goes Up the latch, which includes units 1966, 1967 and 1969, will be energized continuously providing the center and right-hand inputs of And circuit 1966 are Up simultaneously. The center input of And circuit 1966 is Up since terminal 218 and thus the output of cathode follower 1953 is Up. The signal appearing on terminal 217 only during the 2nd interval of the 2nd cycle is applied to inverter 1965. Thus, until this time inverter 1965 is non-conductive whereby the right-hand input of And circuit 1966 is Up. Thus, the latch is energized and terminal 2059 goes Up at the beginning of the 5th interval of the first cycle.

Terminal 217, which is Up during the 2nd interval of the second cycle, energizes delay circuit 2028 (Fig. 31) causing a positive pulse to be delivered through Or circuit 2036 and appear on terminal 2082. Terminal 2082 is Up during the 3rd interval of the second cycle. The fact that this terminal is Up causes the modulo nine of the dividend, which is currently appearing at the output terminals of evaluator latch 2066, to be delivered through switch 2073 and delay circuits 2074 to the right-hand group of inputs of switch 2060. Providing terminal 233 is Up during this time the contents of evaluator latch 2066 will be transferred to latch 2062.

The one microsecond pulse at the output of delay circuit 2028 during the 3rd interval of the second cycle is delivered through Or circuits 2022 and 2023 to delay circuit 2024 which causes the output thereof and thus terminal 233 to be Up during the 4th interval of the second cycle. This is the same microsecond during which the output of delay circuits 2074 are applied to switch 2060. The fact that the contents of evaluator latch 2066 has now been transferred to evaluator latch 2062 indicates that it is permissible to empty evaluator latch 2066.

Evaluator latch 2062 is capable of continuously storing the modulo nine value contained therein only if enabled as a result of terminal 2076 being Up. The signal on terminal 218 is delivered through Or circuit 1989 to delay circuit 1990 thereby causing output terminal 2076 to go Up at the beginning of the 2nd interval of the first cycle and remain Up thereafter. The latch of which delay circuit 1990 is a component cannot be energized, since the center input of And circuit 1988 is Down throughout a complete division cycle (both terminals 206 and 207 used in addition are Down during division).

The one microsecond pulse on terminal 217 during the 2nd interval of the second cycle energizes inverter 1965 causing the right-hand input of And circuit 1966 to be Down. This de-energizes the latch causing the output of delay circuit 1969 and thus terminal 2059 to go Down at the beginning of the 3rd interval of the second cycle.

It is permissible to permit terminal 2059 to go Down at this time even though the information at the output terminals of evaluator latch 2066 is not used until the 3rd interval since the rationalizer of latch 2066 contains a delay circuit in series with each output terminal. That is, whatever is applied to the inputs of these delay circuits during the 2nd interval appears at the output terminals thereof during the 3rd interval. The fact that terminal 2059 goes Down at the beginning of the 3rd interval denergizes the evaluator latch 2066 so that it ceases to store the modulo nine of the dividend. Evaluator latch 2066 will now be used to evaluate the modulo nine of the quotient.

The signal on terminal 216, which goes Up at the beginning of the 5th interval of the second cycle (Fig. 49), is delivered through Or circuit 1968 to delay circuit 1969 causing terminal 2059 to go Up at the beginning of the 6th interval of the second cycle and remains Up throughout the division cycle.

A quotient digit is determined and entered into digit position 1 of Register 1 of the main calculator during the 4th interval of every cycle except the first. Thus, at the beginning of the 5th interval the most recent quotient digit is available for entry into the modulo nine computer. As these quotient digits are generated they will be entered into evaluator latch 2066 through switch 2063.

The signal on terminal 213 which is Up during the 4th interval of every cycle except the first, is delivered through Or circuit 1959 to delay circuit 1960 thereby causing Or circuit 1954 to be operative so that terminal 2054 is Up. The latch which includes delay circuit 1960 is not energized since the center input of And circuit 1958 is Down throughout the complete division cycle. Thus, terminal 2054 is Up during the 5th interval of every cycle except the first. As stated above, it is the signal on this terminal which permits the most recent quotient digit stored in Register 1 of the main calculator to be entered into evaluator latch 2066.

At this point in the description we now have the modulo nine of the dividend stored in evaluator latch 2062, the modulo nine of the divisor is stored in evaluator latch 2069, and latch 2066 is accumulating the modulo nine of the quotient as each new quotient digit is generated throughout the division cycle.

The nine's complement of the remainder, that is the 13th partial dividend, appears at the input terminals 232 during the interval starting at the beginning of the 7th interval of the cycle during which the 13th quotient digit appears and continuing through the 4th interval of the following 16 microsecond cycle. Terminal 2075 must be Up during this time so as to permit a remainder appearing on terminals 232 to be entered through the left-hand portion of switch 2060 into evaluator latch 2062 and this is accomplished by terminal 214 through Or circuit 1984, Or circuit 1982, and delay circuit 1983. The left-hand portion of switch 2060 is energized by terminal 2075.

The signal on terminal 214 is delivered through Or circuits 1984 and 1982 to delay circuit 1983 causing terminal 2075 to go Up one microsecond after the time that terminal 214 is Up. In Fig. 50, it is indicated that terminal 214 goes Up at the beginning of the 6th interval of cycle $m$ (cycle during which the 13th quotient digit appears) and goes Down at the beginning of the 4th interval of the succeeding 16 microsecond cycle. This causes terminal 2075 to go Up at the beginning of the 7th interval of cycle $m$ and to go Down at the beginning of the 5th interval of the succeeding 16 microsecond cycle. As stated above, the signal on terminal 2075 permits the nine's complement of the remainder appearing on terminals 232 to be entered through switch 2060 into evaluator latch 2062.

At this point, evaluator latch 2062 contains the difference between the modulo nine of the dividend and the modulo nine of the remainder (modulo nine of the Di+nine's complement of modulo nine of R).

The last time during which switch 2063 is enabled is during the 5th interval of cycle $m$. This is controlled by terminal 213, through Or circuit 1959, delay circuit 1960, Or circuit 1954 and terminal 2054. Thus, after the time that the last quotient digit is entered into latch 2066 it is permissible to combine the contents of latches 2066 and 2062 so as to perform the modulo nine check.

Terminal 214 which goes Up at the beginning of the 6th interval cycle $m$ and remains Up until the beginning of the 4th interval of the succeeding 16 microsecond cycle. The signal on this terminal 214 energizes Or circuit 1997 (Fig. 29) thereby delivering a positive input to delay circuit 1998. The signal at the output of delay circuit 1998 causes the left-hand input of And circuit 1996 to be Up. Since terminal 231 (depending on terminal 218 being Up) is Up, the right-hand input of And circuit 1996 is Up. The coincidence established within this And circuit permits the latch composed of units 1996 and 1998 to be continuously energized until terminal 231 goes Down at some later time.

The signal at the output of delay circuit 1998 is delivered to And circuits 2000, 2003, 2004 and 2007. It was stated hereinabove under the description of a multiplication operation that if the contents of evaluator latch 2066 is less than 5, the common output of And circuits 2000 and 2003 is Up. On the other hand, if the contents of latch 2066 has a binary-decimal value equal to or greater than 5, the common output of And circuits 2004 and 2007 is Up. Thus, if the modulo nine value of the quotient stored in latch 2066 is less than 5, Or circuit 2037 is operated so that terminal 2083 is Up. Or circuit 2038 is operated whenever the modulo nine of the quotient is equal to or greater than 5, so that terminal 2084 is Up. Either terminal 2083 or 2084 will go Up at the beginning of the 7th interval of cycle $m$ and will remain Up until the latches of the main calculator are reset at the beginning of a new calculator suboperation cycle.

If terminal 2083 is Up, the nine's complement of the modulo nine of the divisor is delivered through switch 2073 and delay circuit 2074 so as to continuously appear at the right-hand inputs of switch 2060. However, if terminal 2084 is Up, the modulo nine of the divisor is delivered through switch 2073 so as to appear at the inputs of switch 2060.

During the 3rd interval of every 16 interval cycle, terminal 250 (Fig. 29) is Up so as to apply a positive one microsecond pulse to the second from the left input of switch 2008. The left-hand input of this switch receives the signal on terminal 214. Thus, coincidence occurs within siwtch 2008 only during the 3rd interval of cycle ($m+1$). The signal at the output of switch 2008 appears at the output of delay circuit 2009 during the 4th interval of the same cycle. This pulse is delivered to the right-hand input of each of the And circuits 2001, 2005 and 2013. It was explained hereinabove that And circuit 2001 is operated at this time if the contents of evaluator latch 2066 (modulo nine of the quotient) is less than 5, while And circuit 2005 is operated if said value is equal to or greater than 5. It will be remembered that these units were operated in a similar manner during the checking of a multiplication operation.

If the modulo nine of the quotient is equal to 9, And circuit 2013 is operated during the 4th interval causing the output of delay circuit 2056 to be Up during the 5th interval. If the modulo nine check is satisfactory, terminal 2085 goes Up at the beginning of the 5th interval and remains Up since the modulo nine check release latch is energized. On the other hand, if the modulo nine check was not satisfactory, the modulo nine check failure latch is energized causing terminal 2086 to go Up at the beginning of the 6th interval of the cycle under consideration.

If the modulo nine of the quotient is less than 5, the modulo nine of the quotient is permitted to pass through switch 2012. However, if the modulo nine of the quotient is equal to or greater than 5, the nines complement of the modulo nine of the quotient is passed through switch 2012.

The manner in which the information at the output of switch 2012 (Fig. 30) is effective to provide the proper switching potentials at the output of delay circuit 2024 with respect to the value of the modulo nine or the nine's complement of the modulo nine value of the quotient digit was explained hereinabove under the topic "Multiplication." The time duration of the switching potential appearing on terminal 233 during a division cycle for the various values of the modulo nine of the quotient are similar to those illustrated in the lower right-hand portion of Fig. 46. The actual times during which terminals 233 and 2085 are Up during a division cycle for various values of the modulo nine of a quotient digit are indicated below. Providing the modulo nine value of a quotient digit is 9, terminal 233 remains Down while terminal 2085 goes Up at the beginning of the 5th interval of the cycle ($m+1$). If the modulo nine of a quotient digit is 1 or 8, terminal 233 is Up for one microsecond during the 6th interval of cycle ($m+1$) and terminal 2085 goes Up at the beginning of the 7th interval during the same cycle. Whenever the modulo nine value of a quotient digit is 2 or 7, terminal 233 is Up during the 7th and 8th intervals and terminal 2085 goes Up at the beginning of the 9th interval of cycle ($m+1$). Terminal 233 is Up for three microseconds during the 6th, 7th and 8th intervals whenever the modulo nine value of a quotient digit is 3 or 6. Under these conditions, terminal 2085 goes Up at the beginning of the 9th interval of cycle ($m+1$). Finally, when the modulo nine value of a quotient digit is 4 or 5, terminal 233 is Up during the 5th through the 8th intervals of cycle ($m+1$) and terminal 2085 goes Up at the beginning of the 9th interval. It should be remembered that terminal 2085 goes Up at the times stated only if a satisfactory modulo nine check has been performed.

Here again it should be noted that for each microsecond during which terminal 233 is Up, either the nine's complement of the modulo nine of the divisor or the modulo nine of the divisor is entered through switch 2060 into evaluator latch 2062.

The signal at the output of delay circuit 2021 (Fig. 30), which is delivered through Or circuit 2014 to inverter 2015, causes the output of this inverter to be Up one microsecond earlier than the output of delay circuit 2024. This permits the left-hand pair of inputs of switch 2057 to be Up for one microsecond so as to deliver a pulse through delay circuit 2056 to the output latching circuits so as to determine whether or not the modulo nine check is valid.

What is claimed is:

1. An accumulator for calculating the modulo nine value of a multi-digit decimal number, each digit of which is separately expressed in pure binary notation, consisting of a 1 bit, a 2 bit, a 4 bit and an 8 bit binary adders, each having an output terminal and a carry output terminal and three input terminals, one of said input terminals being connected to the carry output terminal of the next lower order adder, translating means responsive to the production of a two digit decimal number expressed in pure binary notation and including a bit on said carry output terminal of said 8 bit adder for changing said expression into two groups each expressing the digits of said two digit decimal number in pure binary notation, output terminals including 1 bit, 2 bit, 4 bit, 8 bit terminals for the lower order one of said two decimal digits connected to corresponding input terminals of said adders and a 1 bit terminal for the higher order one of said two decimal digits connected to an input terminal of said 1 bit adder.

2. A modulo nine accumulator comprising a 1 bit, a 2 bit, a 4 bit and an 8 bit binary adder, 1, 2, 4 and 8 bit input terminals for said adders, 1, 2, 4, 8 and 16 bit output terminals from said adders connected to a rationalizer for changing any binary representation of a number greater than nine into separate binary representations of the two digits of a sum calculated by said adders, 16 bit, 1 bit, 2 bit, 4 bit and 8 bit output terminals from said rationalizer leading to said binary adders, said 16 bit output terminal leading to said 1 bit adder, and means in said terminals for synchronizing the application of a sum derived and rationalized to said binary adders with the application of a succeeding digital representation over said first input terminals.

3. A modulo nine computer having a plurality of modulo nine accumulators each for converting a multi-digit decimal number involved in an arithmetical operation into a corresponding single digit modulo nine number, said decimal number having each digit thereof expressed in pure binary notation and said accumulators consisting of a combination of a 1 bit binary adder, a 2 bit binary adder, a 4 bit binary adder, and an 8 bit binary adder, said adders in combination having a 1 bit, a 2 bit, a 4 bit, an 8 bit and a 16 bit output terminal, a rationalizer operated over said terminals and having a 1 bit, a 2 bit, a 4 bit, an 8 bit and a 16 bit output terminals, a delay circuit in series with each said output terminal from said rationalizer, said terminals beyond said delay circuits being connected as input terminals to said binary adders, said 16 bit terminal being connected as an input to said 1 bit binary adder, means controlled in a series of prearranged operations for combining the modulo nine numbers in one of said accumulators, means connected to the 1 bit and the 8 bit terminals connecting said delay circuits to said inputs of said binary adders for detecting a value nine as the result of said arithmetical operation and means connected to said 16 bit terminal incoming to one of said delay circuits and said 8 bit terminal outgoing from one of said delay circuits for detecting a value consisting of a multiple of nine as the result of said arithmetical operation during the penultimate step of said arithmetical operation.

4. A modulo nine computer having a plurality of modulo nine accumulators each for converting a multi-digit decimal number involved in a subtraction operation into a corresponding single digit modulo nine number, each said multi-digit decimal number having an index indicating its relative magnitude, means controlled by said index numbers for controlling the subtraction of the number having the smaller magnitude from the number having the larger magnitude, means controlled by equal said index numbers for making a trial subtraction of one of said numbers from the other, means responsive to a negative result of said trial subtraction for automatically converting said negative result into the remainder of the smaller of said numbers subtracted from the larger of said numbers, and means for performing a parallel arithmetical operation with the modulo nine values of said numbers.

References Cited in the file of this patent

UNITED STATES PATENTS

| 2,241,591 | Gates | May 13, 1941 |
| 2,634,052 | Bloch | Apr. 7, 1953 |
| 2,684,199 | Starreveld | July 20, 1954 |

OTHER REFERENCES

Progress Report (2) on the Edvac, Moore School of Engineering, University of Pennsylvania, pages 1-1-29 and 1-1-30, Figure PY-0-181, June 30, 1946.